United States Patent
Watanabe et al.

(10) Patent No.: US 9,546,803 B2
(45) Date of Patent: Jan. 17, 2017

(54) RECIPROCATING MAGNETIC HEAT PUMP APPARATUS WITH MULTIPLE PERMANENT MAGNETS IN DIFFERENT CONFIGURATIONS

(75) Inventors: Naoki Watanabe, Kariya (JP);
Kazutoshi Nishizawa, Toyoake (JP);
Shinichi Yatsuzuka, Nagoya (JP);
Tsuyoshi Morimoto, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1041 days.

(21) Appl. No.: 13/453,216

(22) Filed: Apr. 23, 2012

(65) Prior Publication Data
US 2012/0272665 A1   Nov. 1, 2012

(30) Foreign Application Priority Data

Apr. 26, 2011 (JP) .................................. 2011-098351
Feb. 2, 2012 (JP) .................................. 2012-020881

(51) Int. Cl.
*F25B 21/00* (2006.01)
*F25B 25/00* (2006.01)

(52) U.S. Cl.
CPC ............. *F25B 21/00* (2013.01); *F25B 25/005* (2013.01); *F25B 2321/0022* (2013.01); *Y02B 30/66* (2013.01)

(58) Field of Classification Search
CPC ..... F25B 21/00; F25B 2321/002; F25B 13/00; F25B 47/022; F25B 25/005; F25B 41/04; Y02B 30/66; B60H 1/00899; B60H 1/32; F28F 27/02; F01M 5/007

USPC .............................................. 62/3.1, 467, 3.3
See application file for complete search history.

(56) References Cited

U.S. PATENT DOCUMENTS

| | | | |
|---|---|---|---|
| 6,526,759 B2 * | 3/2003 | Zimm et al. ...................... 62/3.1 |
| 7,148,777 B2 * | 12/2006 | Chell et al. .................... 335/306 |
| 7,897,898 B2 * | 3/2011 | Muller et al. ................. 219/672 |
| 8,264,314 B2 * | 9/2012 | Sankar .......................... 335/306 |
| 2010/0095686 A1 * | 4/2010 | Cramet ................... F25B 21/00 62/3.1 |
| 2011/0315348 A1 | 12/2011 | Muller et al. |

FOREIGN PATENT DOCUMENTS

FR WO 2010034907 A1 * 4/2010 ............ F25B 21/00
FR    2 943 406   9/2010
(Continued)

*Primary Examiner* — Len Tran
*Assistant Examiner* — Gordon Jones
(74) *Attorney, Agent, or Firm* — Harness, Dickey & Pierce, P.L.C.

(57) ABSTRACT

A magnetic heat pump cycle has a first to a fourth steps, which are repeatedly carried out. In the first step, a movement of heat medium is stopped by a pressure valve and a pressure accumulating tank and a magnetic field is applied by a magnetic-field control unit to a magnetic working material. In the second step, the pressure valve is opened so that the heat medium flows in a working chamber from a second axial end to a first axial end, and the magnetic field is increased depending on a moving speed of the heat medium. In the third step, the movement of the heat medium is stopped and the magnetic field is decreased. In the fourth step, the heat medium is moved in a reversed direction and the magnetic field is decreased depending on the moving speed of the heat medium.

6 Claims, 19 Drawing Sheets

(56) References Cited

FOREIGN PATENT DOCUMENTS

| GB | 2464184 A | * | 4/2010 |
|---|---|---|---|
| JP | 59-215562 | | 12/1984 |
| JP | 2009-216303 | | 9/2009 |
| JP | 4387892 | | 10/2009 |
| JP | 2010-043775 | | 2/2010 |
| JP | 2010-112606 | | 5/2010 |
| JP | 2010-196914 | | 9/2010 |

* cited by examiner

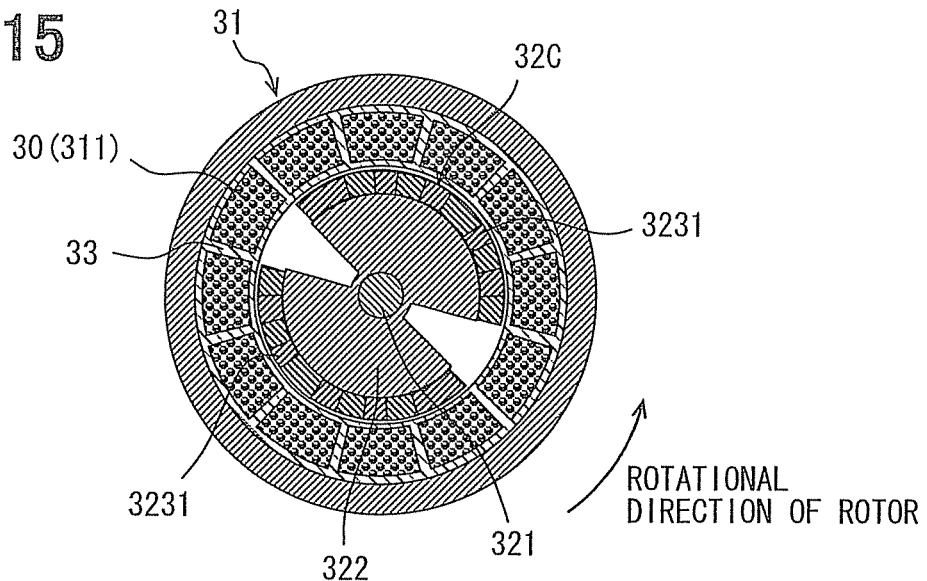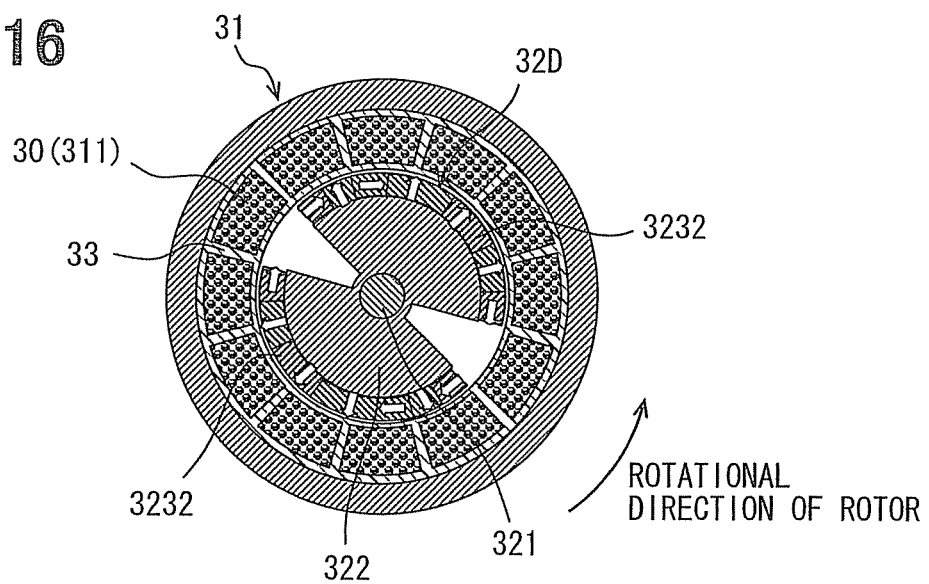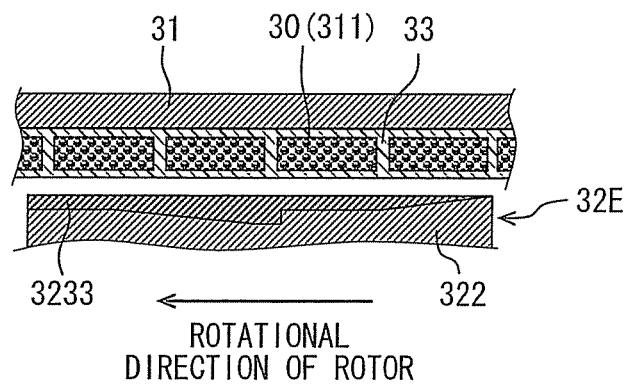

RECIPROCATING MAGNETIC HEAT PUMP APPARATUS WITH MULTIPLE PERMANENT MAGNETS IN DIFFERENT CONFIGURATIONS

CROSS REFERENCE TO RELATED APPLICATION

This application is based on Japanese Patent Applications No. 2011-098351 filed on Apr. 26, 2011 and No. 2012-020881 filed on Feb. 2, 2012, the disclosures of which are incorporated herein by reference.

TECHNICAL FIELD

The present disclosure relates to a magnetic heat pump apparatus, for which magnetocaloric effect of magnetic working material is utilized.

BACKGROUND

A magnetic heat pump apparatus is known in the art, for example, as disclosed in French Patent Publication No. 2943406, according to which magnetocaloric element of magnetic working material is magnetically and periodically operated or released from its magnetic operation, cooling fluid is alternately moved to a high-temperature chamber and a low-temperature chamber (which are provided at both sides of the magnetocaloric element) so that the cooling fluid passes through the magnetocaloric element in synchronism with a magnetic-field applying stage or a magnetic-field releasing stage of the magnetocaloric element, and transfer of heat is thereby carried out. According to such a prior art, flow direction of the cooling fluid passing through the magnetocaloric element is reversed in the magnetic-field applying stage and the magnetic-field releasing stage, so that the cooling fluid continuously flows in a reciprocating manner.

The above prior art does not disclose anything about a relationship between an increase-decrease rate of magnetic field to be applied to the magnetocaloric element and a flow speed of the cooling fluid. It may be a problem that an operating condition of the magnetic heat pump apparatus differs from Carnot cycle (which is one of ideal heat cycles) and thereby sufficiently high operation efficiency cannot be realized.

SUMMARY OF THE DISCLOSURE

The inventors of the present disclosure have found out that it is possible to increase or decrease the magnetic field to the magnetocaloric element in an isothermal condition when a relationship between a change rate of increasing or decreasing the magnetic field and the flow speed of the cooling fluid (heat medium) is controlled within a predetermined range, and thereby diremption from an ideal heat cycle can be decreased.

The present disclosure is made in view of the above points. It is an object of the present disclosure to provide a magnetic heat pump apparatus, according to which an operation efficiency thereof is increased.

According to a feature of the present disclosure (for example, as defined in the appended claim 1), a magnetic heat pump apparatus has a magnetic refrigerating device, which includes;

(a) a container device having a working chamber for accommodating magnetic working material having magnetocaloric effect, wherein heat medium passes through the working chamber;

(b) a magnetic-field control unit for changing degree of the magnetic field to be applied to the magnetic working material; and (c) a heat-medium moving device for moving the heat medium in the working chamber so that the heat medium is reciprocated between a first axial end and a second axial end of the working chamber.

The magnetic heat pump apparatus further has;

a heat radiating device for radiating heat, which is contained in the heat medium on a side of the second axial end, to an outside of the heat radiating device; and a heat absorbing device for absorbing heat from an outside of the heat absorbing device into the heat medium, which is on a side of the first axial end.

In the above magnetic heat pump apparatus, a heat pump cycle of the magnetic heat pump apparatus includes following first to fourth steps, which are repeatedly carried out;

(i) the first step for increasing temperature of the magnetic working material;

(ii) the second step for increasing the degree of the magnetic field to be applied to the magnetic working material, temperature of which is increased in the first step, by the magnetic-field control unit, wherein the heat medium is moved from the first axial end to the second axial end by the heat-medium moving device;

(iii) the third step for decreasing the temperature of the magnetic working material after the second step; and (iv) the fourth step for decreasing the degree of the magnetic field applied to the magnetic working material, the temperature of which is decreased in the third step, by the magnetic-field control unit, wherein the heat medium is moved from the second axial end to the first axial end.

Furthermore, in the above magnetic heat pump apparatus, heat absorbed in the heat absorbing device is radiated from the heat radiating device, and the heat-medium moving device and the magnetic-field control unit are synchronized in such a manner that, in the second and fourth steps, a change rate of the degree of the magnetic field to be applied to the magnetic working material by the magnetic-field control unit is made larger, as a moving speed of the heat medium by the heat-medium moving device is higher.

According to the above feature, the heat-medium moving device moves the heat medium from the first axial end to the second axial end in the second step. In addition, the magnetic-field control unit changes the magnetic field to be applied to the magnetic working material in such a manner that an increase rate of the magnetic field becomes larger as the moving speed of the heat medium is increased.

Accordingly, the increase rate of the magnetic field to be applied to the magnetic working material is made larger, as the moving speed of the heat medium becomes higher and thereby the heat transfer can be efficiently carried out from the magnetic working material to the heat medium. As a result, an amount of the heat generated (a heat energy) in the magnetic working material is made larger. According to such a feature, it is possible to keep the magnetic working material in an almost isothermal condition, in the second step.

In addition, according to the above feature, the heat-medium moving device moves the heat medium from the second axial end to the first axial end in the fourth step. At the same time, the magnetic-field control unit changes the magnetic field applied to the magnetic working material in such a manner that a decrease rate of the magnetic field becomes larger as the moving speed of the heat medium is increased.

Accordingly, the decrease rate of the magnetic field applied to the magnetic working material is made larger, as the moving speed of the heat medium becomes higher and thereby the heat transfer can be efficiently carried out from the heat medium to the magnetic working material. As a result, an amount of the heat absorption (a cold energy generated) in the magnetic working material is made larger. According to such a feature, it is possible to keep the magnetic working material in an almost isothermal condition, in the fourth step.

According to the above feature, it is possible to suppress diremption in the second step from an ideal process for an isothermal excitation of the heat cycle and to suppress diremption in the fourth step from an ideal process for an isothermal degaussing of the heat cycle. As a result, the operation efficiency for the magnetic heat pump apparatus can be increased.

The above explained features can be further summarized as below:

According to the heat pump cycle of the magnetic heat pump apparatus, the degree of the magnetic field to be applied to the magnetic working material by the magnetic-field control unit as well as the movement of the heat medium by the heat-medium moving device is periodically changed, so that the heat absorbed in the heat absorbing device is radiated from the heat radiating device.

The heat pump cycle has the isothermal excitation process and the isothermal degaussing process in a case of an ideal heat cycle in view of an operation efficiency. In the isothermal excitation process, the magnetic field to be applied to the magnetic working material is increased, while the temperature of the magnetic working material is not changed. In the isothermal degaussing process, the magnetic field applied to the magnetic working material is decreased, while the temperature of the magnetic working material is not changed.

In addition, in the isothermal excitation process, the magnetic field to be applied to the magnetic working material is increased by the magnetic-field control unit, while the heat medium is moved by the heat-medium moving device from the first axial end to the second axial end. In the isothermal degaussing process, the magnetic field applied to the magnetic working material is decreased by the magnetic-field control unit, while the heat medium is moved by the heat-medium moving device from the second axial end to the first axial end.

In the above isothermal excitation process and the isothermal degaussing process, the heat-medium moving device and the magnetic-field control unit are synchronized in such away that the change rate of the degree of the magnetic field to be applied to the magnetic working material by the magnetic-field control unit is made larger, as the moving speed of the heat medium by the heat-medium moving device is higher.

In a case of the isothermal excitation process of the ideal heat cycle, the heat-medium moving device moves the heat medium from the first axial end to the second axial end. Furthermore, the magnetic-field control unit increases the magnetic field to be applied to the magnetic working material in such a manner that the increase rate of the degree of the magnetic field to be applied to the magnetic working material by the magnetic-field control unit is made larger, as the moving speed of the heat medium is higher.

Accordingly, the increase rate of the degree of the magnetic field to be applied to the magnetic working material is made larger, as the moving speed of the heat medium becomes higher and thereby the heat transfer can be efficiently carried out from the magnetic working material to the heat medium. As a result, the heat generated in the magnetic working material is increased. As above, in the isothermal excitation process, the magnetic working material can be maintained in the almost isothermal condition.

In the case of the isothermal degaussing process of the ideal heat cycle, the heat-medium moving device moves the heat medium from the second axial end to the first axial end. Furthermore, the magnetic-field control unit decreases the magnetic field applied to the magnetic working material in such a manner that the decrease rate of the degree of the magnetic field applied to the magnetic working material by the magnetic-field control unit is made larger, as the moving speed of the heat medium is higher.

Accordingly, the decrease rate of the degree of the magnetic field applied to the magnetic working material is made larger, as the moving speed of the heat medium becomes higher and thereby the heat transfer can be efficiently carried out from the heat medium to the magnetic working material. As a result, the heat absorbing amount in the magnetic working material is increased. As above, in the isothermal degaussing process, the magnetic working material can be maintained in the almost isothermal condition.

Therefore, it is possible to decrease the diremption from the ideal heat cycle in the isothermal excitation process and the isothermals degaussing process, to thereby improve the operation efficiency of the magnetic heat pump apparatus.

According to another feature of the present disclosure (for example, as defined in claim 12), a magnetic refrigerating device of a magnetic heat pump apparatus includes:

(a) a container device having a working chamber for accommodating magnetic working material having magnetocaloric effect, wherein heat medium passes through the working chamber;

(b) a magnetic-field control unit for changing degree of the magnetic field to be applied to the magnetic working material; and (c) a heat-medium moving device for moving the heat medium in the working chamber so that the heat medium is reciprocated between a first axial end and a second axial end of the working chamber.

The magnetic heat pump apparatus further has;

a heat radiating device for radiating heat, which is contained in the heat medium on a side of the second axial end, to an outside of the heat radiating device; and a heat absorbing device for absorbing heat from an outside of the heat absorbing device into the heat medium, which is on a side of the first axial end.

A heat pump cycle of the magnetic heat pump apparatus includes following first to fourth steps, which are repeatedly carried out so that heat absorbed in the heat absorbing device is radiated from the heat radiating device;

(i) the first step for increasing the magnetic field to be applied to the magnetic working material by the magnetic-field control unit, while the movement of the heat medium in the working chamber by the heat-medium moving device is stopped;

(ii) the second step for moving the heat medium from the first axial end to the second axial end by the heat-medium moving device without decreasing the magnetic field applied to the magnetic working material, which has been increased by the magnetic-field control unit in the first step, wherein the second step is carried out after the elapse of a certain period of time from a start of the first step or when a physical quantity varying in accordance with the passage of time reaches at a predetermined value;

(iii) the third step for decreasing the magnetic field applied to the magnetic working material by the magnetic-field control unit after the second step, while the movement of the heat medium in the working chamber by the heat-medium moving device is stopped; and (iv) the fourth step for moving the heat medium from the second axial end to the first axial end by the heat-medium moving device without increasing the magnetic field applied to the magnetic working material, which has been decreased by the magnetic-field control unit in the third step, wherein the fourth step is carried out after the elapse of a certain period of time from a start of the third step or when the physical quantity varying in accordance with the passage of time reaches at another predetermined value.

According to the above feature, an adiabatic state is formed, in which the movement of the heat medium in the working chamber by the heat-medium moving device is stopped in the first step. In such adiabatic state, the magnetic field to be applied to the magnetic working material is increased, to thereby increase the temperature of the magnetic working material.

In the second step, the heat medium is moved from the first axial end to the second axial end of the working chamber, so that the heat energy generated in the magnetic working material in the first step is transferred to the heat medium and moved to the second axial end.

In the third step, the adiabatic state is formed, in which the movement of the heat medium in the working chamber by the heat-medium moving device is stopped. In such adiabatic state, the magnetic field applied to the magnetic working material is decreased, to thereby decrease the temperature of the magnetic working material.

In the fourth step, the heat medium is moved from the second axial end to the first axial end of the working chamber, so that the cold energy generated in the magnetic working material in the third step is transferred to the heat medium and moved to the first axial end.

Accordingly, in the first step, the temperature of the magnetic working material is isenthropically increased, and in the second step, heat energy of the magnetic working material, the temperature of which is increased in the first step, is moved to the second axial end of the working chamber.

In the third step, the temperature of the magnetic working material is isenthropically decreased, and in the fourth step, cold energy of the magnetic working material, the temperature of which is decreased in the third step, is moved to the first axial end of the working chamber.

As a result, the heat absorbed in the heat absorbing device is efficiently moved from the first axial end to the second axial end and radiated from the heat radiating device. Thus, the operating efficiency of the magnetic heat pump apparatus can be increased.

BRIEF DESCRIPTION OF THE DRAWINGS

The above and other objects, features and advantages of the present disclosure will become more apparent from the following detailed description made with reference to the accompanying drawings. In the drawings:

FIG. 15 is a schematic cross sectional view showing a further modification of a heat-exchange container device;

FIG. 16 is a schematic cross sectional view showing a still further modification of a heat-exchange container device;

FIG. 17 is an enlarged schematic view, wherein a relevant portion of the heat-exchange container device of a further modification is expanded in a straight direction;

DETAILED DESCRIPTION OF THE EMBODIMENTS

Figure 1:
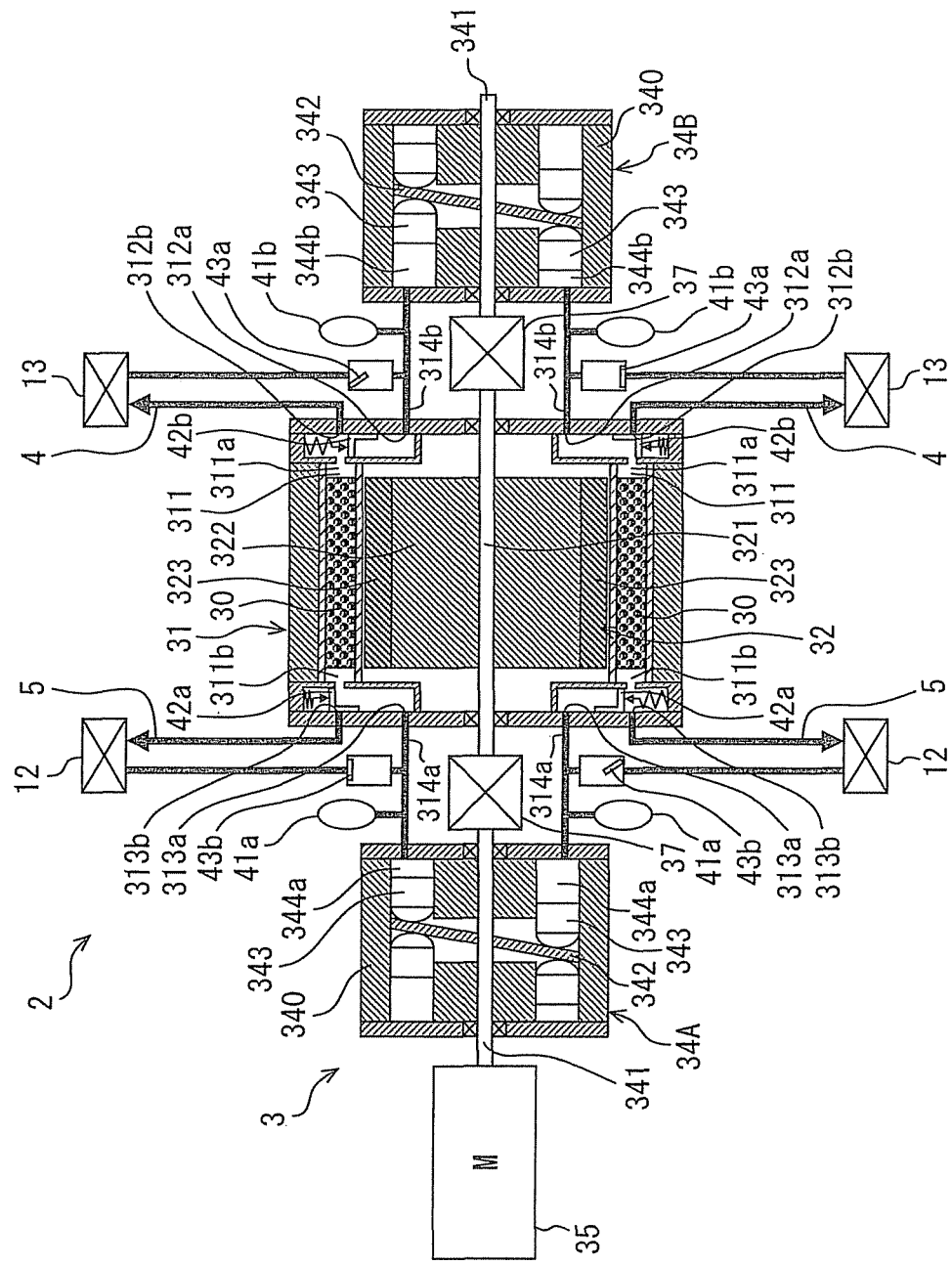
FIG. 1 is a schematic structure of a magnetic refrigerating system, to which a magnetic heat pump apparatus according to a first embodiment of the present disclosure is applied.

The present disclosure will be explained by way of multiple embodiments with reference to the drawings. The same reference numerals are used throughout the embodiments for the purpose of designating the same or similar parts and/or components.

First Embodiment

Figure 2:
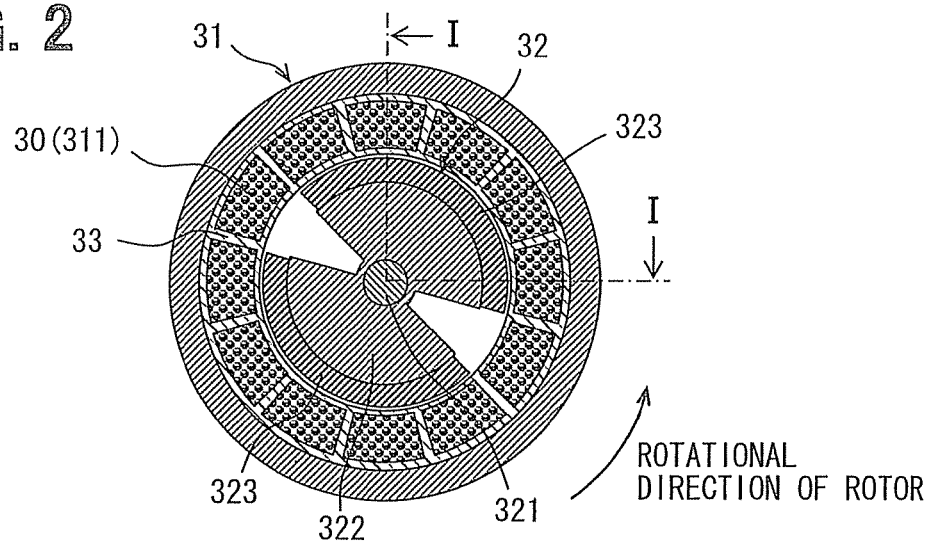
FIG. 2 is a schematic cross sectional view showing a heat-exchange container unit of the magnetic refrigerating system.
Figure 3:
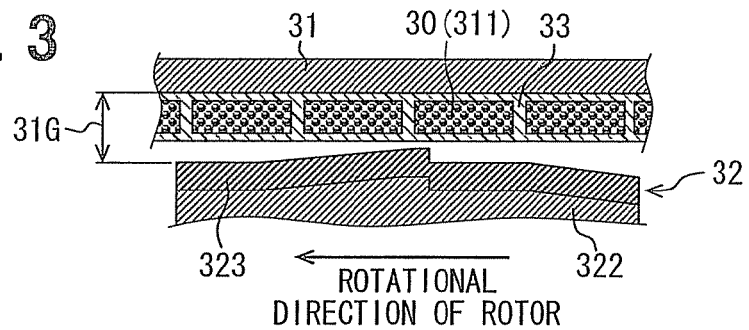
FIG. 3 is an enlarged schematic view, wherein a relevant portion of the heat-exchange container device is expanded in a straight direction.

FIG. 1 schematically shows a structure of a magnetic refrigerating system 2 for a magnetic heat pump apparatus according to a first embodiment of the present disclosure. FIG. 2 shows a cross sectional view of a heat-exchange container unit 31 for the magnetic refrigerating system 2. A magnetic refrigerating device 3 shown in FIG. 1, which is a relevant portion of the magnetic refrigerating system, corresponds to a cross sectional view taken along a line I-I in FIG. 2. FIG. 3 is an enlarged cross sectional view showing a relevant portion of the heat-exchange container unit 31 of the magnetic refrigerating system 2, wherein its structure in a circumferential direction is expanded in a straight direction.

The magnetic refrigerating system 2 shown in FIG. 1 is of an AMR (Active Magnetic Refrigerator) type, according to which cold energy as well as heat energy generated by magnetocaloric effect is stored in magnetic working material 30. The magnetic refrigerating system 2 of the present embodiment is composed of the magnetic refrigerating device 3, a high-temperature side refrigerant circuit 4 (also referred to as a second refrigerant circuit) and a low-temperature side refrigerant circuit 5 (also referred to as a first refrigerant circuit). The magnetic refrigerating device 3 generates the cold and heat energy by the magnetocaloric effect. A heat medium (for example, water including anti-freeze liquid or the like, hereinafter also referred to as a refrigerant) is heated up by the heat energy generated by the magnetic refrigerating device 3 and such heat medium is circulated in the high-temperature side refrigerant circuit 4 through a heating-side heat exchanger 13 (also referred to as a heat radiating device). The heat medium (the refrigerant), which is cooled down by the cold energy generated by the magnetic refrigerating device 3, is circulated in the low-temperature side refrigerant circuit 5 through a cooling-side heat exchanger 12 (also referred to as a heat absorbing device).

The magnetic refrigerating system 2 is preferably applied to, for example, an air conditioning apparatus for a vehicle. For example, heat is absorbed by the cooling-side heat exchanger 12 from air flowing through a casing of the air conditioning apparatus so as to cool down the air. And then, such cooled-down air is heated by the heating-side heat exchanger 13 through its heat radiation, so that temperature-controlled air is blown into a passenger compartment of the vehicle to control temperature of the air inside of the vehicle.

The magnetic refrigerating device 3 is composed of the heat-exchange container device 31 (hereinafter also referred to as a container device 31), a magnetic-field control unit 32, a pair of (first and second) refrigerant pumps 34A and 34B, an electric motor 35 and so on. Multiple working chambers 311 are formed in the container device 31, in which the magnetic working material 30 having the magnetocaloric effect is accommodated and through which the heat medium (the refrigerant) passes. More exactly, the magnetic working material 30 is filled in multiple beds and the heat medium passes through spaces among the magnetic working materials 30. The magnetic-field control unit 32 applies magnetic field to the magnetic working material 30, removes the magnetic field therefrom and changes degree of the magnetic field to be applied to the magnetic working material 30. The pair of refrigerant pumps 34A and 34B (also referred to as "a pump device" or "a refrigerant moving device") move the heat medium (the refrigerant) in the container device 31. The electric motor 35 drives the magnetic refrigerating device 3. Namely, the magnetic-field control unit 32 is rotated with respect to the container device 31.

As shown in FIG. 1, the first and second refrigerant pumps 34A and 34B are coaxially arranged with the container device 31 at both sides thereof.

The container device 31 is formed in a hollow cylindrical shape. The multiple working chambers 311, in each of which the magnetic working material 30 is filled and through which the heat medium (the refrigerant) passes, are provided in an inner peripheral area of the container device 31. As shown in FIG. 2, the multiple working chambers 311 (twelve chambers in the present embodiment) are arranged at equal intervals in a circumferential direction.

As shown in FIG. 1, an inlet port and an outlet port for the heat medium (the refrigerant) are respectively provided at a first axial end 311b of each working chamber 311 and at a second axial end 311a thereof opposite to the first axial end 311b in an axial direction (a right-and-left direction in the drawing).

A first refrigerant inlet port 313a and a first refrigerant outlet port 313b are formed on a side of the first axial end 311b for each working chamber 311, while a second refrigerant inlet port 312a and a second refrigerant outlet port 312b are formed on a side of the second axial end 311a for each working chamber 311.

An upstream end of the high-temperature side refrigerant circuit 4 is connected to the second refrigerant outlet port 312b. An upstream end of the low-temperature side refrigerant circuit 5 is connected to the first refrigerant outlet port 313b.

A first pressure switching valve 42a is provided in the container device 31 so as to communicate a space of the working chamber 311 on the side of the first axial end 311b either to the first refrigerant inlet port 313a or to the first refrigerant outlet port 313b. In a similar manner, a second pressure switching valve 42b is provided in the container device 31 so as to communicate a space of the working chamber 311 on the side of the second axial end 311a either to the second refrigerant inlet port 312a or to the second refrigerant outlet port 312b. The first and second pressure switching valves 42a and 42b are collectively referred to as a pressure valve device.

When a pressure difference between the first refrigerant inlet port 313a and the working chamber 311 is lower than a predetermined value, the first pressure switching valve 42a, on one hand, shuts off a refrigerant passage between the first refrigerant inlet port 313a and the space of the working chamber 311 on the side of the first axial end 311b, but on the other hand, the first pressure switching valve 42a opens a refrigerant passage between the space of the working chamber 311 on the side of the first axial end 311b and the first refrigerant outlet port 313b. When the pressure difference between the first refrigerant inlet port 313a and the working chamber 311 becomes higher than the predetermined value, a valve member of the first pressure switching valve 42a is lifted up (in a direction opposite to a center axis of the container device 31), so that the refrigerant passage between the first refrigerant inlet port 313a and the space of the working chamber 311 of the first axial end 311b is opened, while the refrigerant passage between the space of the working chamber 311 of the first axial end 311b and the first refrigerant outlet port 313b is shut off.

In the same manner, when a pressure difference between the second refrigerant inlet port 312a and the working chamber 311 is lower than a predetermined value, the second pressure switching valve 42b, on one hand, shuts off a refrigerant passage between the second refrigerant inlet port 312a and the space of the working chamber 311 on the side of the second axial end 311a, but on the other hand, the second pressure switching valve 42b opens a refrigerant passage between the space of the working chamber 311 on the side of the second axial end 311a and the second refrigerant outlet port 312b. When the pressure difference between the second refrigerant inlet port 312a and the working chamber 311 becomes higher than the predetermined value, a valve member of the second pressure switching valve 42b is lifted up (in a direction opposite to the center axis of the container device 31), so that the refrigerant passage between the second refrigerant inlet port 312a and the space of the working chamber 311 of the second axial end 311a is opened, while the refrigerant passage between the space of the working chamber 311 of the second axial end 311a and the second refrigerant outlet port 312b is shut off.

The magnetic-field control unit 32, which is composed of a rotational shaft 321, a rotor 322 fixed to the rotational shaft 321 and permanent magnets 323 attached at an outer periphery of the rotor 322, is accommodated in an inside of the container device 31.

The rotational shaft 321 is rotatably supported by bearing portions, which are provided at both axial sides of the container device 31. Each of axial ends of the rotational shaft 321 outwardly extends from the container device 31 in its axial direction, so that it is connected to a driving shaft 341 of each refrigerant pump 34A and 34B via a speed changing device 37, as explained below. The driving shaft 341 of the refrigerant pump 34A is connected to the electric motor 35, so that the driving shaft 341 is rotated by the electric motor 35.

As shown in FIG. 2, the rotor 322 (to the outer periphery of which the permanent magnets 323 are firmly attached) is fixed to the rotational shaft 321, in such a manner that a small radial gap is formed between the rotor 322 and the inner peripheral surface of the container device 31 so that the rotor 322 is rotated in the container device 31.

The multiple permanent magnets 323 (two magnets in the present embodiment) are provided at the outer periphery of the rotor 322, so that each of the magnets 323 periodically approaches to the respective working chambers 311 of the container device 31 in accordance with rotation of the rotational shaft 321. A pair of grooves is formed in the rotor 322 between the permanent magnets 323, wherein each of the grooves extends in the axial direction.

According to the above structure, in which the container device 31 and the rotor 322 are working as a yoke, magnetic field is generated by the permanent magnets 323. The magnetic field is applied to the magnetic working material 30 accommodated in each of the working chambers 311, or the magnetic field is removed in accordance with the rotation of the rotational shaft 321. Holding members 33, which are made of non-magnetic material (for example, resin), are formed around the respective working chambers 311, so that each of the working chambers 311 is positioned by the respective holding members 33 in the container device 31.

FIG. 3 shows a cross sectional view of a relevant portion for the permanent magnet 323 fixed to the rotor 322 and the container device 31. FIG. 3 is an expanded view showing the relevant portion, wherein the relevant portion in the circumferential direction of the container device 31 (that is, in a rotational direction of the rotor 322) is expanded in the straight direction.

As schematically shown in FIG. 2, each of the permanent magnets 323 attached to the outer periphery of the rotor 322 is almost equally magnetized and its radial thickness is also constant over its rotational direction. However, as shown in FIG. 3, the permanent magnet 323 is so formed that a distance between a center of the rotor 322 and an outer peripheral surface thereof is not constant over a circumferential area in the rotational direction. According to such a feature, a gap between the outer peripheral surface of the magnet 323 and the inner peripheral surface of the container 31 will be changed when the rotor 322 is rotated.

The working chambers 311 accommodating the magnetic working material 30 are interposed in the gap between the outer surface of the magnets 323 and the inner surface of the container device 31. The gap corresponds to a gap 31G of a magnetic circuit formed by the permanent magnets 323 and the yoke (which is composed of the container device 31 and the rotor 322).

The gap 31G is so formed that the magnetic field to be applied to the magnetic working material 30 (accommodated in the respective working chambers 311) is changed in a predetermined pattern, when the rotor 322 is rotated. More exactly, the magnetic field is changed in a magnetic pattern shown in FIG. 9. The shape of the outer periphery of the permanent magnet 323 shown in FIG. 3 corresponds to a magnetic curve shown in FIG. 9, in sequence from a leading portion to a backward portion in the rotational direction. Each of the grooves formed in the rotor 322 corresponds to a portion of the magnetic pattern of FIG. 9, at which the magnetic field is substantially removed.

The pair of the refrigerant pumps 34A and 34B constitutes the refrigerant moving device (the pump device) for moving the refrigerant in the container device 31, so that the refrigerant is reciprocated between the first and second axial ends 311b and 311a of the respective working chamber 311. According to the present embodiment, tandem type piston pumps are used for the refrigerant pumps 34A and 34B. In the tandem type piston pump, a suction mechanism and a discharge mechanism are coaxially arranged and operated by one driving shaft 341. According to the present embodiment, however, only one-side pump mechanism of each pump is used for operating the magnetic refrigerating system. It may be possible to provide one pump and to use both-side pump mechanisms.

More in detail, as shown in FIG. 1, each of the refrigerant pumps 34A and 34B has a housing 340, the driving shaft 341 rotatably supported in the housing 340, a swash plate 342 fixed to the driving shaft 341 in an inclined manner and rotated together with the driving shaft 341, multiple pairs of pistons 343 reciprocated in accordance with the rotation of the swash plate 342, multiple pairs of cylinder bores 344a (and 344b) formed in the housing 340 at both sides of the swash plate 342 for respectively accommodating the pair of the pistons 343 in a reciprocating manner. The cylinder bores 344a and 344b are also referred to as pump chambers.

The driving shaft 341 is rotatably supported by bearing portions provided in the housing 340 at its both axial ends. One axial end of the driving shaft 341 outwardly extends from the housing 340, so that it is connected to the rotational shaft 321 via the speed changing device 37.

Each of the speed changing devices 37 constitutes a power transmitting mechanism, according to which a driving force of the electric motor 35 is transmitted to the rotational shaft 321 of the container device 31 and to the driving shaft 341 of the refrigerant pump 34B, via the driving shaft 341 of the refrigerant pump 34A connected to the electric motor 35.

Each of the speed changing devices 37 is so structured that it adjusts a ratio of rotational speed (a speed reducing ratio) of the rotational shaft 321 with respect to the rotational speed of the driving shaft 341 of the respective refrigerant pumps 34A and 34B. The speed reducing ratio is decided depending on the number of the permanent magnets 323 attached to the rotational shaft 321. For example, in the case of two magnets of the present embodiment, the speed reducing ratio is so set that the rotational shaft 321 is rotated by one revolution when each of the pistons 343 of the refrigerant pumps 34A and 34b is reciprocated twice.

Each of the refrigerant pumps 34A and 34B is operated in such a manner that the refrigerant is sucked into or discharged from each working chamber 311 of the container device 31 in synchronism with the change of the magnetic field applied to the magnetic working material 30 (that is, the application and removal of the magnetic field).

The first cylinder bore (the pump chamber) 344a of the refrigerant pump 34A is connected to the first refrigerant inlet port 313a of the container device 31 via a first connecting pipe 314a. The second cylinder bore (the pump chamber) 344b of the refrigerant pump 34B is connected to the second refrigerant inlet port 312a of the container device 31 via a second connecting pipe 314b.

A downstream end of the low-temperature side refrigerant circuit 5 is connected to the first connecting pipe 314a. A check valve (a one-way valve) 43b, which allows flow of the refrigerant from an upstream side to a downstream side but prohibits the flow of the refrigerant from the downstream side to the upstream side, is provided in the low-temperature side refrigerant circuit 5.

A first pressure accumulating tank (a pressure accumulating device) 41a is provided in the first connecting pipe 314a. An inside space of the first pressure accumulating tank 41a, which is filled with gas, is connected to the first cylinder bore 344a of the refrigerant pump 34A via the first connecting pipe 314a. The first pressure accumulating tank 41a accumulates pressure by changing volume of the gas filled in the inside space thereof.

A downstream end of the high-temperature side refrigerant circuit 4 is connected to the second connecting pipe 314b. A check valve (a one-way valve) 43a, which allows flow of the refrigerant from an upstream side to a downstream side but prohibits the flow of the refrigerant from the downstream side to the upstream side, is provided in the high-temperature side refrigerant circuit 4.

A second pressure accumulating tank (a pressure accumulating device) 41b is provided in the second connecting pipe 314b. An inside space of the second pressure accumulating tank 41b, which is filled with gas, is connected to the second cylinder bore 344b of the refrigerant pump 34B via the second connecting pipe 314b. The second pressure accumulating tank 41b accumulates pressure by changing volume of the gas filled in the inside space thereof.

The first and second pressure accumulating tanks 41a and 41b and the first and second pressure switching valves 42a and 42b are collectively referred to as a heat-medium-movement prohibiting unit.

Although not shown in detail in the drawings, each of the refrigerant pumps 34A and 34B has the multiple cylinder bores (the pump chambers) 344a and 344b, a number of which corresponds to a number of the working chambers 311 of the container device 31. Each pump chamber 344a (for the low-temperature side) and each pump chamber 344b (for the high-temperature side) forms a pair of a pump mechanism (the structure for moving the heat medium). And each pair of the pump mechanisms is the same to one another.

However, it is not always necessary to provide the cooling-side heat exchanger 12 and the heating-side heat exchanger 13, the numbers of which correspond to the number of the working chamber 311. Multiple cooling-side heat exchangers 12 may be collected together to structure one or more than one cooling-side heat exchangers 12, the number of which is less than the number of the working chambers 311. In a similar way, the multiple heating-side heat exchangers 13 may be collected to one or more than one heating-side heat exchangers, the number of which is less than the number of the working chambers 311.

An operation of the magnetic refrigerating system 2 will be explained with reference to FIGS. 4 to 9 in addition to FIGS. 1 to 3. Since each of the working chambers 311 has the same structure for moving the heat medium to one another, a structure for moving the heat medium for one working chamber 311 is shown in FIGS. 4 to 7 and the operation for such one working chamber 311 will be explained. The following operation will be sequentially carried out for the other working chambers 311, wherein an operational phase is shifted in series. The electric motor 35 is omitted from the drawings of FIGS. 4 to 7.

When the rotational force is transmitted from an output shaft of the electric motor 35 to the driving shaft 341, the magnetic refrigerating system 2 repeatedly carries out the following first to fourth steps in series. Namely, the heat energy, which is absorbed by the cooling-side heat exchanger 12 from outside fluid (air), is moved by the heat medium, and such heat energy is radiated to outside fluid from the heating-side heat exchanger 13.

Figure 8:
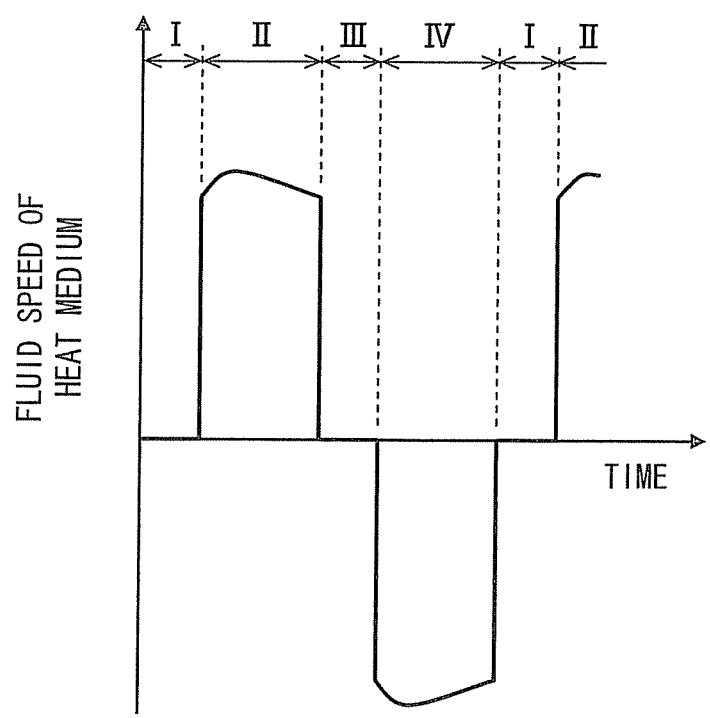
FIG. 8 is a graph showing a fluid speed of heat medium in a working chamber.

FIG. 8 is a graph showing a change of fluid speed of the heat medium in the working chamber 311, wherein the fluid flow from the first axial end 311b toward the second axial end 311a (that is, in a right-hand direction in the drawing) is indicated in a positive side (in an upper area above a reference line).

Figure 9:
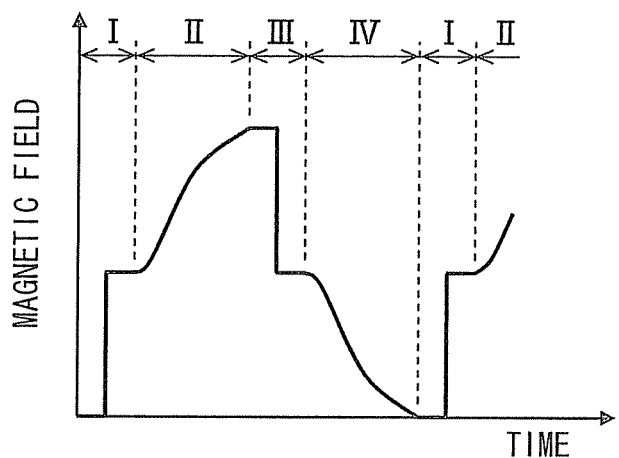
FIG. 9 is a graph showing a magnetic field applied to magnetic working material in the working chamber.

FIG. 9 is a graph showing a change of the magnetic field to be applied to the magnetic working material 30 in the working chamber 311. In FIGS. 8 and 9, numerals "I", "II", "III" and "IV" respectively designate the first to fourth steps.

Figure 4:
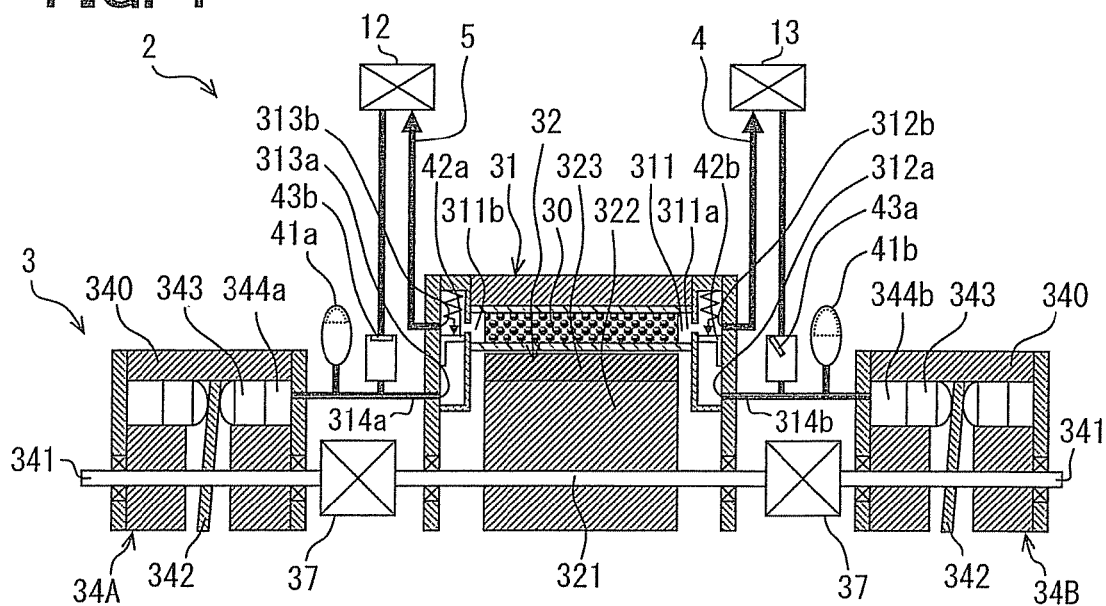
FIG. 4 is a schematic cross sectional view showing a relevant portion of the magnetic refrigerating system for explaining an operation thereof (an operation of a first step)

As shown in FIG. 4, when the piston 343 of the first refrigerant pump 34A moves from its bottom dead center to its top dead center, the piston 343 of the second refrigerant pump 34B moves from its top dead center to the bottom dead center, to thereby carry out the operation of the first step.

(First Step Operation)

In the first step, the pressure difference between the first refrigerant inlet port 313a and the working chamber 311 is lower than the predetermined value and thereby the first pressure switching valve 42a closes the refrigerant passage between the first refrigerant inlet port 313a and the working chamber 311 on the side of the first axial end 311b. Therefore, the refrigerant (the heat medium) pumped out from the first refrigerant pump 34A does not flow into the working chamber 311. Therefore, the refrigerant in the working chamber 311 is not moved (as shown by "I" in FIG. 8).

Pressure energy generated by the pumping-out operation of the refrigerant from the first refrigerant pump 34A is accumulated in the first pressure accumulating tank 41a by volume shrinkage of the gas therein, as indicated by a dotted line in FIG. 4. In the first step, the second refrigerant pump 345 sucks the refrigerant, so that the refrigerant flows into the cylinder bore 344b from the high-temperature side refrigerant circuit 4, while pressure in the second pressure accumulating tank 41b is slightly reduced.

During this operation of the first step, as indicated by "I" in FIG. 9, the magnetic field of the permanent magnet 323 applied to the magnetic working material 30 is rapidly increased from a condition that the magnetic field to be applied to the magnetic working material 30 is almost zero. In other words, the first step is carried out, in which the magnetic field to be applied to the magnetic working material 30 is rapidly increased while the movement of the heat medium in the working chamber 311 is prohibited. As above, according to the first step, the movement of the heat medium in the working chamber 311 is stopped so that the magnetic working material 30 is kept in an adiabatic state, and the magnetic field to be applied to the magnetic working material 30 is rapidly increased to thereby increase temperature of the magnetic working material 30.

Figure 5:
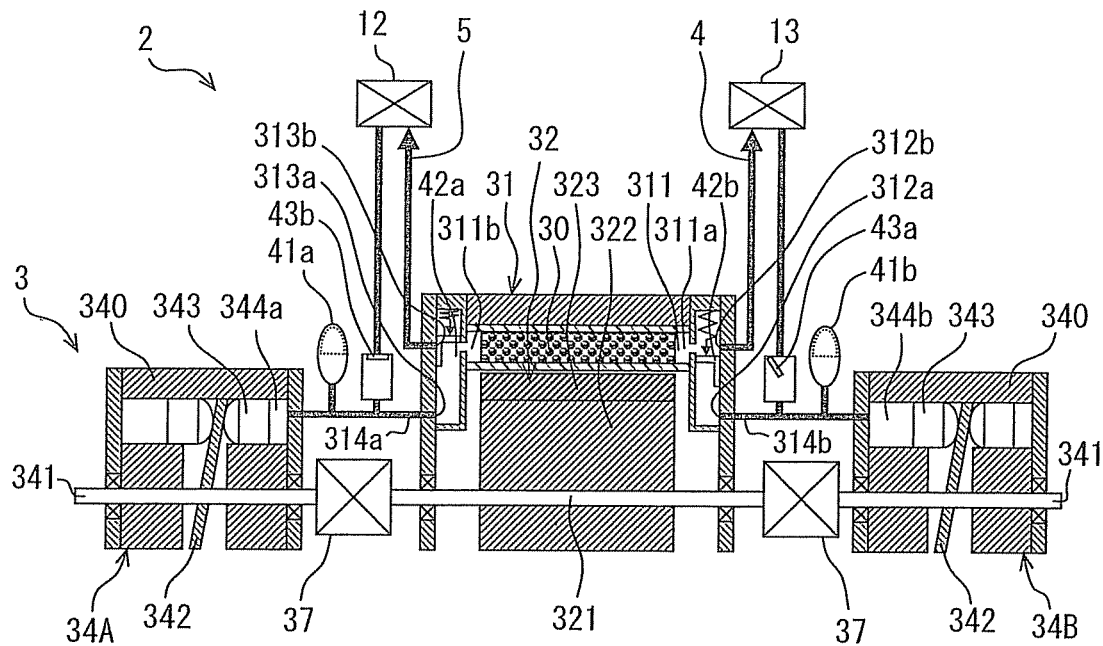
FIG. 5 is a schematic cross sectional view showing a relevant portion of the magnetic refrigerating system for explaining an operation thereof (an operation of a second step)

When the first step goes on, as shown in FIG. 5, the piston 343 of the first refrigerant pump 34A further moves in the cylinder bore 344a toward the top dead center, while the piston 343 of the second refrigerant pump 34B moves in the cylinder bore 344b toward the bottom dead center. When the pressure difference between the first refrigerant inlet port 313a and the working chamber 311 reaches at the predetermined value, the valve member of the first pressure switching valve 42a is lifted up in a direction away from the rotational shaft 321, so that the refrigerant passage between the first refrigerant inlet port 313a and the working chamber 311 on the side of the first axial end 311b is opened. As a result, the process goes on from the first step of FIG. 4 to the second step of FIG. 5.

(Second Step Operation)

In the second step, the refrigerant (the heat medium) flows into the working chamber 311 of the first axial end 311b from the first pressure accumulating tank 41a by its accumulated pressure energy, in addition to the refrigerant pumped out from the first refrigerant pump 34A. Then, the flow of the refrigerant is formed in the working chamber 311 from the first axial end 311b to the second axial end 311a, as indicated by "II" in FIG. 8. The fluid speed of the refrigerant has such a fluid-speed pattern having a peak in a first half portion.

The second refrigerant pump 34B continuously sucks the refrigerant from the high-temperature side refrigerant circuit 4 into the cylinder bore 344b. The refrigerant (the heat medium), which is heated up by the magnetic working material 30, flows out from the working chamber 311 of the second axial end 311a to the high-temperature side refrigerant circuit 4.

During the operation of the second step, the magnetic field applied by the permanent magnet 323 to the magnetic working material 30 is further increased gradually from the degree of the magnetic field of the first step (more exactly, the degree of the magnetic field at the end of the first step), as indicated by "II" in FIG. 9.

In other words, the pressure difference between the first refrigerant inlet port 313a and the working chamber 311 is increased in the first step operation. And when such pressure difference becomes larger than the predetermined value, the magnetic field applied to the magnetic working material 30 is gradually increased (without being decreased) from the degree of the magnetic field at the end of the first step. The second step operation is thereby carried out, in which the heat medium (the refrigerant) is moved in the working chamber 311 from the first axial end 311b to the second axial end 311a. In the second step, the heat energy of the magnetic working material 30, the temperature of which is increased in the first step, is transferred to the heat medium (the refrigerant) and moved to the second axial end 311a.

In the second step, the magnetic field to be applied to the magnetic working material 30 is gradually increased depending on the fluid speed of the heat medium (the refrigerant) in the working chamber 311, so that the heat energy generated in the magnetic working material 30 in the second step is also transferred to the heat medium.

As shown in FIG. 3, the gap 31G between the magnet 323 and the container device 31 is decreased depending on the operational phase. Therefore, in the second step, the magnetic field is increased in such a way that an increase rate of the magnetic field to be applied to the magnetic working material 30 becomes larger, as the fluid speed of the heat medium (the refrigerant) becomes higher in the working chamber 311. For example, when the fluid speed of the heat medium becomes at its maximum value, the increase rate of the magnetic field becomes at a maximum value (a slope of a curve in FIG. 9 in the second step "II"). According to such an operation, the magnetic working material 30 is maintained in an isothermal condition, so that a coefficient of thermal conductivity between the magnetic working material 30 and the heat medium is maintained at a high value during the second step operation.

Figure 6:
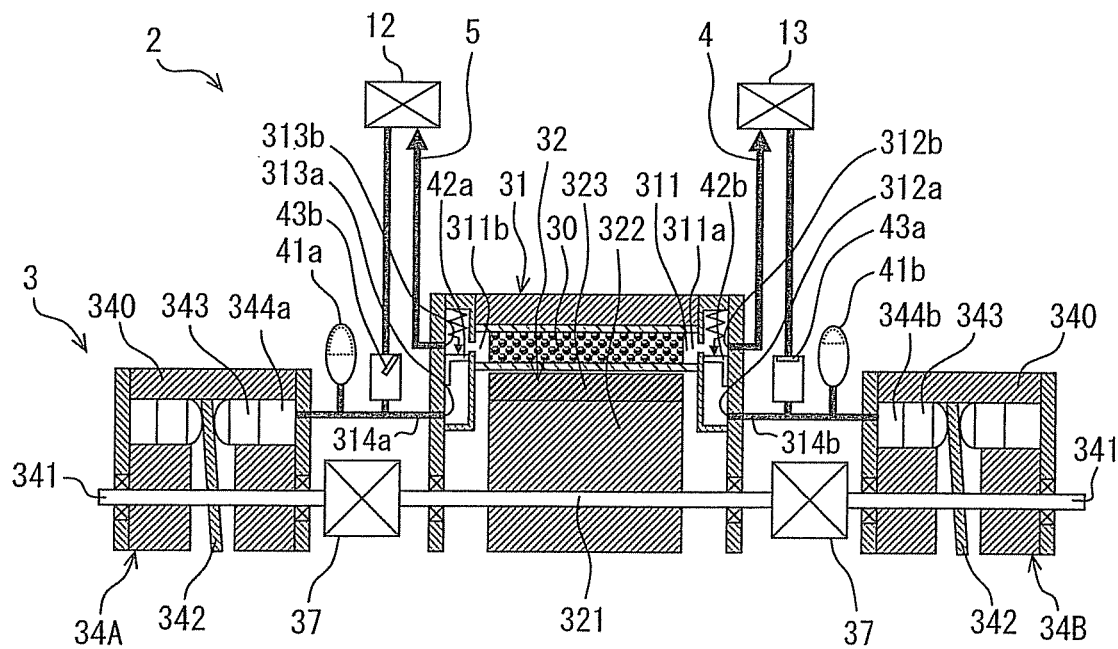
FIG. 6 is a schematic cross sectional view showing a relevant portion of the magnetic refrigerating system for explaining an operation thereof (an operation of a third step)

When the piston 343 of the first refrigerant pump 34A has reached at the top dead center and it moves from the top dead center toward the bottom dead center, as shown in FIG. 6, the piston 343 of the second refrigerant pump 34B moves from the bottom dead center toward the top dead center, so as to carry out the third step.

(Third Step Operation)

In the third step, since the pressure difference between the second refrigerant inlet port 312a and the working chamber 311 is lower than the predetermined value, the second pressure switching valve 42b holds the shut-off condition of the refrigerant passage between the second refrigerant inlet port 312a and the working chamber 311 of the second axial end 311a. Therefore, the refrigerant pumped out from the second refrigerant pump 34B does not flow into the working chamber 311, so that the movement of the refrigerant (the heat medium) is not carried out in the working chamber 311, as shown by "III" in FIG. 8.

Pressure energy generated by the pumping-out operation of the refrigerant from the second refrigerant pump 34B is accumulated in the second pressure accumulating tank 41b by volume shrinkage of the gas therein, as indicated by a dotted line in FIG. 6. In this third step, the first refrigerant pump 34A sucks the refrigerant, so that the refrigerant flows into the cylinder bore 344a from the low-temperature side refrigerant circuit 5, while pressure in the first pressure accumulating tank 41a is slightly reduced.

During the operation of the third step, as indicated by "III" in FIG. 9, the magnetic field of the permanent magnet 323 applied to the magnetic working material 30 is rapidly decreased from the degree of the magnetic field which has been increased in the second step (from the magnetic field at the end of the second step), because of a stepped portion formed in the magnet 323 (that is, a rapid increase of the gap 31G, as shown in FIG. 3).

In other words, the third step is carried out, in which the magnetic field to be applied to the magnetic working material 30 is rapidly decreased while the movement of the heat medium in the working chamber 311 is prohibited. As above, according to the third step, the movement of the heat medium in the working chamber 311 is stopped so that the magnetic working material 30 is kept in the adiabatic state, and the magnetic field applied to the magnetic working material 30 is rapidly decreased to thereby decrease the temperature of the magnetic working material 30.

Figure 7:
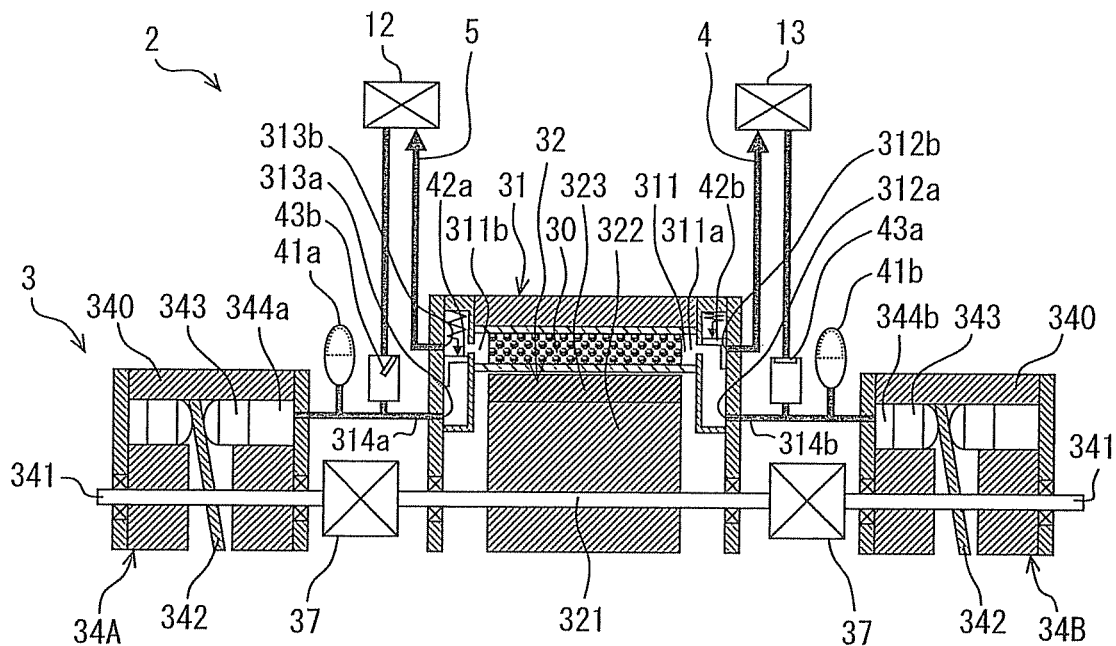
FIG. 7 is a schematic cross sectional view showing a relevant portion of the magnetic refrigerating system for explaining an operation thereof (an operation of a fourth step)

When the third step further goes on, as shown in FIG. 7, the piston 343 of the second refrigerant pump 34B further moves in the cylinder bore 344b toward the top dead center, while the piston 343 of the first refrigerant pump 34A, moves in the cylinder bore 344a toward the bottom dead center. When the pressure difference between the second refrigerant inlet port 312a and the working chamber 311 reaches at the predetermined value, the valve member of the second pressure switching valve 42b is lifted up in a direction away from the rotational shaft 321, so that the refrigerant passage between the second refrigerant inlet port 312a and the working chamber 311 of the second axial end 311a is opened. As a result, the process goes on from the third step of FIG. 6 to the fourth step of FIG. 7.

(Fourth Step Operation)

In the fourth step, the refrigerant flows into the working chamber 311 on the side of the second axial end 311a from the second pressure accumulating tank 41b by its accumulated pressure energy, in addition to the refrigerant pumped out from the second refrigerant pump 34B. Then, the flow of the refrigerant is formed in the working chamber 311 from the second axial end 311a to the first axial end 311b, as indicated by "IV" in FIG. 8. The fluid speed of the refrigerant has such a fluid-speed pattern having a peak in a first half portion.

The first refrigerant pump 34A continuously sucks the refrigerant from the low-temperature side refrigerant circuit 5 into the cylinder bore 344a. The refrigerant (the heat medium), which is cooled down by the magnetic working material 30, flows out from the working chamber 311 on the side of the first axial end 311b to the low-temperature side refrigerant circuit 5.

During the operation of the fourth step, the magnetic field applied by the permanent magnet 323 to the magnetic working material 30 is further decreased gradually from the degree of the magnetic field of the third step (the magnetic field at the end of the third step) to a condition in which the magnetic field becomes almost zero, as indicated by "IV" in FIG. 9.

In other words, the pressure difference between the second refrigerant inlet port 312a and the working chamber 311 is increased in the fourth step operation. And when such pressure difference becomes larger than the predetermined value, the magnetic field applied to the magnetic working material 30 is gradually decreased (without being increased) from the degree of the magnetic field at the end of the third step. The fourth step operation is thereby carried out, in which the heat medium (the refrigerant) is moved in the working chamber 311 from the second axial end 311a to the first axial end 311b. In the fourth step, the cold energy of the magnetic working material 30, the temperature of which is decreased in the third step, is transferred to the heat medium (the refrigerant) and moved to the first axial end 311b.

In the fourth step, the magnetic field applied to the magnetic working material 30 is gradually decreased depending on the fluid speed of the heat medium (the refrigerant) in the working chamber 311, so that the cold energy generated in the magnetic working material 30 in the fourth step is also transferred to the heat medium.

As shown in FIG. 3 (in a right-hand portion thereof), the gap 31G between the magnet 323 and the container device 31 is increased depending on the operational phase. Therefore, in the fourth step, the magnetic field is decreased in such a way that a decrease rate of the magnetic field applied to the magnetic working material 30 becomes larger, as the fluid speed of the heat medium (the refrigerant) becomes higher in the working chamber 311. According to such an operation, the magnetic working material 30 is maintained in the isothermal condition, so that the coefficient of thermal conductivity between the magnetic working material 30 and the heat medium is maintained at a high value during the fourth step operation.

When the piston 343 of the second refrigerant pump 34B has reached at the top dead center and it moves from the top dead center toward the bottom dead center, the piston 343 of the first refrigerant pump 34A moves from the bottom dead center toward the top dead center, so as to carry out the first step again.

According to the above structure and operation, the first to fourth steps are repeatedly carried out, so that the heat energy, which is absorbed by the cooling-side heat exchanger 12, will be radiated at the heating-side heat exchanger 13.

In the first step, the movement of the heat medium (the refrigerant) is stopped in the working chamber 311 to thereby form the adiabatic state and the magnetic field to be applied to the magnetic working material 30 is increased. Therefore, it is possible to increase the temperature of the magnetic working material 30.

In the second step, the heat medium (the refrigerant) is moved in the working chamber 311 from the first axial end 311b to the second axial end 311a. Therefore, it is possible to transfer the heat energy from the magnetic working material 30 (the temperature of which is increased in the first step and in the second step) to the heat medium to thereby move the heat energy to the second axial end 311a.

In the third step, the movement of the heat medium (the refrigerant) is again stopped in the working chamber 311 to thereby form the adiabatic state and the magnetic field applied to the magnetic working material 30 is decreased. Therefore, it is possible to decrease the temperature of the magnetic working material 30.

In the fourth step, the heat medium (the refrigerant) is moved in the working chamber 311 from the second axial end 311a to the first axial end 311b. Therefore, it is possible to transfer the cold energy from the magnetic working material 30 (the temperature of which is decreased in the third step and in the fourth step) to the heat medium to thereby move the heat energy to the first axial end 311b.

In the second step, the magnetic field to be applied to the magnetic working material 30 is increased depending on the moving speed (the fluid speed) of the heat medium in the working chamber 311 from the first axial end 311b to the second axial end 311a. Therefore, it is possible to keep the magnetic working material 30 in the isothermal condition.

In addition, in the fourth step, the magnetic field applied to the magnetic working material 30 is decreased depending on the moving speed (the fluid speed) of the heat medium in the working chamber 311 from the second axial end 311a to the first axial end 311b. It is, therefore, possible to keep the magnetic working material 30 in the isothermal condition.

Accordingly, it is possible in the second and fourth steps to maintain the coefficient of thermal conductivity between the magnetic working material 30 and the heat medium at the high value.

More in detail, the operation of the first and second refrigerant pumps 34A and 34B and the operation of the magnetic-field control unit 32 are synchronized with each other, so that the magnetic field to be applied to the magnetic working material 30 is increased when the heat medium is moved in the working chamber 311 from the first axial end 311b to the second axial end 311a in the second step or the magnetic field applied to the magnetic working material 30 is decreased when the heat medium is moved in the working chamber 311 from the second axial end 311a to the first axial end 311b in the fourth step.

In addition, the operation of the refrigerant pumps 34A and 34B and the operation of the magnetic-field control unit 32 are synchronized with each other, so that the change rate of the magnetic field applied to the magnetic working material 30 becomes larger, as the moving speed (the fluid speed) of the heat medium in the working chamber 311 is higher.

As above, in the second step, as the moving speed of the heat medium becomes higher and the heat transfer from the magnetic working material 30 to the heat medium is higher, the increase rate of the magnetic field to be applied to the magnetic working material 30 is correspondingly made larger so that an amount of the heat energy generated in the magnetic working material 30 is made larger. Accordingly, the magnetic working material 30 is kept in the almost isothermal condition in the second step.

In the similar manner to the second step, in the fourth step, as the moving speed of the heat medium becomes higher and the heat transfer from the heat medium to the magnetic working material 30 is higher, the decrease rate of the magnetic field applied to the magnetic working material 30 is correspondingly made larger so that a heat absorbing amount in the magnetic working material 30 is made larger. Accordingly, the magnetic working material 30 is kept in the almost isothermal condition in the fourth step.

Figure 10:
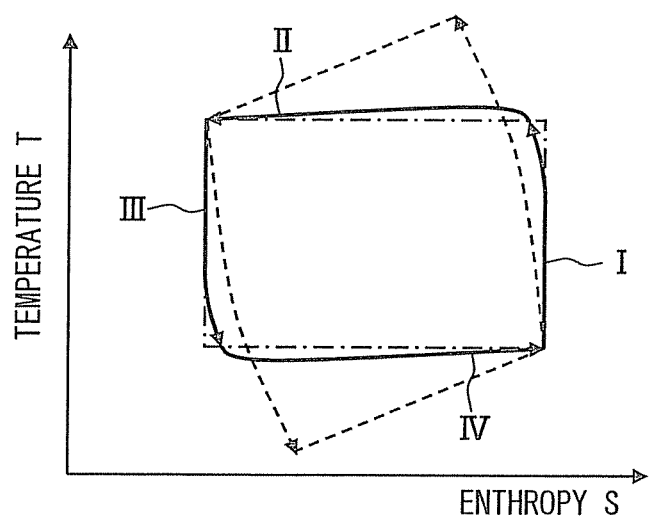
FIG. 10 is a graph showing a characteristic feature of a heat cycle for the magnetic refrigerating system of the present disclosure in a temperature-entropy diagram.

As a result, the operating efficiency of the magnetic refrigerating system 2 can be increased. FIG. 10 is a graph showing a characteristic feature (indicated by a solid line) of the heat cycle of the magnetic refrigerating system 2 in a temperature-entropy diagram. A one-dot-chain line shows the Carnot cycle, which is one of ideal heat cycles in a view point of the operating efficiency. A dotted line shows a characteristic feature of a comparative example, in which the heat medium (the refrigerant) in the working chamber is continuously moved to reciprocate without stopping such reciprocal movement and the degree of the magnetic field is not changed during the operation in which the magnetic field is applied to the magnetic working material.

As explained above, in the magnetic refrigerating system 2 of the present embodiment, the magnetic working material 30 is operated in a magnetic-excitation and adiabatic-change condition in the first step, operated in a magnetic-excitation and isothermal-change condition in the second step, operated in a degaussing and adiabatic-change condition in the third step, and operated in a degaussing and isothermal-change condition in the fourth step.

The Carnot cycle indicated by the one-dot-chain line in FIG. 10, which is one of the ideal heat cycles, is composed of the following processes; an adiabatic excitation process; an isothermal excitation process; an adiabatic degaussing process; and an isothermal degaussing process.

In the magnetic refrigerating system 2 of the present embodiment, the first step "I" can be approximated to the ideal adiabatic excitation process and the second step "II" can be approximated to the ideal isothermal excitation process. Furthermore, the third step "III" can be approximated to the ideal adiabatic degaussing process and the fourth step "IV" can be approximated to the ideal isothermal degaussing process.

As above, the heat cycle of the present embodiment (as indicated by the solid line in FIG. 10) can be approximated to the ideal heat cycle (for example, the Carnot cycle of the one-dot-chain line). Accordingly, it is possible to reduce a degree of diremption from the ideal heat cycle in the respective adiabatic excitation process, isothermal excitation process, adiabatic degaussing process and isothermal degaussing process. Accordingly, the operating efficiency of the magnetic refrigerating system 2 can be increased.

During the second and fourth steps, the magnetic-field control unit 32 changes magnetic resistance in the magnetic circuit passing through the magnetic working material 30 depending on the operational phases of the heat cycle (the heat pump cycle), so as to change the degree of the magnetic field to be applied to the magnetic working material 30. The change rate of the degree of the magnetic field is decided depending on the moving speed of the heat medium (the refrigerant).

The gap 31G, in which the magnetic working material 30 is provided, is formed in the magnetic circuit. The gap 31G is changed by the magnetic-field control unit 32 depending on the operational phase, so as to change the magnetic resistance in the magnetic circuit.

Accordingly, the magnetic-field control unit 32 changes the gap 31G of the magnetic circuit depending on the operational phase, to thereby easily change the magnetic resistance of the magnetic circuit. It is, therefore, possible in the second and fourth steps to easily and surely change the increase-decrease rate of the degree of the magnetic field to be applied to the magnetic working material 30 depending on the phase.

In addition, the pressure accumulating tanks 41a and 41b and the pressure switching valves 42a and 42b are provided. According to such a simple structure, it is possible to easily make the adiabatic state of the first step and to change the operational mode from the first step to the second step, even when the refrigerant pumps 34A and 34B are continuously operated. In the same manner, it is possible to easily make the adiabatic state of the third step and to move on from the third step to the fourth step, while the refrigerant pumps 34A and 34B are continuously operated.

In the first step, the magnetic field to be applied to the magnetic working material 30 is more rapidly increased than that in the second step, while the magnetic field applied to the magnetic working material 30 is more rapidly decreased in the third step than that in the fourth step. Therefore, in the first step, it is possible to form the adiabatic state to thereby rapidly heat up the magnetic working material 30. In the third step, it is possible to form the adiabatic state to thereby rapidly cool down the magnetic working material 30. As a result, the operation, in which the first to fourth steps are repeatedly carried out, can be smoothly done to thereby further increase the operating efficiency of the magnetic heat pump apparatus.

In the present embodiment, the gap 31G is changed depending on the operational phase, so that the magnetic-field control unit 32 changes the magnetic resistance in the magnetic circuit. The present disclosure, however, should not be limited to such a structure of the present embodiment.

Modifications of First Embodiment

Figure 11:
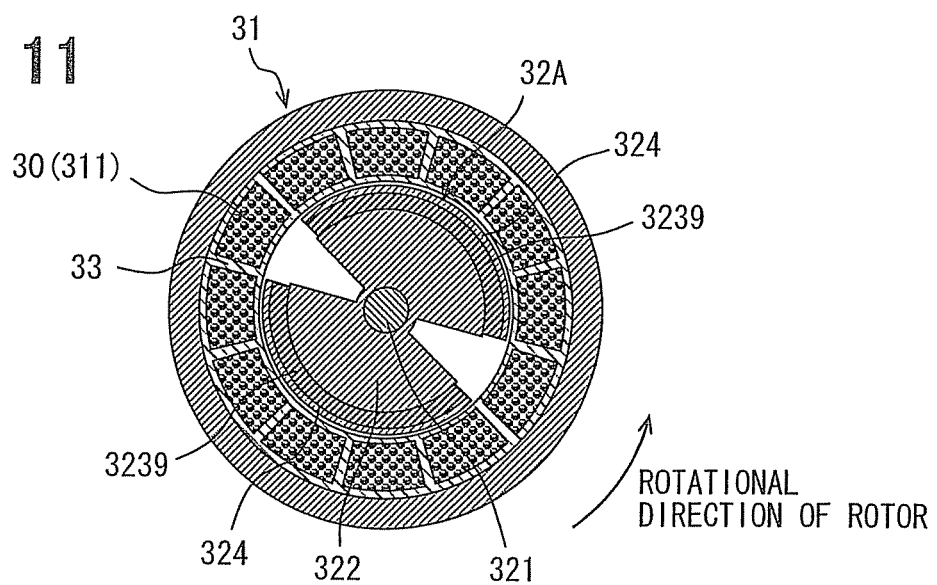
FIG. 11 is a schematic cross sectional view showing a modification of a heat-exchange container device.

For example, the magnetic-field control unit may be modified in a way of a magnetic-field control unit 32A shown in FIG. 11. The magnetic-field control unit 32A has a magnetic resisting member 324, which is attached at the outer peripheral surface of each permanent magnet 3239 and extending in the rotational direction of the rotor 322. The permanent magnet 3239 extends in the rotational direction and has a cross section of an arc shape on a plane perpendicular to the rotational shaft 321. The permanent magnet 3239 has a constant thickness in the radial direction.

Figure 12:
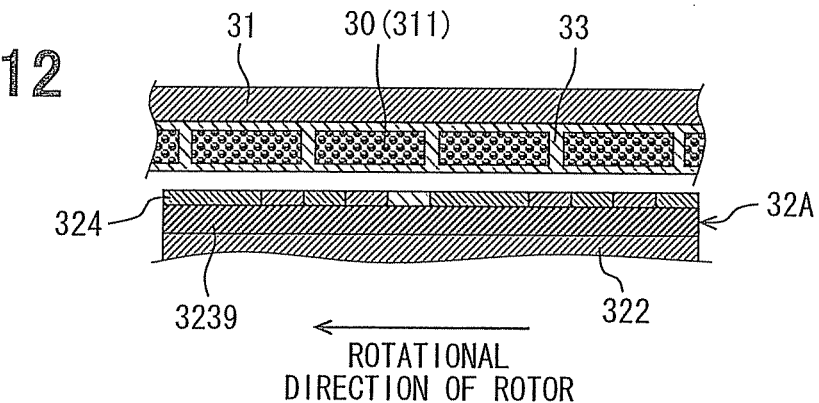
FIG. 12 is an enlarged schematic view, wherein a relevant portion of the heat-exchange container device of FIG. 11 is expanded in a straight direction.

As shown in detail in FIG. 12, in which a relevant portion is expanded in a straight direction, the magnetic resisting member 324 is composed of multiple different materials arranged in the rotational direction of the rotor 322, each of which has a magnetic resistance value different from one another (for example, resin having a large magnetic resistance value and iron having a low magnetic resistance value). A portion of the magnetic resisting member 324, at which the magnetic field to be applied to the magnetic working material 30 should be made larger, is so formed that the magnetic resistance value thereof is smaller. According to such a structure, the magnetic resistance value of the magnetic resisting member 324, which is provided in the magnetic circuit, is changed depending on the operational phase in order to change the magnetic resistance in the magnetic circuit.

According to the above structure, the magnetic-field control unit 32A changes the magnetic resistance value of the magnetic resisting member 324 (provided in the magnetic circuit) depending on the operational phase, to thereby change the magnetic resistance of the magnetic circuit. Therefore, in the second and fourth steps, it is possible to easily and surely change the increase-decrease rate of the degree of the magnetic field applied to the magnetic working material 30 depending on the operational phase.

Figure 13:
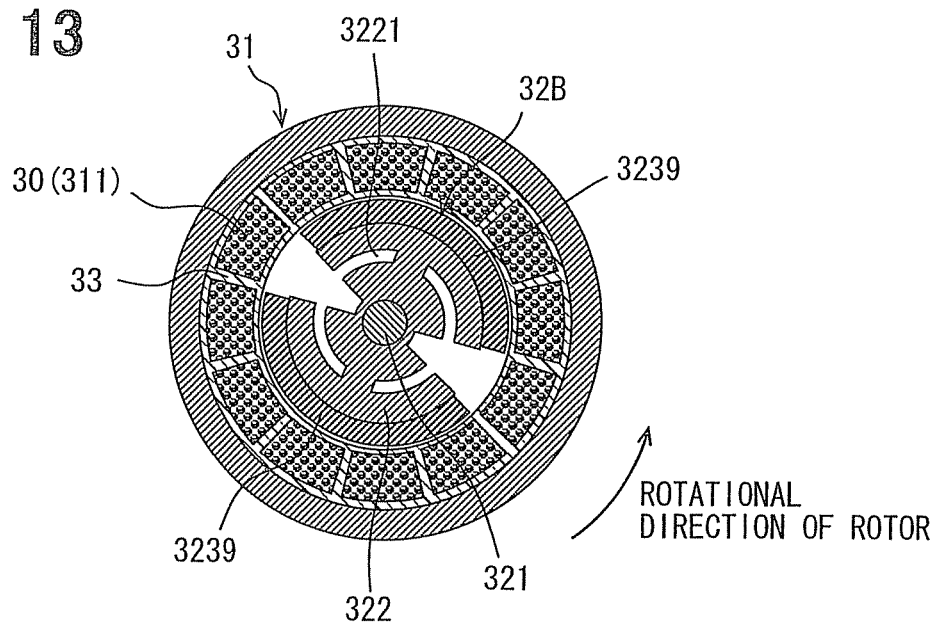
FIG. 13 is a schematic cross sectional view showing another modification of a heat-exchange container device.

The magnetic-field control unit 32 may be further modified in a way of a magnetic-field control unit 32B shown in FIG. 13. In the magnetic-field control unit 32B, notched portions 3221 are formed in the rotor 322, which forms a part of the yoke. Each of the notched portions 3221 extends in the circumferential direction (that is, the rotational direction of the rotor) and in the axial direction.

Figure 14:
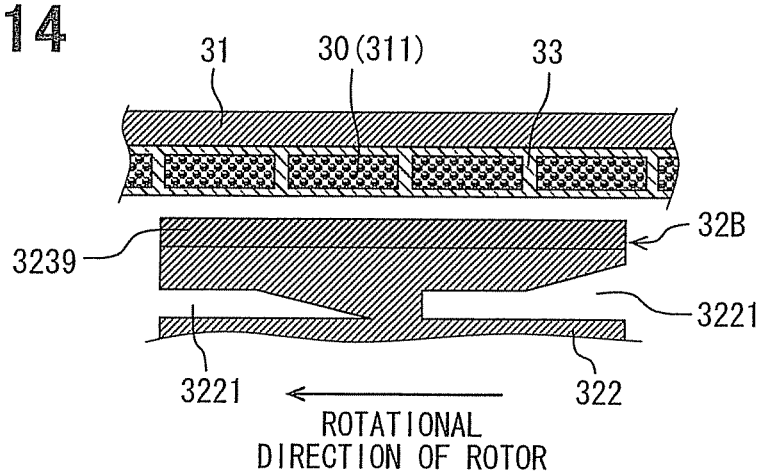
FIG. 14 is an enlarged schematic view, wherein a relevant portion of the heat-exchange container device of FIG. 13 is expanded in a straight direction.

As shown more in detail in FIG. 14, in which a relevant portion is expanded in a straight direction, a space dimension of the notched portion 3221 in the radial direction is changed along the rotational direction of the rotor. The space dimension of the notched portion 3221 becomes smaller at such a portion, at which the magnetic field to be applied to the magnetic working material 30 should be made larger. A minimum value of the space dimension is zero at an intermediate portion. According to the above structure (the space dimension is changed along the rotational direction), it is also possible to change the magnetic resistance of the magnetic circuit depending on the operational phase.

As above, in the magnetic-field control unit 32B, the space dimension of the yoke (the rotor 322) provided in the magnetic circuit is changed depending on the operational phase, so that the magnetic resistance in the magnetic circuit is changed. Therefore, in the second and fourth steps, it is possible to easily and surely change the increase-decrease rate of the degree of the magnetic field applied to the magnetic working material 30 depending on the operational phase.

In the modification shown in FIGS. 13 and 14, the notched portion 3221 is an empty space. However, magnetic resisting material may be filled in the notched portion 3221.

In addition, the permanent magnet of the magnetic-field control unit may have different magnetic characteristics along the rotational direction of the rotor depending on the operational phase of the heat cycle (the heat pump cycle), in order that the change rate for the degree of the magnetic field is set depending on the moving speed of the heat medium (the refrigerant) in the second and fourth steps.

For example, the magnetic-field control unit 32 may be further modified in a way of a magnetic-field control unit 32C shown in FIG. 15.

According to the magnetic-field control unit 32C, the permanent magnet 3231 is composed of multiple magnet pieces, which are arranged in the rotational direction of the rotor 322. Magnetic characteristics of the multiple magnet pieces are different from one another. One or some of the magnet pieces, which are located at such portions at which the magnetic field to be applied to the magnetic working material 30 should be made larger, have larger residual magnetic flux density or larger magnetic holding force than that of the other magnet pieces.

In the above structure, the magnetic-field control unit 32C changes either the residual magnetic flux density or the magnetic holding force of the permanent magnet 3231 depending on the operational phase. Therefore, in the second and fourth steps, it is possible to easily and surely change the increase-decrease rate of the degree of the magnetic field applied to the magnetic working material 30 depending on the operational phase.

In addition, the magnetic-field control unit 32 may be further modified in a way of a magnetic-field control unit 32D shown in FIG. 16.

According to the magnetic-field control unit 32D, a permanent magnet 3232 is composed of multiple magnet pieces, which are arranged in the rotational direction of the rotor 322. Magnetizing directions of the multiple magnet pieces are different from one another. In FIG. 16, each arrow designates the magnetizing direction for the respective magnet pieces. With such an arrangement of the magnet pieces, the same effect to that of the magnetic-field control unit 32C can be obtained.

In the modifications shown in FIGS. 15 and 16, each of the permanent magnets 3231 and 3232 is composed of the multiple magnet pieces. However, one permanent magnet may be used for the permanent magnet 3231 or 3232, in which (in one magnet) different magnetic characteristics are realized.

Furthermore, the magnetic-field control unit 32 may be modified in a way of a magnetic-field control unit 32E shown in FIG. 17.

As shown in FIG. 17, in which a relevant portion of the magnetic-field control unit 32E is expanded in a straight direction, a permanent magnet 3233 extending in the rotational direction of the rotor is provided. A thickness of the permanent magnet 3233 in the radial direction is changed along the rotational direction of the rotor. The thickness of the permanent magnet 3233 is made larger at such a portion, at which the magnetic field to be applied to the magnetic working material 30 should be made larger.

According to the above structure, the magnetic-field control unit 32E changes the thickness of the permanent magnet 3233 depending on the operational phase, so that the magnetic resistance in the magnetic circuit is changed. Therefore, in the second and fourth steps, it is possible to easily and surely change the increase-decrease rate of the degree of the magnetic field applied to the magnetic working material 30 depending on the operational phase.

In the above modification of FIG. 17, the thickness is changed for one permanent magnet. However, the permanent magnet may be composed of multiple magnet pieces, thicknesses of which are different from one another.

It is also possible to combine the above modifications to one another in order to change the degree of the magnetic field as well as the increase-decrease rate for the degree of the magnetic field to be applied to the magnetic working material 30 depending on the operational phase. In other words, more than two of the following parameters may be changed depending on the operational phase. Those parameters are the dimension of the gap 31G, the magnetic resistance value of the magnetic resisting member 324, the space dimension of the notched portion 3221, the residual magnetic flux density of the permanent magnet, the magnetic holding force of the permanent magnet, the magnetizing directions of the permanent magnet, the thickness of the permanent magnet in the radial direction, and so on.

Second Embodiment

A second embodiment of the present disclosure will be explained with reference to FIGS. 18 and 19.

A fluid-speed pattern of the heat medium as well as an applying pattern of the magnetic field of the second embodiment is different from those of the first embodiment. The same reference numerals to the first embodiment are used in the second embodiment.

Figure 18:
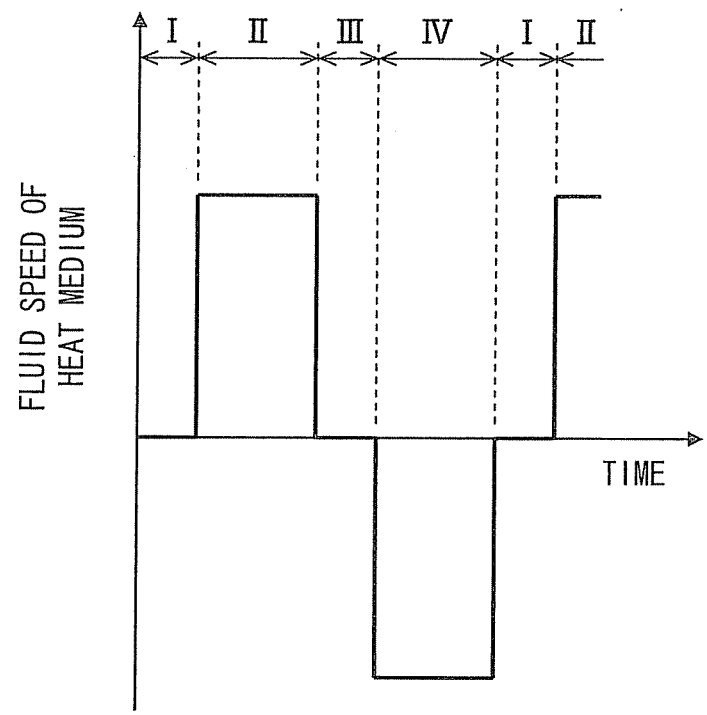
FIG. 18 is a graph showing a fluid speed of heat medium in a working chamber according to a second embodiment of the present disclosure.

FIG. 18 is a graph showing a change of fluid speed of the heat medium in the working chamber 311 of the present embodiment. FIG. 19 is a graph showing a change of the magnetic field to be applied to the magnetic working material 30 in the working chamber 311.

A magnetic refrigerating system of the present embodiment is almost the same to that of the first embodiment. The fluid-speed pattern of FIG. 18 is obtained in the present embodiment, in which a shape of the swash plate 342 is changed a bit.

In the first embodiment, six different magnetic-field control units 32 (including the modifications 32A to 32E) are explained, according to each of which the degree of the magnetic field to be applied to the magnetic working material 30 as well as the increase-decrease rate of the degree of the magnetic field is changed depending on the respective operating phases. According to the present embodiment, the applying pattern of the magnetic field of FIG. 19 is obtained, in which one or more than one of the six magnetic-field control units 32 (and 32A to 32E) are combined with the other magnetic-field control unit 32 (and 32A to 32E).

In the first and third steps "I" and "III", the magnetic refrigerating system of the present embodiment operates in the same manner to those of the first embodiment.

In the second step, the refrigerant flows at once into the working chamber 311 of the first axial end 311b from the first pressure accumulating tank 41a by its accumulated pressure energy, in addition to the refrigerant pumped out from the first refrigerant pump 34A. Then, the flow of the refrigerant of a constant fluid speed is formed in the working chamber 311 from the first axial end 311b to the second axial end 311a, as indicated by "II" in FIG. 18.

The second refrigerant pump 34B sucks the refrigerant from the high-temperature side refrigerant circuit 4 into the cylinder bore (the pump chamber) 344b. The refrigerant (the heat medium), which is heated up by the magnetic working material 30, flows out from the working chamber 311 of the second axial end 311a to the high-temperature side refrigerant circuit 4.

Figure 19:
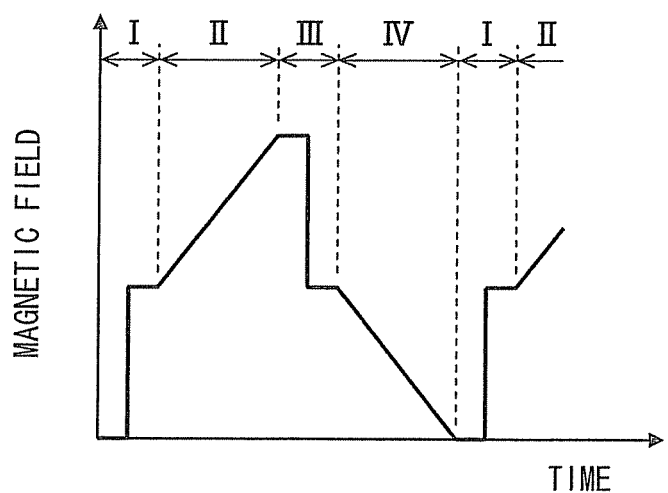
FIG. 19 is a graph showing a magnetic field applied to magnetic working material in the working chamber of the second embodiment.

During the operation of the second step, the magnetic field applied by the permanent magnet 323 to the magnetic working material 30 is further increased gradually from the magnetic field of the first step (more exactly, the magnetic field at the end of the first step), as indicated by "II" in FIG. 19.

In other words, the pressure difference between the first refrigerant inlet port 313a and the working chamber 311 is increased in the first step operation. And when such pressure difference becomes larger than the predetermined value, the magnetic field applied to the magnetic working material 30 is gradually increased (without being decreased) from the degree of the magnetic field at the end of the first step. The second step operation is thereby carried out, in which the heat medium (the refrigerant) is moved in the working chamber 311 from the first axial end 311b to the second axial end 311a. In the second step, the heat energy of the magnetic working material 30, the temperature of which is increased in the first step, is transferred to the heat medium (the refrigerant) and moved to the second axial end 311a.

In the second step, the magnetic field to be applied to the magnetic working material 30 is gradually increased depending on the fluid speed of the heat medium (the refrigerant) in the working chamber 311, so that the heat energy generated in the magnetic working material 30 in the second step is transferred to the heat medium. Accordingly, the magnetic working material 30 is held in the almost isothermal condition. The coefficient of thermal conductivity between the magnetic working material 30 and the heat medium is maintained at the high value during the second step.

In the fourth step, the refrigerant flows at once into the working chamber 311 on the side of the second axial end 311a from the second pressure accumulating tank 41b by its accumulated pressure energy, in addition to the refrigerant pumped out from the second refrigerant pump 34B. Then, the flow of the refrigerant of a constant fluid speed is formed in the working chamber 311 from the second axial end 311a to the first axial end 311b, as indicated by "IV" in FIG. 18.

The first refrigerant pump 34A sucks the refrigerant from the low-temperature side refrigerant circuit 5 into the cylinder bore (the pump chamber) 344a. The refrigerant (the heat medium), which is cooled down by the magnetic working material 30, flows out from the working chamber 311 on the side of the first axial end 311b to the low-temperature side refrigerant circuit 5.

During the operation of the fourth step, the magnetic field applied by the permanent magnet 323 to the magnetic working material 30 is further decreased gradually from the magnetic field of the third step (the magnetic field at the end of the third step) to a condition in which the magnetic field becomes almost zero, as indicated by "IV" in FIG. 19.

In other words, the pressure difference between the second refrigerant inlet port 312a and the working chamber 311 is increased in the fourth step operation. And when such pressure difference becomes larger than the predetermined value, the magnetic field applied to the magnetic working material 30 is gradually decreased (without being increased) from the magnetic field at the end of the third step. The fourth step operation is thereby carried out, in which the heat medium (the refrigerant) is moved in the working chamber 311 from the second axial end 311a to the first axial end 311b. In the fourth step, the cold energy of the magnetic working material 30, the temperature of which is decreased in the third step, is transferred to the heat medium (the refrigerant) and moved to the first axial end 311b.

In the fourth step, the magnetic field to be applied to the magnetic working material 30 is gradually decreased depending on the fluid speed of the heat medium (the refrigerant) in the working chamber 311, so that the cold energy generated in the magnetic working material 30 in the fourth step is also transferred to the heat medium. Accordingly, the magnetic working material 30 is held in the almost isothermal condition. The coefficient of thermal conductivity between the magnetic working material 30 and the heat medium is maintained at the high value during the fourth step.

According to the above structure and operation, the first to fourth steps are repeatedly carried out, so that the heat energy, which is absorbed by the cooling-side heat exchanger 12, will be radiated at the heating-side heat exchanger 13.

In the first step, the movement of the heat medium (the refrigerant) is stopped in the working chamber 311 to thereby form the adiabatic state and the magnetic field to be applied to the magnetic working material 30 is increased. Therefore, it is possible to increase the temperature of the magnetic working material 30.

In the second step, the heat medium (the refrigerant) is moved in the working chamber 311 from the first axial end 311b to the second axial end 311a. Therefore, it is possible to transfer the heat energy from the magnetic working material 30 (the temperature of which is increased in the first step and in the second step) to the heat medium to thereby move the heat energy to the second axial end 311a.

In the third step, the movement of the heat medium (the refrigerant) is again stopped in the working chamber 311 to thereby form the adiabatic state and the magnetic field applied to the magnetic working material 30 is decreased. Therefore, it is possible to decrease the temperature of the magnetic working material 30.

In the fourth step, the heat medium (the refrigerant) is moved in the working chamber 311 from the second axial end 311a to the first axial end 311b. Therefore, it is possible to transfer the cold energy from the magnetic working material 30 (the temperature of which is decreased in the third step and in the fourth step) to the heat medium to thereby move the heat energy to the first axial end 311b.

In the second step, the magnetic field to be applied to the magnetic working material 30 is increased depending on the moving speed (the fluid speed) of the heat medium in the working chamber 311 from the first axial end 311b to the second axial end 311a. Therefore, it is possible to hold the magnetic working material 30 in the isothermal condition.

In addition, in the fourth step, the magnetic field applied to the magnetic working material 30 is decreased depending on the moving speed (the fluid speed) of the heat medium in the working chamber 311 from the second axial end 311a to the first axial end 311b. It is, therefore, possible to keep the magnetic working material 30 in the isothermal condition.

Accordingly, it is possible in the second and fourth steps to maintain the coefficient of thermal conductivity between the magnetic working material 30 and the heat medium at the high value.

As in the same manner to the first embodiment, in the second embodiment, the operating efficiency of the magnetic refrigerating system 2 can be increased.

Accordingly, in the magnetic refrigerating system of the present embodiment, the magnetic working material 30 is operated in the magnetic-excitation and adiabatic-change condition in the first step, the magnetic working material 30 is operated in the magnetic-excitation and isothermal-change condition in the second step, the magnetic working material 30 is operated in the degaussing and adiabatic-change condition in the third step, and the magnetic working material 30 is operated in the degaussing and isothermal-change condition in the fourth step. Therefore, the heat cycle of the present embodiment can be approximated to the ideal heat cycle, as shown by the solid line in FIG. 10.

Third Embodiment

A third embodiment of the present disclosure will be explained with reference to FIG. 20.

The third embodiment differs from the first embodiment in that the heat-exchange container device 31 is divided into two container units, one of which is a high-temperature side container unit 31a for generating heat energy by the magnetocaloric effect and the other of which is a low-temperature side container unit 31b for generating cold energy by the magnetocaloric effect. In the same manner to the second embodiment, the same reference numerals for designating the same and/or similar parts and components are used in the present embodiment.

Figure 20:
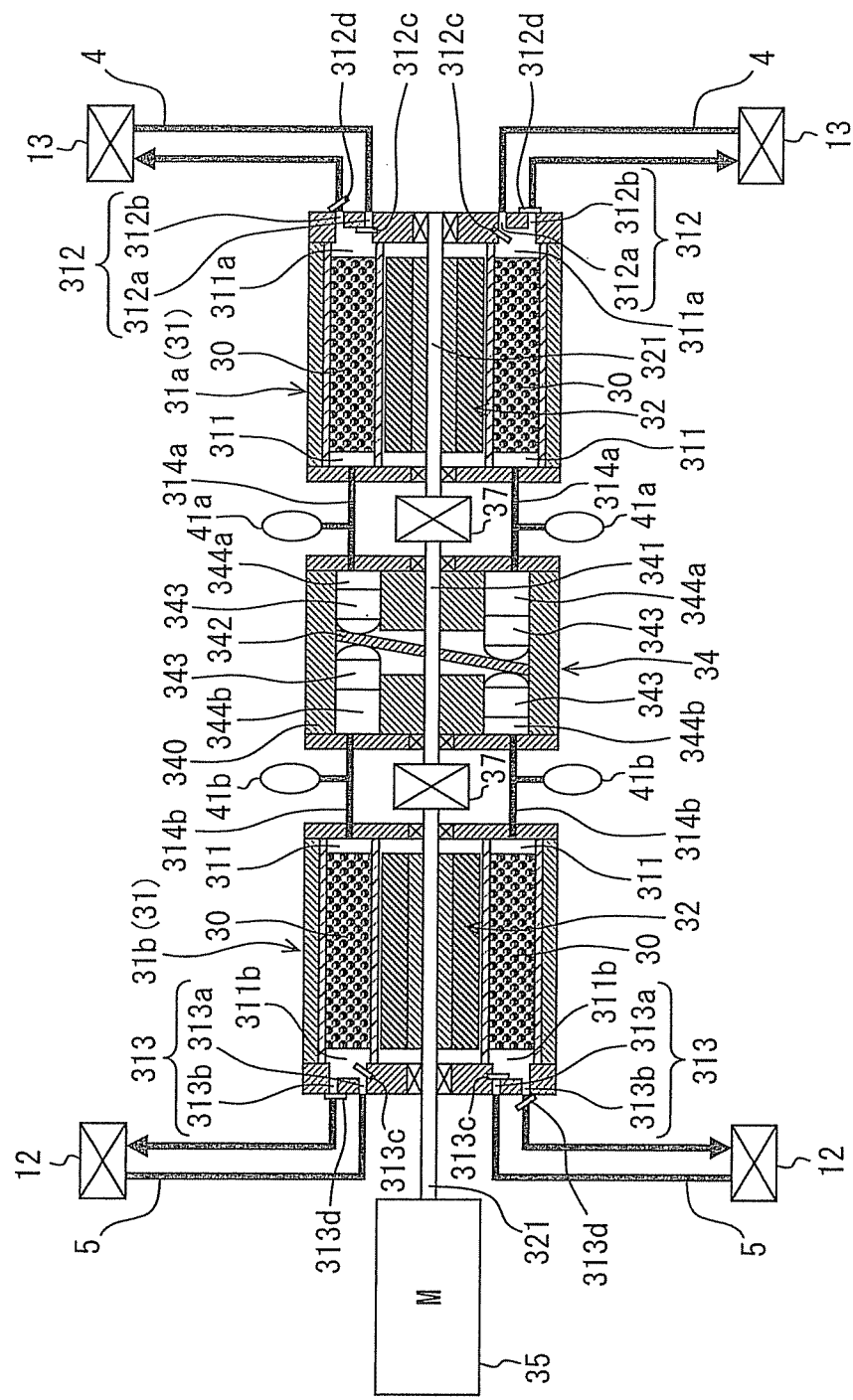
FIG. 20 is a schematic structure of a magnetic refrigerating system, to which a magnetic heat pump apparatus according to a third embodiment of the present disclosure is applied.

As shown in FIG. 20, the high-temperature side and the low-temperature side container units 31a and 31b are coaxially arranged with one refrigerant pump 34, wherein the refrigerant pump 34 is arranged between the container units 31a and 31b.

Each of the container units 31a and 31b is formed in a cylindrical hollow shape. Multiple working chambers 311 are formed in each of the container units 31a and 31b at its inner peripheral portion and arranged in the circumferential direction, so as to respectively accommodate the magnetic working material 30. The heat medium (the refrigerant) passes through the respective working chambers 311.

A pair of inlet-outlet ports 312 is provided in an axial end 311a (the second axial end) of each working chamber 311 of the container unit 31a on a side opposite to the refrigerant pump 34 (on a right-hand side in the drawing), while another pair of inlet-outlet ports 313 is provided in an axial end 311b (the first axial end) of each working chamber 311 of the other container unit 31b on a side opposite to the refrigerant pump 34 (on a left-hand side in the drawing). The refrigerant is sucked into or discharged from the working chamber through such pair of the inlet-outlet ports 312 or 313.

Multiple pairs of the inlet-outlet ports 312 are provided in the high-temperature side container unit 31a and each pair of the inlet-outlet ports 312 is communicated to the respective working chambers 311.

Each pair of the inlet-outlet ports 312 is composed of a refrigerant inlet port 312a and a refrigerant outlet port 312b. A suction valve 312c is provided for each refrigerant inlet port 312a, wherein the suction valve 312c is opened when the refrigerant is sucked into the working chamber 311. A discharge valve 312d is likewise provided for each refrigerant outlet port 312b, so that the discharge valve 312d is opened when the refrigerant is discharged from the working chamber 311.

In a similar manner, multiple pairs of the inlet-outlet ports 313 are provided in the low-temperature side container unit 31b and each pair of the inlet-outlet ports 313 is communicated to the respective working chambers 311.

Each pair of the inlet-outlet ports 313 is composed of a refrigerant inlet port 313a and a refrigerant outlet port 313b. A suction valve 313c is provided for each refrigerant inlet port 313a, wherein the suction valve 313c is opened when the refrigerant is sucked into the working chamber 311. A discharge valve 313d is likewise provided for each refrigerant outlet port 313b, so that the discharge valve 313d is opened when the refrigerant is discharged from the working chamber 311.

Multiple connecting pipes 314a are provided between each cylinder bore (pump chamber) 344a of the refrigerant pump 34 and each working chamber 311 of the high-temperature side container unit 31a on a side to the refrigerant pump 34 (that is, on a left-hand side of the container unit 31a in the drawing).

In a similar manner, multiple connecting pipes 314b are provided between each cylinder bore (pump chamber) 344b of the refrigerant pump 34 and each working chamber 311 of the low-temperature side container unit 31b on a side to the refrigerant pump 34 (that is, on a right-hand side of the container unit 31b in the drawing). The inside structure of each container unit 31a or 31b is basically identical to that of the first embodiment. The explanation thereof is omitted.

The rotational shaft 321 for the high-temperature side container unit 31a outwardly extends toward the refrigerant pump 34, so that the rotational shaft 321 is connected to the driving shaft 341 of the refrigerant pump 34 via the speed changing device 37.

In a similar manner, one end of the rotational shaft 321 for the low-temperature side container unit 31b outwardly extends toward the refrigerant pump 34, so that the rotational shaft 321 is connected to the driving shaft 341 of the refrigerant pump 34 via the speed changing device 37. In addition, the other end of the rotational shaft 321 outwardly extends to the electric motor 35 (in the direction opposite to the refrigerant pump 34), so that the other end of the rotational shaft 321 is connected to the electric motor 35.

The refrigerant pump 34 constitutes the refrigerant moving device, which moves the refrigerant so as to reciprocate between the inlet-outlet ports 312 of the high-temperature side container unit 31a and the inlet-outlet ports 313 of the low-temperature side container unit 31b. In the present embodiment, one tandem-type piston pump is used as the refrigerant pump 34, wherein two compression mechanisms (provided at both sides of the swash plate 342) are coaxially operated by one driving shaft 341.

More in detail, the refrigerant pump 34 of the present embodiment is composed of; the housing 340; the driving shaft 341 rotatably supported in the housing 340; the swash plate 342 attached to the driving shaft 341 in the inclined manner so that the swash plate 342 is rotated together with the driving shaft 341; multiple pistons 343 reciprocating in accordance with the rotation of the swash plate 342; and multiple cylinder bores 344a and 344b formed in the housing 340 at both sides of the swash plate 342.

Each of the axial ends of the driving shaft 341 outwardly extends from the housing 340 and is respectively connected to the rotational shafts 321 for the high-temperature and low-temperature side container units 31a and 31b via the speed changing device 37.

Multiple cylinder bores 344 are composed of the high-temperature side cylinder bores 344a, each of which is connected to the respective working chambers 311 of the high-temperature side container unit 31a via the respective connecting pipes 314a, and the low-temperature side cylinder bores 344b, each of which is connected to the respective working chambers 311 of the low-temperature side container unit 31b via the respective connecting pipes 314b. The refrigerant in the cylinder bore 344a (for the high-temperature side) and the refrigerant in the cylinder bore 344b (for the low-temperature side) are thermally connected to each other via the housing 340, the swash plate 342, the pistons 343 and so on. The housing 340, the swash plate 342 and the pistons 343 are preferably made of such material having high coefficient of thermal conductivity (for, example, copper, aluminum or the like).

Each of the suction valves 312c and 313c and each of the discharge valves 312d and 313d are provided for the purpose of preventing reverse flow of the refrigerant in each of the high-temperature side refrigerant circuit 4 and the low-temperature side refrigerant circuit 5, like the check valves 43a and 43b of the first embodiment.

According to the present embodiment, each of the discharge valves 312d and 313d is operated as the pressure valve device, which is opened when the difference pressure between the working chamber 311 and the refrigerant circuit 4 or 5 becomes larger than the predetermined value. As in the same manner to the first embodiment, the pressure accumulating tanks 41a and 41b are respectively provided in the connecting pipes 314a and 314b. In the present embodiment, the pressure accumulating tanks 41a and 41b and the discharge valves 312d and 313d are collectively referred to as the heat-medium-movement prohibiting unit.

According to the structure of the present embodiment, when the magnetic-field control units 32 in the container units 31a and 31b as well as the refrigerant pump 34 are continuously operated by the electric motor 35, the magnetic working material 30 is respectively operated in the magnetic-excitation and adiabatic-change condition in the first step, in the magnetic-excitation and isothermal-change condition in the second step, in the degaussing and adiabatic-change condition in the third step, and in the degaussing and isothermal-change condition in the fourth step. As a result, the same effects to the first embodiment can be obtained.

In the above first to third embodiments, it is possible to prohibit the movement of the heat medium (the refrigerant) in the first and third steps, when the shape of the swash plate 342 of the refrigerant pump is accordingly formed. In such a case, the magnetic working material 30 can be operated in the adiabatic-change condition in the first and third steps, without providing the pressure accumulating tanks 41a and 41b.

Fourth Embodiment

A fourth embodiment of the present disclosure will be explained with reference to FIGS. 21 to 26.

The fourth embodiment differs from the first to third embodiments in that the magnetic working material will not be operated in the adiabatic state in the first and third steps of the heat cycle.

Figure 21:
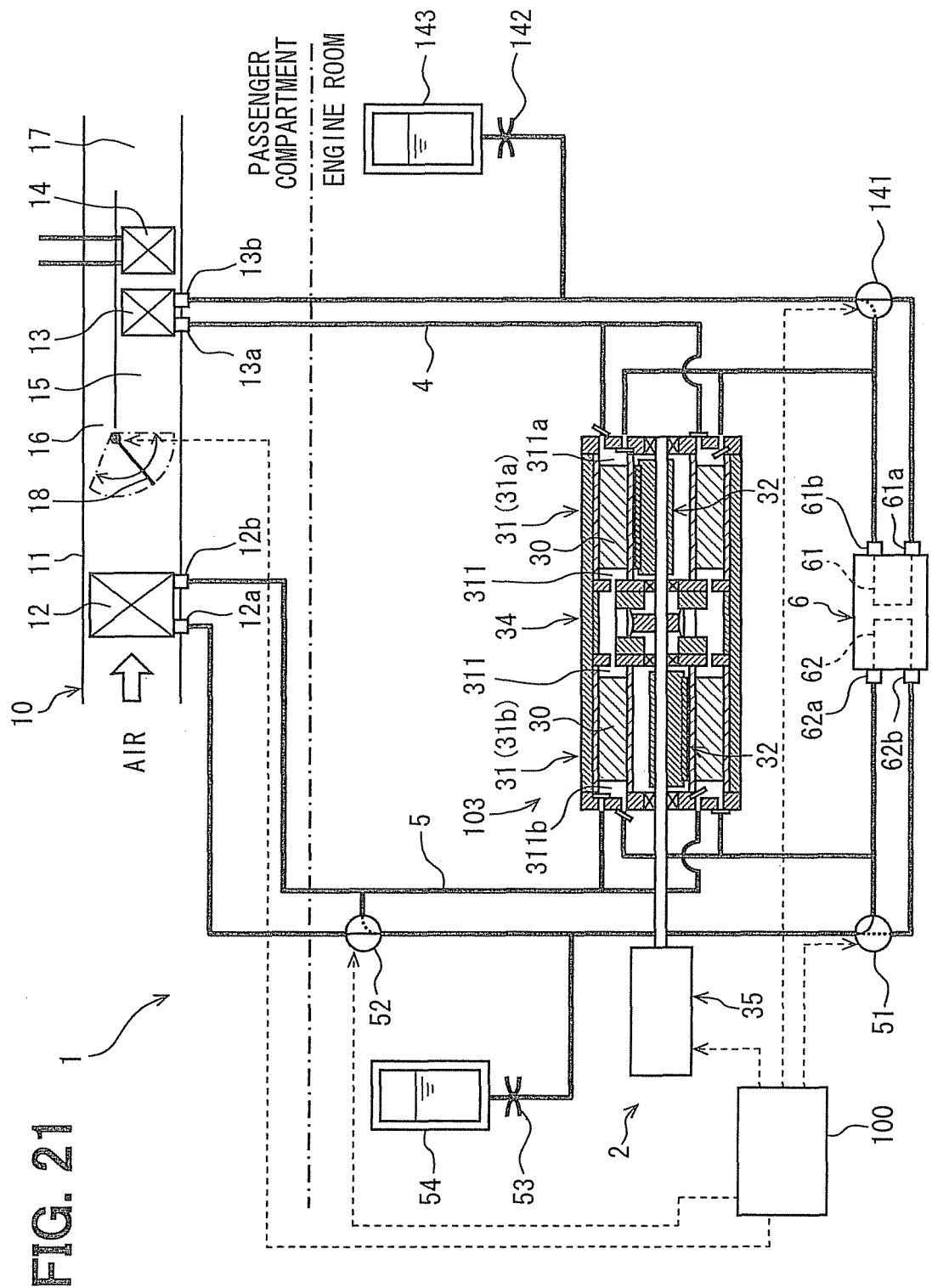
FIG. 21 is a schematic structure of an air conditioning apparatus for a vehicle equipped with a magnetic refrigerating system, to which a magnetic heat pump apparatus according to a fourth embodiment of the present disclosure is applied.
Figure 22:
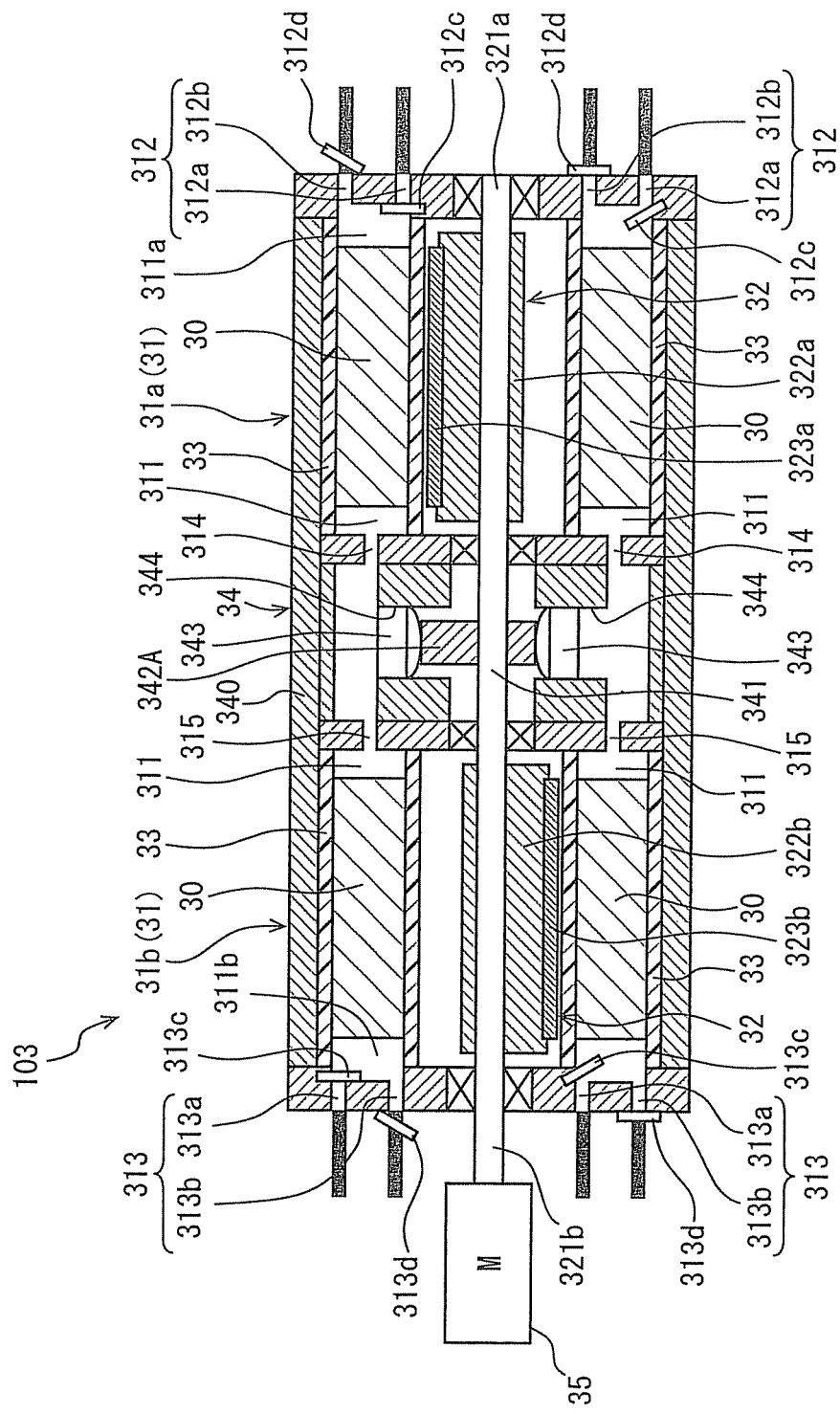
FIG. 22 is an enlarged cross sectional view showing the magnetic refrigerating system according to the fourth embodiment.
Figure 23:
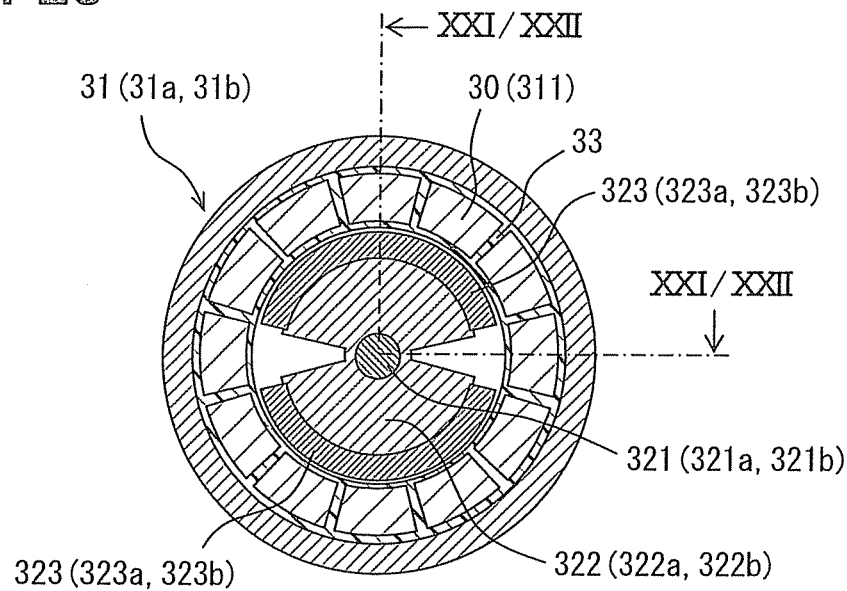
FIG. 23 is a schematic cross sectional view showing a heat-exchange container device of the fourth embodiment.

FIG. 21 is a schematic view showing an outlined structure of an air conditioning apparatus 1, which has a magnetic refrigerating system (also referred to as a magnetic heat pump system) according to the fourth embodiment of the present disclosure. FIG. 22 is an enlarged cross sectional view showing a magnetic refrigerating device 103 of the magnetic refrigerating system 2. FIG. 23 is a cross sectional view of the of the magnetic refrigerating device 103 taken along a plane perpendicular to an axis thereof. Each of the cross sectional views of the magnetic refrigerating device 103 of FIGS. 21 and 22 corresponds to a cross section taken along a line XXI/XXII-XXI/XXII in FIG. 23.

According to the present embodiment, the magnetic heat pump system 2 is applied to the air conditioning apparatus 1 for the vehicle, which receives a vehicle-driving force from an internal combustion engine.

The air conditioning apparatus 1 has the magnetic refrigerating system 2 arranged in an engine room of the vehicle, an air conditioning unit 10 arranged in a passenger compartment of the vehicle, and an air conditioning control unit 100.

A refrigerant circuit of the magnetic refrigerating system 2 is switched to a cooling mode for cooling the passenger compartment, a heating mode for heating the passenger compartment, and a dehumidifying mode for dehumidifying the air in the passenger compartment. The air conditioning apparatus 1 carries out the cooling operation, the heating operation and/or the dehumidifying operation.

The magnetic refrigerating system 2 shown in FIG. 21 is of the AMR (Active Magnetic Refrigerator) type, according to which cold energy as well as heat energy generated by the magnetocaloric effect is stored in the magnetic working material 30. The magnetic refrigerating system 2 of the present embodiment is composed of the magnetic refrigerating device 103, the high-temperature side refrigerant circuit 4 and the low-temperature side refrigerant circuit 5. The magnetic refrigerating device 103 generates the cold and heat energy by the magnetocaloric effect. The heat medium (for example, water including anti-freeze liquid or the like, hereinafter also referred to as the refrigerant) is heated up by the heat energy generated by the magnetic refrigerating device 103 and such heat medium is circulated in the high-temperature side refrigerant circuit 4 (also referred to as the second refrigerant circuit) through the heating-side heat exchanger 13 (the heat radiating device). The heat medium (the refrigerant), which is cooled down by the cold energy generated by the magnetic refrigerating device 103, is circulated in the low-temperature side refrigerant circuit 5 (also referred to as the first refrigerant circuit) through the cooling-side heat exchanger 12 (the heat absorbing device).

The magnetic refrigerating device 103 is composed of the heat-exchange container device 31 (container unit portions 31a and 31b), the magnetic-field control units 32, the refrigerant pump 34, the electric motor 35 and so on. The multiple working chambers 311 are formed in each of the container unit portions 31a and 31b, in which the magnetic working material 30 having the magnetocaloric effect is respectively accommodated and through which the heat medium (the refrigerant) passes. Each of the magnetic-field control units 32 applies the magnetic field to the magnetic working material 30 and removes the magnetic field applied to the magnetic working material 30. The refrigerant pump 34 (the pump device or the refrigerant moving device) moves the heat medium (the refrigerant) in the heat-exchange container device 31. The electric motor 35 drives the magnetic refrigerating device 103.

As shown in FIG. 22, the container device 31 is divided into two container unit portions, one of which is the container unit portion 31a of the high-temperature side for generating heat energy by the magnetocaloric effect and the other of which is the container unit portion 31b of the low-temperature side for generating cold energy by the magnetocaloric effect. The container unit portions 31a and 31b are coaxially arranged with each other via the refrigerant pump 34.

In the present embodiment, the container unit portion 31a of the high-temperature side, the container unit portion 31b of the low-temperature side and the refrigerant pump 34 are integrally formed with one another, wherein those components 31a, 31b and 34 are accommodated in the common housing 340.

Each of the container unit portions 31a and 31b is composed of a cylindrical hollow container. The multiple working chambers 311, in each of which the magnetic working material 30 is filled and through which the heat medium (the refrigerant) passes, are provided in the inner peripheral area of the respective container unit portions 31a and 31b. As shown in FIG. 23, the multiple working chambers 311 (twelve chambers in the present embodiment) are arranged at equal intervals in the circumferential direction.

As shown in FIG. 22, a pair of inlet-outlet ports 312 is provided in an axial end 311a (the second axial end) of each working chamber 311 of the container unit portion 31a on a side opposite to the refrigerant pump 34 (on a right-hand side in the drawing), while another pair of inlet-outlet ports 313 is provided in an axial end 311b (the first axial end) of each working chamber 311 of the other container unit portion 31b on a side opposite to the refrigerant pump 34 (on a left-hand side in the drawing). The refrigerant is sucked into or discharged from the working chamber 311 through such pair of the inlet-outlet ports 312 and 313.

Multiple pairs of the inlet-outlet ports 312 are provided in the high-temperature side container unit portion 31a and each pair of the inlet-outlet ports 312 is communicated to the respective working chambers 311. Multiple pairs of the inlet-outlet ports 313 are provided in the low-temperature side container unit portion 31b and each pair of the inlet-outlet ports 313 is communicated to the respective working chambers 311.

In FIG. 22, two pairs of the inlet-outlet ports 312, which are connected to the container unit portion 31a of the high-temperature side, are shown, wherein one pair of them 312 is connected to the working chamber 311 in an upper side of the drawing, while the other pair of them 312 is connected to the working chamber 311 in a lower side of the drawing.

Each of the inlet-outlet ports 312 is composed of the refrigerant inlet port 312a through which the refrigerant is sucked into the container unit portion 31a and the refrigerant outlet port 312b through which the refrigerant is discharged from the container unit portion 31a. A suction valve 312c is provided in each of the refrigerant inlet ports 312a, wherein the suction valve 312c is opened when the refrigerant is sucked into the working chamber 311. A discharge valve 312d is provided in each of the refrigerant outlet ports 312b, wherein the discharge valve 312d is opened when the refrigerant is discharged from the working chamber 311.

In a similar manner, two pairs of the inlet-outlet ports 313, which are connected to the container unit portion 31b of the low-temperature side, are shown in FIG. 22, wherein one pair of them 313 is connected to the working chamber 311 in the upper side of the drawing, while the other pair of them 313 is connected to the working chamber 311 in the lower side of the drawing.

Each of the inlet-outlet ports 313 is composed of the refrigerant inlet port 313a and the refrigerant outlet port 313b. A suction valve 313c is provided in each of the refrigerant inlet ports 313a. A discharge valve 313d is provided in each of the refrigerant outlet ports 313b.

Communication passages 314 and 315 are respectively provided at each side wall of the container unit portions 31a and 31b, so that each of the working chambers 311 is communicated to an inside space of the respective cylinder bore (the pump chamber) 344 of the refrigerant pump 34.

Each of the magnetic-field control units 32 is composed of a rotational shaft 321a (321b), a rotor 322a (322b) fixed to the rotational shaft 321a (321b), and permanent magnets 323a (323b) fixed to the outer periphery of the rotor 322a (322b).

Each of the rotational shafts 321a and 321b is rotatably supported by bearing members provided at the axial side walls of the container unit portions 31a and 31b.

The rotational shaft 321a (of the high-temperature side) and the rotational shaft 321b (of the low-temperature side) are integrally formed with the driving shaft 341 of the refrigerant pump 34.

An axial end of the rotational shaft 321b (of the low-temperature side) outwardly extends in the direction opposite to the refrigerant pump 34, so that the axial end is connected to the electric motor 35 which rotates the rotational shafts 321a and 321b as well as the driving shaft 341.

Each of the permanent magnets 323a and 323b is fixed to the respective outer periphery of the rotors 322a and 322b to form a gap between an outer peripheral surface of the magnets 323a and 323b and an inner peripheral surface of the respective container unit portions 31a and 31b. The rotors 322a and 322b are fixed to the respective rotational shafts 321a and 321b, so that each of the rotors 322a and 322b is rotated within each container unit portion 31a and 31b.

In each of the container unit portions 31a and 31b, two permanent magnets 323a (323b) are provided at the outer periphery of the rotor 322a (322b), wherein the permanent magnets 323a (323b) occupy an area of ⅚ (five-sixth) at the outer peripheral space of the rotor 322a (322b). Each of the permanent magnets 323a (323b) periodically approaches to the respective working chambers 311 of the container unit portion 31a (31b) in accordance with rotation of the rotational shaft 321a (321b). A pair of grooves is formed in the rotor 322a (322b) between the permanent magnets 323a (323b), wherein each of the grooves extends in the axial direction.

According to the above structure, in which the container unit portion 31a (31b) and the rotor 322a (322b) are working as the yoke, the magnetic field is respectively generated by the permanent magnets 323a (323b). The magnetic field is applied to the magnetic working material 30 accommodated in such working chamber 311, to which the permanent magnet 323a (323b) has approached. On the other hand the magnetic field, which has been applied to the magnetic working material 30, is removed from the magnetic working material 30 accommodated in such working chamber 311, from which the permanent magnet 323a (323b) is separated in accordance the rotation of the rotational shaft 321a (321b). In each of the container unit portions 31a and 31b, the radial direction corresponds to a direction in which the magnetic field is applied to the magnetic working material 30 accommodated in the respective working chamber 311.

Figure 25:
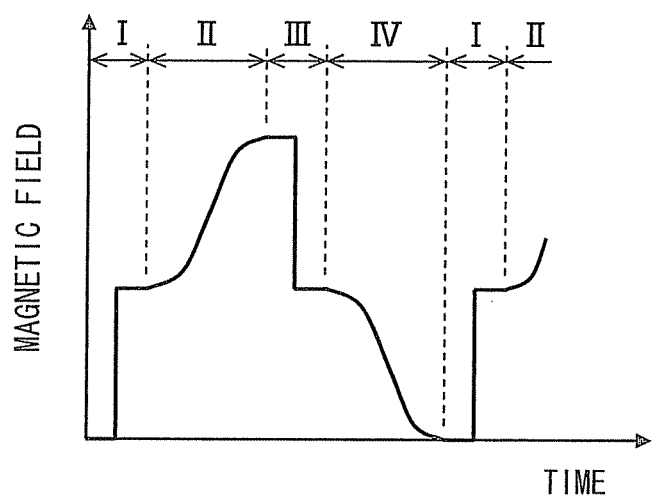
FIG. 25 is a graph showing a magnetic field applied to magnetic working material in the working chamber of the fourth embodiment.

In each of the magnetic-field control units 32, one or more than one parameters of the following parameters can be changed depending on the rotational phase in order to realize the applying patterns of the magnetic field, for example, as shown in FIG. 25, which will be explained below. As in the similar manner to the first embodiment, the parameters include; the dimension of the gap; the magnetic resistance value of the magnetic resisting member; the space dimension of the notched portion; the residual magnetic flux density of the permanent magnet; the magnetic holding force of the permanent magnet; the magnetizing directions of the permanent magnet; and the thickness of the permanent magnet in the radial direction.

The holding members 33, which are made of non-magnetic material (for example, resin), are formed around the respective working chambers 311, so that each of the working chambers 311 is positioned by the respective holding members 33 in each of the container unit portions 31a and 31b.

The refrigerant pump 34 constitutes the refrigerant moving device (the pump device) for moving the refrigerant in the respective container unit portions 31a and 31b, so that the refrigerant is reciprocated between the high-temperature side inlet-outlet ports 312 and the low-temperature side inlet-outlet ports 313. In the present embodiment, a piston pump of a radial-piston type is used as the refrigerant pump 34, according to which multiple pump chambers (corresponding to the number of the working chambers 311) are formed around the driving shaft 341 and arranged at equal intervals in the circumferential direction. A suction-discharge mechanism (including a piston) is provided in each of the pump chambers and operated in the radial direction by a control cam member 342A fixed to the driving shaft 341 in accordance with the rotation of the cam member 342A.

More in detail, as shown in FIG. 22, the refrigerant pump 34 is composed of the housing 340, the driving shaft 341 rotatably supported in the housing 340, the control cam member 342A fixed to the driving shaft 341 and rotated together with the driving shaft 341, the multiple pistons 343 reciprocating in the radial directions in accordance with the rotation of the control cam member 342A, the multiple cylinder bores 344 for movably accommodating the respective pistons 343, and so on. The driving shaft 341 is rotatably supported by bearing members provided at axial side walls of the housing 340 (that is, the axial side walls of the respective container unit portions 31a and 31b).

A shape of the control cam member 342A is decided depending on the number of the magnets 323a (323b) fixed to the rotor 322a (322b). In the present embodiment, two permanent magnets 323a (323b) are fixed to each of the rotors 322a and 322b, the shape of the control cam member 342A is so made that each of the rotors 322a and 322b (the rotational shafts 321a and 321b) is rotated by one revolution when each of the pistons 343 is reciprocated two times.

In the present embodiment, the magnets 323a for the container unit portion 31a (of the high-temperature side) are displaced from the magnets 323b for the container unit portion 31b (of the low-temperature side) by 90 degrees in the rotational direction of the rotational shaft 321. Therefore, as explained below, the operational phase for the container unit portion 31a is displaced from that for the container unit portion 31b by 180 degrees.

Each of the cylinder bores 344 is communicated to the communication passage 314 for the container unit portion 31a (the high-temperature side) and to the communication passage 315 for the container unit portion 31b (the low-temperature side). According to such a structure, heat exchange is carried out in the common cylinder bore 344 between the refrigerant from the container unit portion 31a and the refrigerant from the container unit portion 31b.

The refrigerant pump 34 is so operated that the refrigerant is sucked into and discharged from the respective working chambers 311 of the container unit portions 31a and 31b in synchronism with the step for applying the magnetic field to the magnetic working material 30 and the step for removing the magnetic field from the magnetic working material 30.

For example, the refrigerant is pumped out from the cylinder bore 344 to the respective working chambers 311 of the container unit portions 31a and 31b via the communication passages 314 and 315, when the magnetic field is applied to the magnetic working material 30 in the working chamber 311 of the container unit portion 31a (the high-temperature side) while the magnetic field is removed from the magnetic working material 30 in the working chamber 311 of the container unit portion 31b (the low-temperature side).

On the other hand, the refrigerant is sucked into the cylinder bore 344 from the respective working chambers 311 of the container unit portions 31a and 31b via the communication passages 314 and 315, when the magnetic field is removed from the magnetic working material 30 in the working chamber 311 of the container unit portion 31a (the high-temperature side) while the magnetic field is applied to the magnetic working material 30 in the working chamber 311 of the container unit portion 31b (the low-temperature side).

As above, when the refrigerant is pumped out from the refrigerant pump 34 to the respective working chambers 311 of the container unit portions 31a and 31b, the discharge valves 312d and 313d (provided in the respective refrigerant outlet ports 312b and 313b) of the container unit portions 31a and 31b are opened, so that the refrigerant in the respective working chambers 311 (neighboring to the refrigerant outlet ports 312b and 313b) is discharged to the respective refrigerant circuits 4 and 5.

On the other hand, when the refrigerant is sucked into the refrigerant pump 34 from the respective working chambers 311 of the container unit portions 31a and 31b, the suction valves 312c and 313c (provided in the respective refrigerant inlet ports 312a and 313a) of the container unit portions 31a and 31b are opened, the refrigerant is sucked into the respective working chambers (in the spaces neighboring to the refrigerant inlet ports 312a and 313a) of the container unit portions 31a and 31b from the respective refrigerant circuits 4 and 5.

The electric motor 35 shown in FIG. 21 or 22 is operated when electric power is supplied from a battery (not shown) mounted in the vehicle, so that rotational power of the electric motor 35 is transmitted to the rotational shafts 321a and 321b and the driving shaft 341. The electric motor 35 is also referred to as a driving unit for driving the magnetic refrigerating device 103.

In the present embodiment, the rotational shafts 321a and 321b, the rotors 322a and 322b, the permanent magnets 323a and 323b and the electric motor 35 (which is provided at the outside of the heat-exchange container device 31) constitute the respective magnetic-field control units 32 for the respective container unit portions 31a and 31b. The permanent magnets 323a and 323b respectively constitute the magnetic-field generating portions.

Although not shown in the drawings, the refrigerant pump 34 has the multiple cylinders, the number of which corresponds to the number of the working chambers 311 (more exactly, the number of pair of the working chambers, wherein the working chamber of the container unit portion 31a and the corresponding working chamber of the container unit portion 31b constitute the pair of the working chambers). In other words, the magnetic refrigerating device 103 has the multiple refrigerant moving mechanisms corresponding to the number of the pairs of the working chambers 311.

An operation of the magnetic refrigerating system 2 of the present embodiment will be explained with reference to FIGS. 24 and 25 and FIG. 27. As explained above, although the magnetic refrigerating device 103 has the multiple working chambers 311, the operation for one working chamber will be explained, since the operations for the other working chambers are substantially the same to one another. However, the operations for the respective working chambers are carried out in a de-phased manner.

Figure 24:
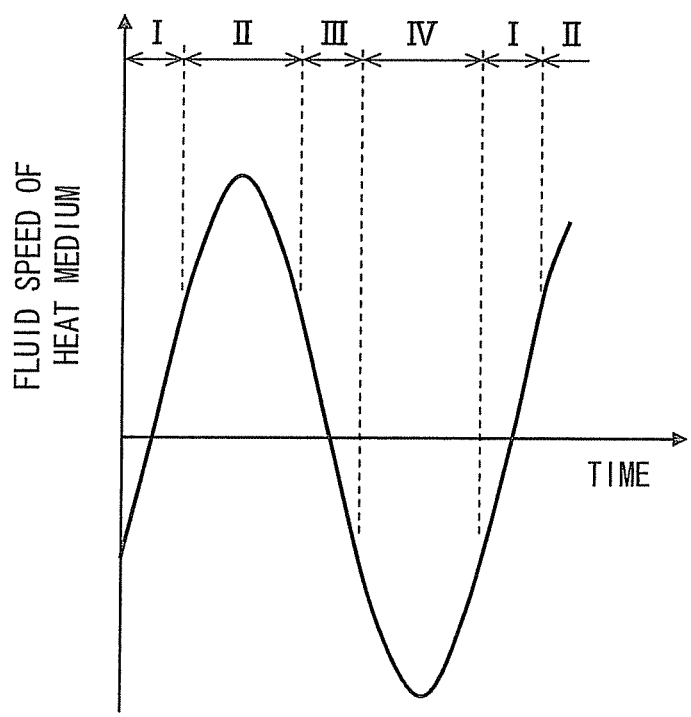
FIG. 24 is a graph showing a fluid speed of heat medium in a working chamber of the fourth embodiment.

FIG. 24 is a graph showing a change of fluid speed of the heat medium in the working chamber 311, wherein the fluid flow from the first axial end 311b toward the second axial end 311a (that is, in a right-hand direction in the drawing), is indicated in a positive side (in an upper area above a reference line).

FIG. 25 is a graph showing a change of the magnetic field to be applied to the magnetic working material 30 in the working chamber 311. FIG. 27 is a time chart for showing more in detail movements of the relevant portions (such as, the piston 343, the suction valve 312c and the discharge valve 312d of the high-temperature side container unit portion 31a, the suction valve 313c and the discharge valve 313d of the low-temperature side container unit portion 31b) as well as changes of the fluid speed of the heat medium and the magnetic field applied to the magnetic working material. In FIGS. 24 and 25 and FIG. 27, numerals "I", "II", "III" and "IV" respectively designate the following first to fourth steps.

At first, an operation for the container unit portion 31a (the high-temperature side) will be explained. When the piston 343 in the cylinder bore 344 is located at a position close to the bottom dead center (in the first step "I" shown in FIG. 24 and between t1 and t2 in FIG. 27), the permanent magnet 323a approaches to the working chamber 311 of the container unit portion 31a (the high-temperature side) so that the magnetic field is applied to the magnetic working material 30 accommodated in the working chamber 311 (as shown in the step "I" in FIG. 25 and FIG. 27). Then, the heat is generated in the magnetic working material 30 by the magnetocaloric effect and thereby the temperature of the refrigerant in the working chamber 311 is increased. The first step "I" shown in FIGS. 24 and 25 and FIG. 27 corresponds to a non-adiabatic excitation process.

Figure 27:
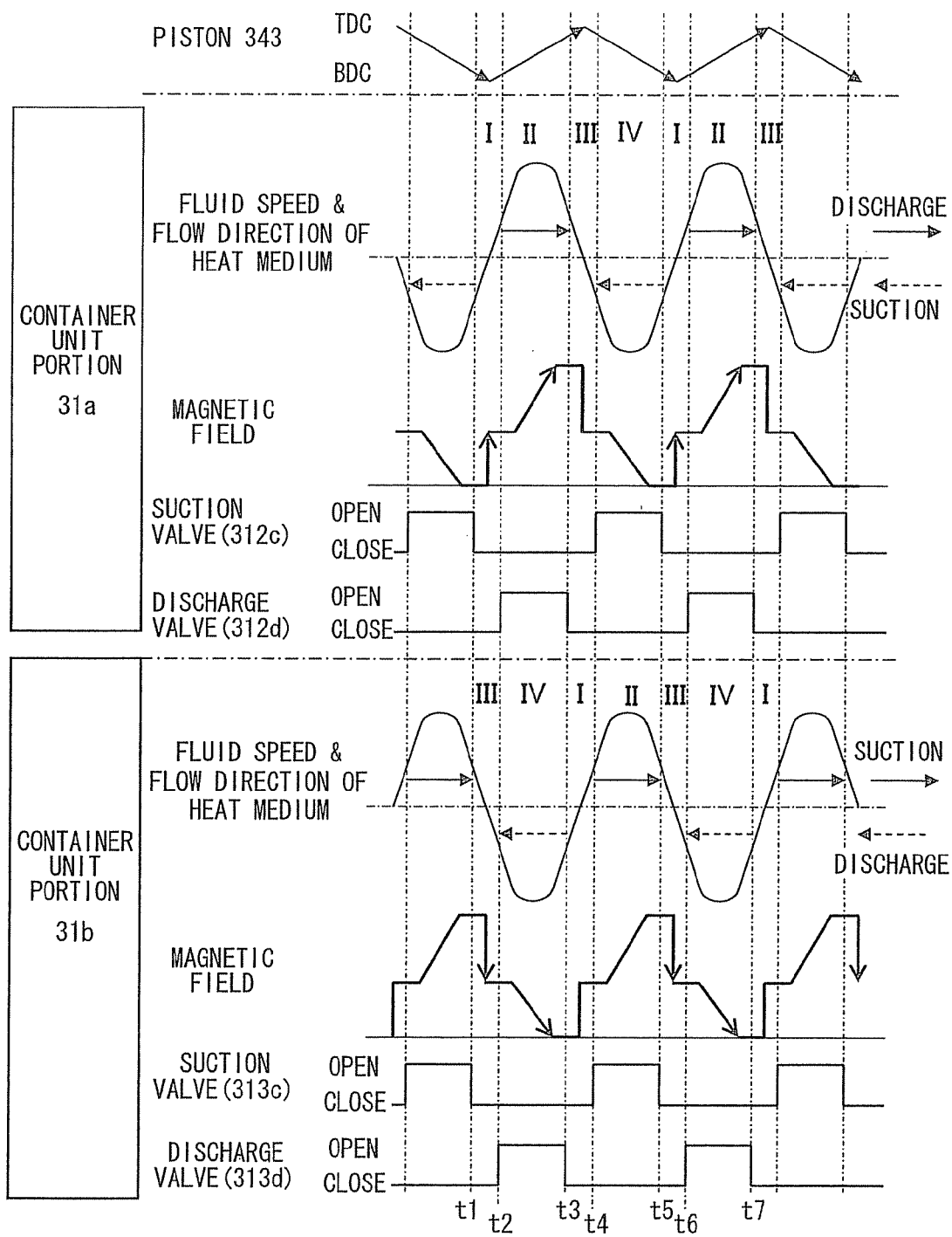
FIG. 27 is a time chart for explaining operations of a piston, a high-temperature side container unit portion and a low-temperature side container unit portion.

When, thereafter, the piston 343 is further moved in the cylinder bore 344 from the bottom dead center toward the top dead center, the refrigerant in the working chamber 311 is moved in the right-hand direction from the axial end side on the side of the refrigerant pump 34 to the other axial end side of the refrigerant inlet-outlet ports 312 (the step "II" in FIG. 24 and between t2 and t3 in FIG. 27). In this operation, the discharge valve 312d provided in the refrigerant outlet port 312b is opened, so that high-temperature refrigerant is discharged from the working chamber 311 (from the space neighboring to the refrigerant outlet port 312b) into the refrigerant circuit 4 of the high-temperature side (in which the heating-side heat exchanger 13 is provided), as indicated by a solid-line arrow for the container unit portion 31a in FIG. 27. The second step "II" for the container unit portion 31a corresponds to a refrigerant discharge process.

As shown by the step "II" in FIGS. 24 and 25, the magnetic field to be applied to the magnetic working material 30 is gradually increased depending on the fluid speed of the refrigerant (the heat medium) in the working chamber 311. During this operation, the heat generated in the second step "II" is also transferred from the magnetic working material 30 to the refrigerant (the heat medium).

The degree of the magnetic field is increased in such a manner that the increase rate of the magnetic field to be applied to the magnetic working material 30 is made larger as the fluid speed of the refrigerant (the heat medium) is higher. For example, when the fluid speed of the heat medium becomes at its maximum value, the increase rate of the magnetic field becomes at the maximum value (a slope of a curve in FIG. 25 in the second step "II"). According to such an operation, the magnetic working material 30 is maintained in the isothermal condition, so that the coefficient of thermal conductivity between the magnetic working material 30 and the heat medium is maintained at the high value during the second step operation.

When the piston 343 in the cylinder bore 344 is located at a position close to the top dead center (in the third step "III" shown in FIG. 24 and between t3 and t4 in FIG. 27), the permanent magnet 323a is moved away from the working chamber 311 of the container unit portion 31a. As a result, the magnetic field is removed from the magnetic working material 30 accommodated in the working chamber 311 (as shown by the step "III" in FIG. 25 and FIG. 27). The third step "III" for the container unit portion 31a shown in FIGS. 24 and 25 and FIG. 27 corresponds to a non-adiabatic degaussing process.

Thereafter, when the piston 343 is further moved in the cylinder bore 344 from the top dead center toward the bottom dead center, the refrigerant (the heat medium) in the working chamber 311 is moved in the left-hand direction from the axial end side of the refrigerant inlet-outlet ports 312 to the other axial end side on the side of the refrigerant pump 34 (the step "IV" in FIG. 24 and between t4 and t5 in FIG. 27). In this operation, the suction valve 312c provided in the refrigerant inlet port 312a is opened, so that the refrigerant (which has passed through the heating-side heat exchanger 13) is sucked into the working chamber 311 (into the space neighboring to the refrigerant inlet port 312a) from the refrigerant circuit 4 (the high-temperature side), as indicated by a dotted-line arrow for the container unit portion 31a in FIG. 27. The fourth step "IV" for the container unit portion 31a corresponds to a refrigerant suction process.

As shown by the step "IV" in FIGS. 24 and 25 and FIG. 27, the magnetic field applied to the magnetic working material 30 is gradually decreased depending on the fluid speed of the heat medium in the working chamber 311. During this operation, the heat decreased in the fourth step "IV" is transferred from the heat medium to the magnetic working material 30.

In the fourth step "IV", the degree of the magnetic field is decreased in such a manner that the decrease rate of the magnetic field to be removed from the magnetic working material 30 is made larger as the fluid speed of the heat medium is higher. According to such an operation, the magnetic working material 30 is maintained in the isothermal condition, so that the coefficient of thermal conductivity between the magnetic working material 30 and the heat medium is maintained at the high value during the fourth step operation.

When the piston 343 comes back to the position close to the bottom dead center, the next step (that is, the first step "I" between t5 and t6 in FIG. 27) for applying the magnetic field to the magnetic working material is carried out again.

The above first step for applying the magnetic field, the second step for discharging the refrigerant, the third step for removing the magnetic field, and the fourth step for sucking the refrigerant are repeatedly carried out, so that the heat energy generated in the magnetic working material 30 accommodated in the working chamber 311 of the container unit portion 31a (the high-temperature side) by the magnetocaloric effect thereof is transferred to the side of the heating-side heat exchanger 13.

Now, an operation for the container unit portion 31b (the low-temperature side) will be explained. As explained above, when the piston 343 in the cylinder bore 344 is located at the position close to the top dead center (corresponding to the step "III" for the container unit portion 31a and between t3 and t4 in FIG. 27), the magnetic field is removed from the magnetic working material 30 accommodated in the working chamber 311 of the container unit portion 31a (the high-temperature side).

However, the operational phase for the container unit portion 31b is displaced from that of the container unit portion 31a by 180 degrees. In other words, the timing of the third step "III" for the container unit portion 31a (between t3 and t4 in FIG. 27) corresponds to the first step "I" for the container unit portion 31b. Therefore, in the working chamber 311 of the container unit portion 31b (the low-temperature side), the magnetic field is applied to the magnetic working material 30, as shown by the step "I" in FIG. 25 and FIG. 27, when the piston 343 in the cylinder bore 344 is located at the position close to the top dead center (the step "I" in FIG. 24 and between t3 and t4 in FIG. 27).

Thereafter, when the piston 343 is further moved in the cylinder bore 344 from the top dead center toward the bottom dead center, the refrigerant in the working chamber 311 is moved (in the right-hand direction) from the axial end side of the refrigerant outlet-outlet ports 313 to the other axial end side on the side of the refrigerant pump 34 (the step "II" in FIG. 24 and between t4 and t5 in FIG. 27), as indicated by a solid-line arrow in FIG. 27 for the container unit portion 31b. In this operation, the suction valve 313c provided in the refrigerant inlet port 313a is opened, so that the refrigerant (which has passed through the cooling-side heat exchanger 12) is sucked into the working chamber 311 (into the space neighboring to the refrigerant inlet port 313a) from the refrigerant circuit 5 (the low-temperature side).

As shown by the step "II" for the container unit portion 31b in FIGS. 24 and 25 and FIG. 27, the magnetic field applied to the magnetic working material 30 is gradually increased depending on the fluid speed of the refrigerant (the heat medium) in the working chamber 311. During this operation, the heat increased in the second step "II" is transferred from the magnetic working material 30 to the heat medium.

In the second step "II", the degree of the magnetic field is increased in such a manner that the increase rate of the magnetic field to be applied to the magnetic working material 30 is made larger as the fluid speed of the heat medium is higher. For example, when the fluid speed of the heat medium becomes at its maximum value, the increase rate of the magnetic field becomes at the maximum value (the slope of the curve in FIG. 25 in the second step "II"). According to such an operation, the magnetic working material 30 is maintained in the isothermal condition, so that the coefficient of thermal conductivity between the magnetic working material 30 and the heat medium is maintained at the high value during the second step operation.

When the piston 343 is located in the cylinder bore 344 at the position close to the bottom dead center, the magnetic field is applied to the magnetic working material in the working chamber 311 of the container unit portion 31a (the high-temperature side), as shown by the step "I" in FIG. 25 and between t5 and t6 in FIG. 27.

On the other hand, for the working chamber 311 of the container unit portion 31b (the low-temperature side), when the piston 343 is located at the position close to the bottom dead center (the step "III" in FIG. 24 and between t5 and t6 in FIG. 27), the magnetic field is removed from the magnetic working material 30 (as shown by the step "III" in FIG. 25).

Thereafter, when the piston 343 is further moved in the cylinder bore 344 from the bottom dead center toward the top dead center, the refrigerant in the working chamber 311 for the container unit portion 31b is moved (in the left-hand direction) from the axial end side on the side of the refrigerant pump 34 to the other axial end side of the refrigerant inlet-outlet ports 313 (the step "IV" in FIG. 24 and between t6 and t7 in FIG. 27).

In this operation, the discharge valve 313d provided in the refrigerant outlet port 313b is opened, so that the low-temperature refrigerant is discharged from the working chamber 311 of the container unit portion 31b (from the space neighboring to the refrigerant outlet port 313b) to the refrigerant circuit 5 of the low-temperature side (in which the cooling-side heat exchanger 12 is provided), as indicated by a dotted-line arrow for the container unit portion 31b in FIG. 27.

As shown by the step "IV" in FIGS. 24 and 25 and FIG. 27, the magnetic field applied to the magnetic working material 30 is gradually decreased depending on the fluid speed of the heat medium in the working chamber 311 for the container unit portion 31b. During this operation, the heat decreased in the fourth step "IV" (the cold energy generated in the fourth step "IV") is also transferred from the magnetic working material 30 to the heat medium.

In the fourth step "IV" for the container unit portion 31b, the degree of the magnetic field is decreased in such a manner that the decrease rate of the magnetic field to be removed from the magnetic working material 30 is made larger as the fluid speed of the heat medium is higher. According to such an operation, the magnetic working material 30 is maintained in the isothermal condition, so that the coefficient of thermal conductivity between the magnetic working material 30 and the heat medium is maintained at the high value during the fourth step operation.

The above first step for applying the magnetic field, the second step for sucking the refrigerant, the third step for removing the magnetic field, and the fourth step for discharging the refrigerant are repeatedly carried out in the container unit portion 31b of the low-temperature side, so that the cold energy generated in the magnetic working material 30 accommodated in the working chamber 311 of the container unit portion 31b by the magnetocaloric effect thereof is transferred to the side of the cooling-side heat exchanger 12.

When the above operation is observed as a whole, including the operations for the container unit portions 31a and 31b, the refrigerant is moved in the direction from the low-temperature side inlet-outlet ports 313 to the high-temperature side inlet-outlet ports 312 after the magnetic field has been applied to the magnetic working material 30, while the refrigerant is moved in the direction from the high-temperature side inlet-outlet ports 312 to the low-temperature side inlet-outlet ports 313 after the magnetic field has been removed from the magnetic working material 30.

The first step for applying the magnetic field, the second step for discharging the refrigerant, the third step for removing the magnetic field, and the fourth step for sucking the refrigerant are repeatedly carried out for the working chambers 311 of the container unit portion 31a, on one hand. The first step for applying the magnetic field, the second step for sucking the refrigerant, the third step for removing the magnetic field, and the fourth step for discharging the refrigerant are repeatedly carried out for the working chambers 311 of the container unit portion 31b, on the other hand. As a result, a large temperature gradient can be generated between the magnetic working material 30 accommodated in the working chambers 311 of the high-temperature side container unit portion 31a and the magnetic working material 30 accommodated in the working chambers 311 of the low-temperature side container unit portion 31b.

Now, the refrigerant circuit 4 of the high-temperature side and the refrigerant circuit 5 of the low-temperature side will be explained.

The refrigerant circuit 4 corresponds to a refrigerant circuit, according to which the refrigerant discharged from the refrigerant outlet port 312b is supplied to a flow-in port 13a of the heating-side heat exchanger 13 and the refrigerant from a flow-out port 13b of the heat exchanger 13 is supplied to the refrigerant inlet port 312a.

More in detail, the flow-in port 13a of the heat exchanger 13 is connected to the refrigerant outlet port 312b. The heat exchanger 13 is arranged in a casing 11 of the air conditioning unit 10. The heat exchanger 13 corresponds to a heat exchanger (also referred to as a second heat exchanger) for heating air passing through the heat exchanger, in which heat exchange is carried out between the refrigerant flowing through the heat exchanger 13 and the air (which has passed through the low-temperature side heat exchanger 12) passing through the heat exchanger 13.

A first electric three-way valve 141 is provided in the refrigerant circuit 4 at a position on a side of the flow-out port 13b of the heat exchanger 13. The three-way valve 141 constitutes a fluid-passage switching device, which is operated by a control signal from the air conditioning control unit 100.

More in detail, the three-way valve 141 switches over a fluid passage depending on the control signal from the air conditioning control unit 100, either to such a fluid passage for connecting the flow-out port 13b of the heat exchanger 13 to the refrigerant inlet port 312a of the container unit portion 31a or to such a fluid passage for connecting the flow-out port 13b of the heat exchanger 13 to a fluid inlet port 61a of a heat radiating portion of another heat exchanger 6 (a heat absorbing-and-radiating heat exchanger).

The heat exchanger 6 corresponds to an outdoor heat exchanger arranged in the engine room of the vehicle, in which heat exchange is carried out between the refrigerant flowing through the heat exchanger 6 and outside air passing through the heat exchanger 6. The heat exchanger 6 is composed of a heat radiating portion 61 and a heat absorbing portion 62, wherein the refrigerant from the heating-side heat exchanger 13 flows through the heat radiating portion 61, while the refrigerant from the low-temperature side container unit portion 31b flows through the heat absorbing portion 62.

The heat radiating portion 61 corresponds to a heat exchanging portion, in which heat exchange is carried out between the refrigerant flowing into the inside thereof via the fluid inlet port 61a (the refrigerant discharged from the heating-side heat exchanger 13) and the outside air. The heat absorbing portion 62 corresponds to a heat exchanging portion, in which heat exchange is carried out between the refrigerant flowing into the inside thereof via a fluid inlet port 62a (the refrigerant discharged from the low-temperature side container unit portion 31b) and the outside air.

Fluid passages for the heat radiating portion 61 and the heat absorbing portion 62 are formed in the heat exchanger 6 independently from each other, in order that the refrigerant flowing through the heat radiating portion 61 and the refrigerant flowing through the heat absorbing portion 62 are not mixed with each other.

The refrigerant inlet port 312a of the high-temperature side container unit portion 31a is connected to a fluid outlet port 61b of the heat exchanger 6, so that the refrigerant (the heat of which is radiated in the heat exchanger 6) returns to the working chamber 311 of the container unit portion 31a of the high-temperature side.

Accordingly, the refrigerant circuit 4 is composed of a circulation circuit, in which the refrigerant is circulated through the refrigerant outlet port 312b of the container unit portion 31a, the heating-side heat exchanger 13, the first electric three-way valve 141, and the refrigerant inlet port 312a of the container unit portion 31a of the high-temperature side. The refrigerant circuit 4 has another circulation circuit, in which the refrigerant is circulated through the refrigerant outlet port 312b of the container unit portion 31a, the heating-side heat exchanger 13, the first electric three-way valve 141, the heat radiating portion 61 of the heat exchanger 6, and the refrigerant inlet port 312a of the container unit portion 31a.

A reservoir tank 143 is connected to the refrigerant circuit 4 via a fixed restriction 142 so as to adjust an amount of the refrigerant in the refrigerant circuit 4. An orifice, a capillary tube or the like may be used as the fixed restriction 142.

The refrigerant circuit 5 of the low-temperature side corresponds to a refrigerant circulation circuit, according to which the refrigerant from the refrigerant outlet port 313b of the container unit portion 31b (the low-temperature side) is supplied to a flow-in port 12a of the cooling-side heat exchanger 12 and the refrigerant from a flow-out port 12b of the cooling-side heat exchanger 12 is returned to the refrigerant inlet port 313a of the container unit portion 31b (the low-temperature side).

More in detail, a second electric three-way valve 51 is provided in the refrigerant circuit 5 on a side to the refrigerant outlet port 313b of the container unit portion 31b. As in the same manner to the first three-way valve 141, the second three-way valve 51 constitutes a fluid-passage switching device, which is operated by a control signal from the air conditioning control unit 100.

More in detail, the three-way valve 51 switches over a fluid passage depending on the control signal from the air conditioning control unit 100, either to such a fluid passage for connecting the refrigerant outlet port 313b of the inlet-outlet ports 313 to the fluid inlet port 62a of the heat exchanger 6 or to such a fluid passage for connecting the refrigerant outlet port 313b of the inlet-outlet ports 313 to a third electric three-way valve 52, which is also provided in the refrigerant circuit 5 on a side to a fluid inlet port 62b of the heat exchanger 6.

As in the same manner to the first and second three-way valves 141 and 51, the third three-way valve 52 constitutes a fluid-passage switching device, which is operated by a control signal from the air conditioning control unit 100.

More in detail, the third three-way valve 52 is operated in synchronism with the second three-way valve 51. When the fluid passage is switched over by the second three-way valve 51 so that the refrigerant outlet port 313b of the low-temperature side inlet-outlet ports 313 is communicated to the third three-way valve 52, the fluid passage is switched over by the third three-way valve 52 in such a way that the second three-way valve 51 is communicated to the flow-in port 12a of the cooling-side heat exchanger 12. On the other hand, when the fluid passage is switched over by the second three-way valve 51 so that the refrigerant outlet port 313b is communicated to the fluid inlet port 62a of the heat exchanger 6, the fluid passage is so switched over by the third three-way valve 52 that the second three-way valve 51 is communicated to the refrigerant inlet port 313a.

The cooling-side heat exchanger 12, which is connected to the third three-way valve 52 is arranged in the casing 11 of the air conditioning unit 10 at an upstream side of the heating-side heat exchanger 13, in order to carry out heat exchange between the blowing air passing through the heat exchanger 12 and the refrigerant flowing through the heat exchanger 12 to thereby cool down the blowing air.

Accordingly, the refrigerant circuit 5 is composed of a circulation circuit, in which the refrigerant is circulated through the refrigerant outlet port 313b of the low-temperature side container unit portion 31b, the second three-way valve 51, the third three-way valve 52, the cooling-side heat exchanger 12, and the refrigerant inlet port 313a of the low-temperature side container unit portion 31b. The refrigerant circuit 5 is further composed of another circulation circuit, in which the refrigerant is circulated through the refrigerant outlet port 313b of the low-temperature side container unit portion 31b, the heat absorbing portion 62 of the heat exchanger 6, the second three-way valve 51, the third three-way valve 52, and the refrigerant inlet port 313a of the low-temperature side container unit portion 31b.

A reservoir tank 54 is connected to the refrigerant circuit 5 via a fixed restriction 53 so as to adjust an amount of the refrigerant in the refrigerant circuit 5. An orifice, a capillary tube or the like may be used as the fixed restriction 53.

The air conditioning unit 10 will be explained. The air conditioning unit 10 is arranged in the passenger compartment in an instrument panel (which is located at a front side of the passenger compartment). A blower unit (not shown), the cooling-side heat exchanger 12, the heating-side heat exchanger 13, a heater core 14 and so on are arranged in the casing 11.

The casing 11 forms multiple air passages for the blowing air, which is blown into the passenger compartment of the vehicle. The casing 11 is made of, for example, resin having a certain level of elasticity and sufficient strength (for example, polypropylene). An air switching device (not shown) is provided in the casing 11 at an upstream end of the air passage, so that the air to be withdrawn into the passenger compartment is switched to outside air or to inside air.

The blower unit (not shown) is provided in the air passage of the casing 11 at a downstream side of the air switching device so as to blow the air (the outside air or the inside air) into the passenger compartment. The blower unit has a centrifugal multiple-blade fan (a sirocco fan) driven by an electric motor (not shown), an operation of which is controlled by a control voltage outputted from the air conditioning control unit 100.

The cooling-side heat exchanger 12 is provided in the casing 11 at the downstream side of the blower unit. A hot air passage 15 and a cold air bypass passage 16 are formed in the casing 11 at the downstream side of the cooling-side heat exchanger 12, so that cold air having passed through the heat exchanger 12 is heated by the heating-side heat exchanger 13 provided in the hot air passage 15. An air-mix chamber 17 is further formed in the casing 11 so as to mix the hot air from the hot air passage 15 and the cold air from the cold air bypass passage 16.

The heating-side heat exchanger 13 and the heater core 14 are arranged in this order in the hot air passage 15, so as to heat the cold air having passed through the cooling-side heat exchanger 12. The heater core 14 is a heat exchanger, in which heat exchange is carried out between the air passing through the hot air passage 15 and cooling water for an internal combustion engine (not shown) for driving the vehicle.

The cold air bypass passage 16 is an air passage for guiding the cold air having passed through the cooling-side heat exchanger 12 to the air-mix chamber 17 bypassing the heating-side heat exchanger 13 and the heater core 14. Accordingly, temperature of the air mixed in the air-mix chamber 17 depends on a flow-amount ratio of the air passing through the hot air passage 15 and the air passing through the cold air bypass passage 16.

According to the present embodiment, therefore, an air-mix door 18 is provided in the air passage at the downstream side of the cooling-side heat exchanger 12 but at the upstream side of the hot air passage 15 and the cold-air bypass passage 16, so as to continuously change the flow-amount ratio of the cold air passing through the hot air passage 15 and the cold-air bypass passage 16. Therefore, the air-mix door 18 corresponds to a temperature control unit for adjusting the temperature of the air (to be blown into the passenger compartment) in the air-mix chamber 17 by controlling the flow amount of the air passing through the heating-side heat exchanger 13.

Multiple air ducts (not shown) are provided at a most downstream end of the air passage of the casing 11 so as to blow the air (the temperature of which is controlled) from the air-mix chamber 17 into the passenger compartment. The air ducts include, for example, a face air duct, a foot air duct, a defroster air duct and so on. An air switching door is provided in each of the air ducts for controlling an opening area of the respective air passages. The air ducts are selectively opened by such air switching doors so that the air is blown into the passenger compartment.

The air conditioning control unit 100 (the A/C ECU) is composed of a well-known micro-computer (having CPU, ROM, RAM and so on) and its peripheral equipment. The A/C ECU 100 carries out various kinds of calculations and processes in accordance with control programs memorized in ROM, to thereby control operations of the electric motor 35, the three-way valves 141, 51 and 52, the blower unit, the air-mix door 18 and so on.

Operating signals are inputted from operating switches (not shown) provided at the instrument panel to an input side of the A/C ECU 100. The operating switches include, for example, an ON/OFF switch, an AUTO switch (for an automatic operation), an operating mode switch (for a cooling operation mode, a heating operation mode, a dehumidifying operation mode, and so on) for the air conditioning apparatus 1.

The A/C ECU 100 also includes a motor control portion for the electric motor 35 (which drives the magnetic refrigerating device 103) and a valve control portion for the three-way valves 141, 51 and 52.

The air conditioning apparatus 1 having the magnetic refrigerating system 2 carries out various operation modes (the cooling operation mode, the heating operation mode, the dehumidifying operation mode and so on) in accordance with the operation of the operating switches for the air conditioning apparatus and/or the control operation of the A/C ECU 100.

For example, in the cooling operation mode, in accordance with the control signals from the A/C ECU 100, the fluid passage of the refrigerant circuit 4 (the high-temperature side) is so switched by the first three-way valve 141 that the flow-out port 13b of the heating-side heat exchanger 13 is connected to the fluid inlet port 61a of the heat exchanger 6. In addition, in the refrigerant circuit 5 (the low-temperature side), the fluid passage is switched by the second three-way valve 51 that the refrigerant outlet port 313b of the container unit portion 31b is communicated to the third three-way valve 52 and furthermore the fluid passage is switched by the third three-way valve 52 that the second three-way valve 51 is communicated to the flow-in port 12a of the cooling-side heat exchanger 12.

In the heating operation mode, in accordance with the control signals from the A/C ECU 100, the fluid passage of the refrigerant circuit 4 (the high-temperature side) is so switched by the first three-way valve 141 that the flow-out port 13b of the heating-side heat exchanger 13 is connected to the refrigerant inlet port 312a of the container unit portion 31a. In addition, in the refrigerant circuit 5 (the low-temperature side), the fluid passage is switched by the second three-way valve 51 that the refrigerant outlet port 313b of the container unit portion 31b is communicated to the fluid inlet port 62a of the heat exchanger 6 and furthermore the fluid passage is switched by the third three-way valve 52 that the second three-way valve 51 is communicated to the refrigerant inlet port 313a of the container unit portion 31b.

In the dehumidifying operation mode, in accordance with the control signals from the A/C ECU 100, the fluid passage of the refrigerant circuit 4 (the high-temperature side) is so switched by the first three-way valve 141 that the flow-out port 13b of the heating-side heat exchanger 13 is connected to the refrigerant inlet port 312a of the container unit portion 31a. In addition, in the refrigerant circuit 5 (the low-temperature side), the fluid passage is switched by the second three-way valve 51 that the refrigerant outlet port 313b of the container unit portion 31b is communicated to the third three-way valve 52 and furthermore the fluid passage is switched by the third three-way valve 52 that the second three-way valve 51 is communicated to the flow-in port 12a of the cooling-side heat exchanger 12.

As above, the heat energy generated in the second axial end 311a of the container device 31 (the magnetic refrigerating device 103) and the cold energy generated in the first axial end 311b are used in the respective operation modes, so that the passenger compartment of the vehicle is air-conditioned.

Although not explained in detail for the first to third embodiments, the cooling-side and the heating-side heat exchangers 12 and 13 can be likewise used for the air conditioning apparatus for the vehicle like the present embodiment.

As explained above, according to the magnetic refrigerating system, the heat energy absorbed in the cooling-side heat exchanger 12 is radiated in the heating-side heat exchanger 13, when the heat cycle of the above-explained first to fourth steps is repeatedly carried out for the respective container unit portions 31a and 31b.

In the first step for the container unit portion 31a (the high-temperature side), the heat medium is slightly moved in the working chamber 311 and the degree of the magnetic field to be applied to the magnetic working material 30 is increased, to thereby increase the temperature of the magnetic working material 30. In the second step for the container unit portion 31a, the heat medium is moved in the working chamber 311 in the direction from the first axial end 311b to the second axial end 311a and the heat energy generated in the magnetic working material 30 in the first and second steps is transferred to the heat medium, so that the heat energy is moved to the second axial end 311a.

In the third step for the container unit portion 31b (the low-temperature side), the heat medium is slightly moved in the working chamber 311 and the degree of the magnetic field applied to the magnetic working material 30 is decreased, to thereby decrease the temperature of the magnetic working material 30. In the fourth step for the container unit portion 31b, the heat medium is moved in the working chamber 311 in the direction from the second axial end 311a to the first axial end 311b and the cold energy generated in the magnetic working material 30 in the third and fourth steps is transferred to the heat medium, so that the cold energy is moved to the first axial end 311b.

As in the same manner to the first embodiment, the operation of the refrigerant pump 34 and the operation of the magnetic-field control unit 32 are synchronized with each other, so that the change rate (the increase or the decrease rate) of the magnetic field applied to the magnetic working material 30 is made larger, in the second and fourth steps, as the fluid speed of the heat medium (the refrigerant) becomes higher in the working chamber 311.

In the second step for the container unit portion 31a (the high-temperature side), as the moving speed (the fluid speed) of the heat medium becomes higher and the heat transfer from the magnetic working material 30 to the heat medium is higher, the increase rate of the magnetic field to be applied to the magnetic working material 30 (in the working chamber 311 of the container unit portion 31a) is made larger so that the amount of the heat energy generated in the magnetic working material is made larger. Accordingly, the magnetic working material 30 is kept in the almost isothermal condition in the second step.

In the similar manner to the second step, in the fourth step for the container unit portion 31b (the low-temperature side), as the moving speed (the fluid speed) of the heat medium becomes higher and the heat transfer from the heat medium to the magnetic working material 30 (in the working chamber 311 for the container unit portion 31b) is higher, the decrease rate of the magnetic field applied to the magnetic working material 30 is made larger so that the heat absorbing amount in the magnetic working material is made larger. Accordingly, the magnetic working material 30 is kept in the almost isothermal condition in the fourth step.

Figure 26:
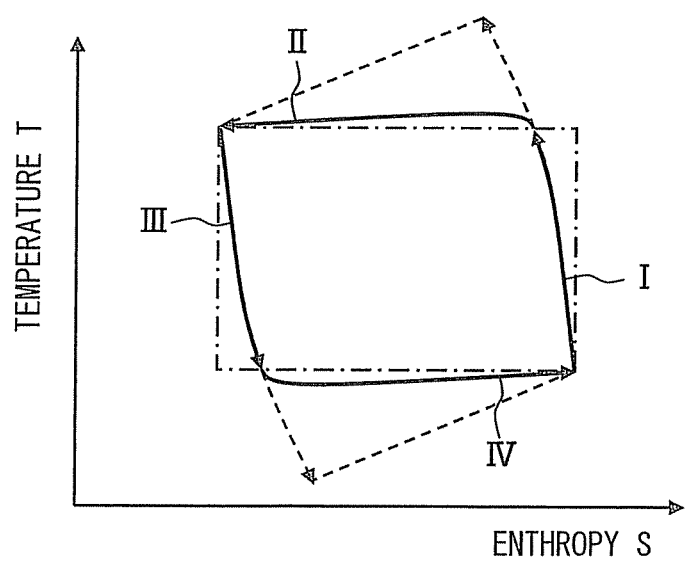
FIG. 26 is a graph showing a characteristic feature of a heat cycle for the magnetic refrigerating system of the fourth embodiment in a temperature-entropy diagram.

As a result, the operating efficiency of the magnetic refrigerating system 2 can be increased. FIG. 26 is a graph showing a characteristic feature (indicated by a solid line) of the heat cycle of the magnetic refrigerating system 2 in a temperature-entropy diagram. A one-dot-chain line shows the Carnot cycle, which is one of ideal heat cycles in a view point of the operating efficiency. A dotted line shows a characteristic feature of a comparative example, in which the heat medium (the refrigerant) in the working chamber is continuously moved to reciprocate without stopping such reciprocal movement and the degree of the magnetic field is not changed during the operation in which the magnetic field is applied to the magnetic working material.

In the magnetic refrigerating system 2 of the present embodiment, although the magnetic working material 30 is not operated in the adiabatic state in the first and third steps ("I" and "III"), the magnetic working material 30 is operated in the magnetic-excitation and isothermal-change condition in the second step and operated in the degaussing and isothermal-change condition in the fourth step ("II" and "IV").

The Carnot cycle indicated by the one-dot-chain line in FIG. 26, which is one of the ideal heat cycles, is composed of the following processes; the adiabatic excitation process; the isothermal excitation process; the adiabatic degaussing process; and the isothermal degaussing process.

In the magnetic refrigerating system 2 of the present embodiment, the second step "II" can be approximated to the ideal isothermal excitation process. Furthermore, the fourth step "IV" can be approximated to the ideal isothermal degaussing process.

As above, the heat cycle of the present embodiment (as indicated by the solid line in FIG. 26) can be approximated to the ideal heat cycle (for example, the Carnot cycle of the one-dot-chain line). Accordingly, it is possible to reduce a degree of diremption from the ideal heat cycle in the respective isothermal excitation process and isothermal degaussing process. Accordingly, the operating efficiency of the magnetic refrigerating system 2 can be increased.

When the movement of the heat medium is prohibited in the first and third steps of the magnetic refrigerating device 103 of the present embodiment, for example, by the shape of the cam profile of the control cam member, the magnetic working material 30 can be operated in the adiabatic state. Then, as in the same manner to the first embodiment, it is possible to reduce the degree of diremption from the ideal heat cycle in the respective steps, that is, in the first step for magnetic-excitation and adiabatic-change condition, in the second step for the magnetic-excitation and isothermal-change condition, in the third step for the degaussing and adiabatic-change condition, and in the fourth step for the degaussing and isothermal-change condition. Accordingly, the operating efficiency of the magnetic refrigerating system 2 can be surely increased.

Fifth Embodiment

A fifth embodiment of the present disclosure will be explained with reference to FIGS. 28 to 30.

The fifth embodiment is different from the fourth embodiment in the applying pattern of the magnetic field.

Figure 28:
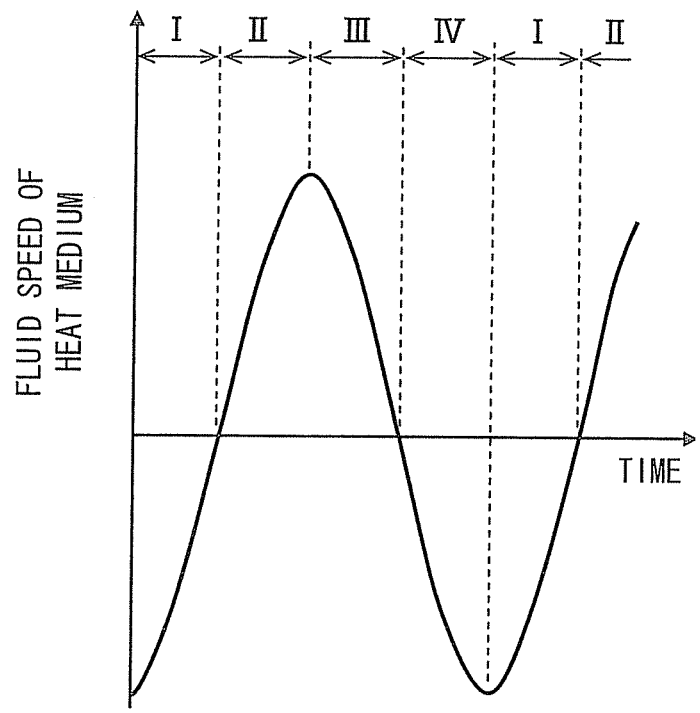
FIG. 28 is a graph showing a fluid speed of heat medium in a working chamber of a fifth embodiment.

FIG. 28 is a graph showing a change of fluid speed of the heat medium in the working chamber 311, wherein the fluid flow from the first axial end 311b toward the second axial end 311a (that is, in the right-hand direction in the drawing of FIG. 21 or 22) is indicated in a positive side (in an upper area above a reference line).

Figure 29:
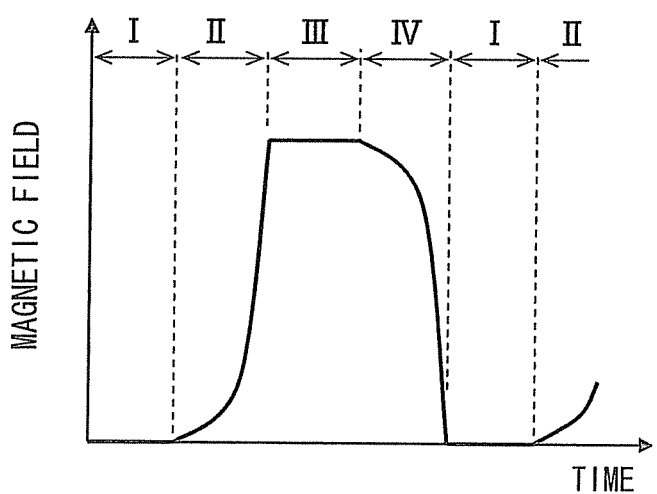
FIG. 29 is a graph showing a magnetic field applied to magnetic working material in the working chamber of the fifth embodiment.

FIG. 29 is a graph showing the change of the magnetic field to be applied to the magnetic working material 30 in the working chamber 311. In FIGS. 28 and 29, numerals "I", "II", "III" and "IV" respectively designate the first to fourth steps.

The magnetic refrigerating system of the present embodiment is almost the same to that of the fourth embodiment. The operational phase for the synchronized operation between the refrigerant pump 34 and the magnetic-field control unit 32 is different from that of the fourth embodiment. In the present embodiment, the refrigerant pump 34 and the magnetic-field control unit 32 are synchronized in such a way that the applying pattern of the magnetic field of FIG. 29 is synchronized with the fluid flow pattern of the heat medium shown in FIG. 28. In the magnetic-field control unit 32, one or more than one parameters of the following parameters is changed depending on the rotational phase in order to realize the applying pattern of the magnetic field of FIG. 29. The parameters include; the dimension of the gap; the magnetic resistance value of the magnetic resisting member; the space dimension of the notched portion; the residual magnetic flux density of the permanent magnet; the magnetic holding force of the permanent magnet; the magnetizing directions of the permanent magnet; and the thickness of the permanent magnet in the radial direction.

According to the magnetic refrigerating system of the present embodiment, the heat energy absorbed in the cooling-side heat exchanger 12 is radiated in the heating-side heat exchanger 13, when the heat cycle of the first to fourth steps is repeatedly carried out for the respective container unit portions 31a and 31b (FIG. 21 or 22).

In the first step for the container unit portion 31a (the high-temperature side), the moving speed of the heat medium in the working chamber 311 in the direction from the second axial end 311a to the first axial end 311b is decreased (as shown by "I" in FIG. 28), and no magnetic field is applied to the magnetic working material 30 (the degree of the magnetic field is not changed, as shown in "I" of FIG. 29). Since the degree of the magnetic field is not changed (zero in the present embodiment) in the first step, the heat is not generated in the magnetic working material 30. However, the heat is transferred from the heat medium moving in the working chamber 311 to the magnetic working material 30, and thereby the temperature thereof is increased.

In the second step, the moving speed of the heat medium in the working chamber 311 in the direction from the first axial end 311b to the second axial end 311a is increased (as shown by "II" in FIG. 28), and the magnetic field to be applied to the magnetic working material 30 is increased (as shown in "II" of FIG. 29).

In the second step, the degree of the magnetic field is increased in such a manner that the increase rate of the magnetic field to be applied to the magnetic working material 30 is made larger as the moving speed of the heat medium becomes higher. For example, when the moving speed of the heat medium becomes at its maximum value, the increase rate of the magnetic field becomes at a maximum value (a slope of a curve in FIG. 29 in the second step "II"). According to such an operation, the magnetic working material 30 is maintained in the isothermal condition, so that the coefficient of thermal conductivity between the magnetic working material 30 and the heat medium is maintained at a high value during the second step operation.

In the second step, the heat medium is moved in the working chamber 311 in the direction from the first axial end 311b to the second axial end 311a. Therefore, it is possible to transfer the heat energy from the magnetic working material 30 (the temperature of which is increased in the first step and in the second step) to the heat medium to thereby move the heat energy to the second axial end 311a.

In the third step, the moving speed of the heat medium in the working chamber 311 in the direction from the first axial end 311b to the second axial end 311a is decreased (as shown by "III" in FIG. 28), however, the degree of the magnetic field applied to the magnetic working material 30 is not changed (as shown in "III" of FIG. 29). Since the degree of the magnetic field is not changed in the third step, the heat (the cold energy) is not generated in the magnetic working material 30. However, the temperature of the magnetic working material 30 is decreased by heat transfer to the heat medium moving in the working chamber 311.

In the fourth step, the moving speed of the heat medium in the working chamber 311 in the direction from the second axial end 311a to the first axial end 311b is increased (as shown by "IV" in FIG. 28), and the magnetic field applied to the magnetic working material 30 is decreased (as shown in "IV" of FIG. 29).

In the fourth step, the degree of the magnetic field is decreased in such a manner that the decrease rate of the magnetic field applied to the magnetic working material 30 is made larger as the moving speed of the heat medium becomes higher. According to such an operation, the magnetic working material 30 is maintained in the isothermal condition, so that the coefficient of thermal conductivity between the magnetic working material 30 and the heat medium is maintained at a high value during the fourth step operation.

In the fourth step for the container unit portion 31b (the low-temperature side), the heat medium is moved in the working chamber 311 in the direction from the second axial end 311a to the first axial end 311b. Therefore, it is possible to transfer the cold energy from the magnetic working material 30 (the temperature of which is decreased in the third and fourth steps) to the heat medium to thereby move the cold energy to the first axial end 311b.

According to the present embodiment, the operation of the refrigerant 34 and the operation of the magnetic-field control unit 32 are synchronized with each other in such a manner that, in the second and fourth steps, the change rate (the increase rate or the decrease rate) for the degree of the magnetic field applied to the magnetic working material 30 is made larger as the moving speed of the heat medium becomes higher.

Namely, in the second step for the container unit portion 31a (the high-temperature side), as the moving speed of the heat medium becomes higher and the heat transfer from the magnetic working material 30 to the heat medium is higher, the increase rate of the magnetic field to be applied to the magnetic working material 30 is made larger so that the amount of the heat energy generated in the magnetic working material 30 is made larger. And thereby, the magnetic working material 30 is kept in the almost isothermal condition in the second step.

On the other hand, in the fourth step for the container unit portion 31b (the low-temperature side), as the moving speed of the heat medium becomes higher and the heat transfer from the heat medium to the magnetic working material 30 is higher, the decrease rate of the magnetic field applied to the magnetic working material 30 is made larger so that the heat absorbing amount in the magnetic working material 30 is made larger. And thereby, the magnetic working material 30 is kept in the almost isothermal condition in the fourth step.

Accordingly, the operating efficiency of the magnetic refrigerating system 2 can be increased. FIG. 30 is a graph showing a characteristic feature (indicated by a solid line) of the heat cycle of the magnetic refrigerating system 2 of the present embodiment in a temperature-entropy diagram. A one-dot-chain line shows the Ericsson cycle, which is also one of the ideal heat cycles in the view point of the operating efficiency. A two-dot-chain line shows the Carnot cycle.

In the magnetic refrigerating system of the present embodiment, the magnetic working material 30 can be operated in an isothermal magnetic-excitation condition for the second step and in an isothermal degaussing condition for the fourth step.

Figure 30:
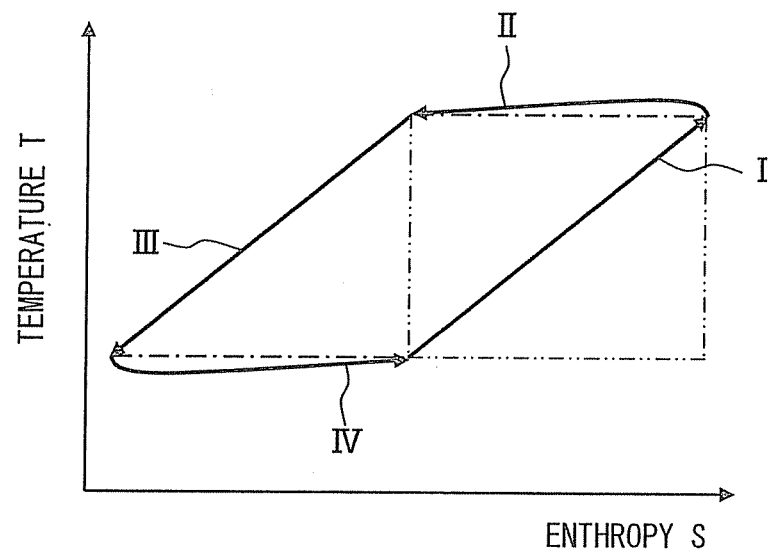
FIG. 30 is a graph showing a characteristic feature of a heat cycle for the magnetic refrigerating system of the fifth embodiment in a temperature-entropy diagram.

The Ericsson cycle indicated by the one-dot-chain line in FIG. 30, which is one of the ideal heat cycles, has an isothermal magnetic-excitation process and an isothermal degaussing process. In the magnetic refrigerating system of the present embodiment, the second step "II" can be approximated to the ideal isothermal excitation process. In addition, the fourth step "IV" can be approximated to the ideal isothermal degaussing process.

Namely, in the present embodiment, the heat cycle of the magnetic refrigerating system can be approximated to the ideal cycle, as shown in FIG. 30. Accordingly, it is possible to reduce a degree of diremption from the ideal heat cycle in the respective isothermal excitation process and isothermal degaussing process. Accordingly, the operating efficiency of the magnetic refrigerating system 2 can be increased.

In the present embodiment, the synchronization between the operation of the refrigerant pump 34 and the operation of the magnetic-field control unit 32 should not be limited to that shown by FIGS. 28 and 29.

For example, it may be modified in the following manner. The second step "II" is prolonged in FIG. 28 to a point, at which the flow speed of the heat medium is over the maximum value. Then, in such a prolonged step "II", the magnetic field is changed in such a manner that the change rate of the magnetic field applied to the magnetic working material 30 is made larger as the moving speed of the heat medium is higher.

Sixth Embodiment

A sixth embodiment of the present disclosure will be explained with reference to FIGS. 18, 31 and 32.

The sixth embodiment is different from the second embodiment in the applying pattern of the magnetic field.

A flow-speed pattern of the heat medium of the present embodiment is the same to that of FIG. 18 for the second embodiment.

Figure 31:
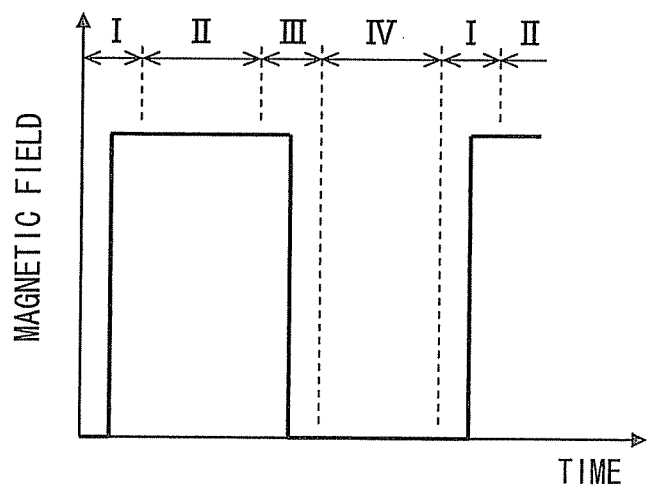
FIG. 31 is a graph showing a magnetic field applied to magnetic working material in the working chamber of a sixth embodiment.

FIG. 31 is a graph showing a change of the magnetic field to be applied to the magnetic working material 30 in the working chamber 311. In FIGS. 18 and 31, numerals "I", "II", "III" and "IV" respectively designate the first to fourth steps.

The magnetic refrigerating system of the present embodiment is almost the same to that of the second embodiment. In the present embodiment, the refrigerant pump 34 and the magnetic-field control unit 32 are synchronized in such a way that the applying pattern of the magnetic field of FIG. 31 is synchronized with the fluid flow pattern of the heat medium shown in FIG. 18. However, in the magnetic-field control unit 32 of the present embodiment, none of the following parameters (including the dimension of the gap, the magnetic resistance value of the magnetic resisting member, the space dimension of the notched portion, the residual magnetic flux density of the permanent magnet, the magnetic holding force of the permanent magnet, the magnetizing directions of the permanent magnet, or the thickness of the permanent magnet in the radial direction) is changed in the circumferential direction (in the rotational direction of the rotor). Instead, in the present embodiment, the magnetic-field control unit 32 has a semicircular arc-shaped permanent magnet, which extends in the circumferential direction of the rotor to occupy a half cross sectional area of the rotor in the circumferential direction. As a result, the applying pattern of the magnetic field shown in FIG. 31 is obtained.

During an operation of the magnetic refrigerating system of the present embodiment, for the first and third steps, the magnetic refrigerating system operates in a similar manner to those of the second embodiment. In the third step, however, the magnetic field applied to the magnetic working material 30 is rapidly decreased to the level of zero (to a condition, in which the magnetic field is almost completely removed).

In the second step, the refrigerant flows at once into the working chamber 311 of the first axial end 311b from the pressure accumulating tank 41a by its accumulated pressure energy, in addition to the refrigerant pumped out from the refrigerant pump 34A. Then, the flow of the refrigerant (the flow speed of which is almost constant) is immediately formed in the working chamber 311 in the direction from the first axial end 311b to the second axial end 311a, as indicated by "II" in FIG. 18.

The refrigerant pump 34B sucks the refrigerant from the high-temperature side refrigerant circuit 4 into the cylinder bore (the pump chamber) 344b. The refrigerant, which is heated up by the magnetic working material 30, flows out from the working chamber 311 of the second axial end 311a to the high-temperature side refrigerant circuit 4.

During the operation of the second step, the magnetic field applied by the permanent magnet 323 to the magnetic working material 30 is maintained at the value increased in the first step (namely, at the magnetic field at the end of the first step), as indicated by "II" in FIG. 31.

In other words, the pressure difference between the refrigerant inlet port 313a and the working chamber 311 is increased in the first step operation. And when such pressure difference becomes larger than the predetermined value, the magnetic field applied to the magnetic working material 30 is maintained at the constant value (without decreasing from the magnetic field at the end of the first step). The second step operation is thereby carried out, in which the heat medium is moved in the working chamber 311 in the direction from the first axial end 311b to the second axial end 311a. In the second step, the heat energy of the magnetic working material 30, the temperature of which is increased in the first step, is transferred to the heat medium and moved to the second axial end 311a.

In the second step, since the magnetic field applied to the magnetic working material 30 is not changed, the heat is not generated in the magnetic working material 30. In the second step, the heat energy generated in the first step is transferred to the heat medium and thereby the temperature of the magnetic working material 30 is decreased.

In the fourth step, the refrigerant flows at once into the working chamber 311 of the second axial end 311a from the pressure accumulating tank 41b by its accumulated pressure energy, in addition to the refrigerant pumped out from the refrigerant pump 34B. Then, the flow of the refrigerant of almost constant value is immediately formed in the working chamber 311 in the direction from the second axial end 311a to the first axial end 311b, as indicated by "IV" in FIG. 18.

The refrigerant pump 34A sucks the refrigerant from the low-temperature side refrigerant circuit 5 into the cylinder bore (the pump chamber) 344a. The refrigerant, which is cooled down by the magnetic working material 30, flows out from the working chamber 311 of the first axial end 311b to the low-temperature side refrigerant circuit 5.

During the operation of the fourth step, the magnetic field applied by the permanent magnet 323 to the magnetic working material 30 is maintained at the value (the magnetic field at the end of the third step), to which the magnetic field is decreased in the third step, that is zero in the present embodiment, as shown in "IV" of FIG. 31.

In other words, the pressure difference between the refrigerant inlet port 312a and the working chamber 311 is decreased in the fourth step operation. And when such pressure difference becomes smaller than the predetermined value, the magnetic field applied to the magnetic working material 30 is still maintained at the constant value (without being increased) from the magnetic field at the end of the third step (that is zero in the present embodiment). The fourth step operation is thereby carried out, in which the heat medium is moved in the working chamber 311 in the direction from the second axial end 311a to the first axial end 311b. In the fourth step, the cold energy of the magnetic working material 30, the temperature of which is decreased in the third step, is transferred to the heat medium and moved to the first axial end 311b.

In the fourth step, since the magnetic field applied to the magnetic working material 30 (that is, zero) is not changed, the cold energy is not generated in the magnetic working material 30. In the fourth step, the heat energy generated in the third step is transferred to the heat medium and thereby the temperature of the magnetic working material 30 is increased.

According to the magnetic refrigerating system of the present embodiment, the heat energy absorbed in the cooling-side heat exchanger 12 is radiated in the heating-side heat exchanger 13, when the heat cycle of the first to fourth steps is repeatedly carried out.

In the first step, the movement of the heat medium is stopped in the working chamber 311 to thereby form the adiabatic state and the magnetic field to be applied to the magnetic working material 30 is increased. Therefore, it is possible to increase the temperature of the magnetic working material 30.

In the second step, the heat medium is moved in the working chamber 311 in the right-hand direction (FIG. 1) from the first axial end 311b to the second axial end 311a. Therefore, it is possible to transfer the heat energy from the magnetic working material 30 (the temperature of which is increased in the first step) to the heat medium to thereby move the heat energy to the second axial end 311a.

In the third step, the movement of the heat medium is again stopped in the working chamber 311 to thereby form the adiabatic state and the magnetic field applied to the magnetic working material 30 is decreased. Therefore, it is possible to decrease the temperature of the magnetic working material 30.

In the fourth step, the heat medium is moved in the working chamber 311 in the left-hand direction (FIG. 1) from the second axial end 311a to the first axial end 311b. Therefore, it is possible to transfer the cold energy from the magnetic working material 30 (the temperature of which is decreased in the third step) to the heat medium to thereby move the cold energy to the first axial end 311b.

As a result, the operating efficiency of the magnetic refrigerating system 2 can be increased. FIG. 32 is a graph showing a characteristic feature (indicated by a solid line) of the heat cycle of the magnetic refrigerating system 2 of the present embodiment in a temperature-entropy diagram. A one-dot-chain line shows the Brayton cycle, which is one of ideal heat cycles in a view point of the operating efficiency. A two-dot-chain line shows the Carnot cycle.

A dotted line shows a characteristic feature of the comparative example, in which the heat medium in the working chamber is continuously moved to reciprocate without stopping such reciprocal movement and the degree of the magnetic field is not changed during the operation in which the magnetic field is applied to the magnetic working material.

In the magnetic refrigerating system of the present embodiment, the magnetic working material 30 can be operated in an adiabatic magnetic-excitation condition for the first step "I" and in an adiabatic degaussing condition for the third step "III".

Figure 32:
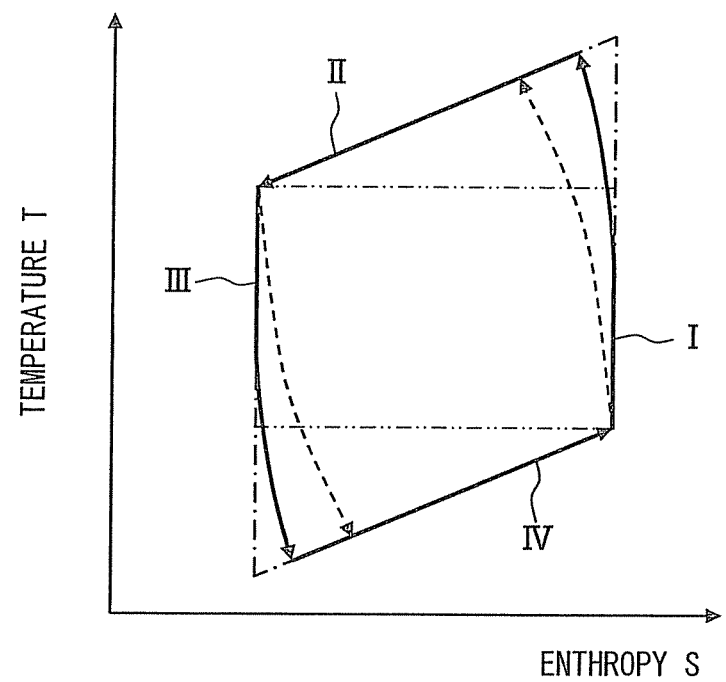
FIG. 32 is a graph showing a characteristic feature of a heat cycle for the magnetic refrigerating system of the sixth embodiment in a temperature-entropy diagram.

The Brayton cycle indicated by the one-dot-chain line in FIG. 32, which is one of the ideal heat cycles, has an adiabatic magnetic-excitation process and an adiabatic degaussing process. In the magnetic refrigerating system of the present embodiment, the first step "I" can be approximated to the ideal adiabatic excitation process. In addition, the third step "III" can be approximated to the ideal adiabatic degaussing process.

Namely, in the present embodiment, the heat cycle of the magnetic refrigerating system can be approximated to the ideal cycle, as shown in FIG. 32. Accordingly, it is possible to reduce a degree of diremption from the ideal heat cycle in the respective adiabatic excitation process and adiabatic degaussing process. Accordingly, the operating efficiency of the magnetic refrigerating system 2 can be increased.

(Further Modifications)

As above, the several embodiments of the present disclosure are explained. However, the present disclosure should not be limited to those embodiments, but the present disclosure can be modified in various manners without departing from the spirit of the present disclosure.

In the above first, second and sixth embodiments, each of the pressure switching valves 42a and 42b (the pressure valve devices) is provided in the container device 31 on the side of the respective refrigerant inlet ports 312a and 313a, through which the refrigerant is supplied from the refrigerant pumps 34A and 34B into the working chamber 311. In the above third and fourth embodiments, each of the discharge valves 312d and 313d (the pressure valve devices) is provided in the respective container units (or the respective container unit portions) 31a and 31b on the side of each refrigerant outlet port 312b and 313b, through which the refrigerant is pumped out by the refrigerant pump 34 from the working chamber 311 toward the heat exchangers 12 and 13. Those pressure valve devices may be provided on either side of the refrigerant inlet ports or the refrigerant outlet ports.

When the pressure valve devices are provided on the side of the refrigerant inlet ports, it is possible to surely stop the movement of the heat medium in the working chamber 311 in the first and third step operations.

In above first, second, third and sixth embodiments, the pressure accumulating tanks 41a and 41b (the pressure accumulating devices) accumulate the pressure of the refrigerant (the refrigerant discharging pressure) pumped out by the refrigerant pumps 34, 34A and 34B during the first and third steps. The pressure accumulating devices may accumulate refrigerant sucking pressure.

In the above first, second, third, and sixth embodiments, the heat-medium-movement prohibiting unit is formed by the pressure accumulating device and the pressure valve device. The heat-medium-prohibiting unit carries out the process changes from the first to the second step and from the third to the fourth step, when the pressure difference (which is a physical quantity varying in accordance with passage of time) reaches at the predetermined value. The heat-medium-prohibiting unit should not be limited to such a structure and operation.

For example, the heat-medium-prohibiting unit may be composed of a rotational angle detecting device for detecting a rotational position of the rotational shaft(s) and an electromagnetic valve, wherein the electromagnetic valve is operated (opened) depending on the rotational position of the rotational shaft (s), which is also a physical quantity varying in accordance with the passage of time.

Further alternatively, the heat-medium-prohibiting unit may be composed of a timer device and an electromagnetic valve, wherein the electromagnetic valve is opened after the elapse of a certain period of time.

In the above first, second, third and sixth embodiments, the refrigerant pump 34, 34A, 34B is continuously operated on one hand. On the other hand, the movement of the heat medium (the refrigerant) is prohibited in the first and third steps by the heat-medium-movement prohibiting unit (being composed of the pressure accumulating device and the pressure valve device).

The operation of the refrigerant pump should not be limited to such continuous operation. For example, the refrigerant pump may be intermittently operated so that the operation of the refrigerant pump is stopped in the first and third steps.

In the above embodiments, the predetermined patterns of the magnetic field to be applied to the magnetic working material are obtained by rotating the magnetic-field control unit.

The present disclosure should not be limited to such operation. For example, the position of the magnetic-field control unit may be relatively changed to the magnetic working material. Namely, the magnetic-field control unit may be fixed, while the working chamber for the magnetic working material may be moved.

The present disclosure should not be further limited to the above modification, in which the positions between the magnetic-field control unit and the working chamber (accommodating the magnetic working material) are relatively changed with each other.

For example, the gap changing member, the magnetic resistance changing member, the space dimension changing member or the like (which are explained in the first embodiment, for example, with reference to FIGS. 11 to 17) may be used. Namely, while the magnetic-field control unit and the magnetic working material are fixed, the gap or the space in the magnetic circuit may be mechanically changed or the magnetic resisting member provided in the magnetic circuit may be moved with respect to the magnetic-field control unit and the magnetic working material.

In the above embodiments, the permanent magnets are used as the magnetic-field generating member. An electromagnetic coil, which generates magnetic field upon receiving electric power, may be used.

Figure 33:
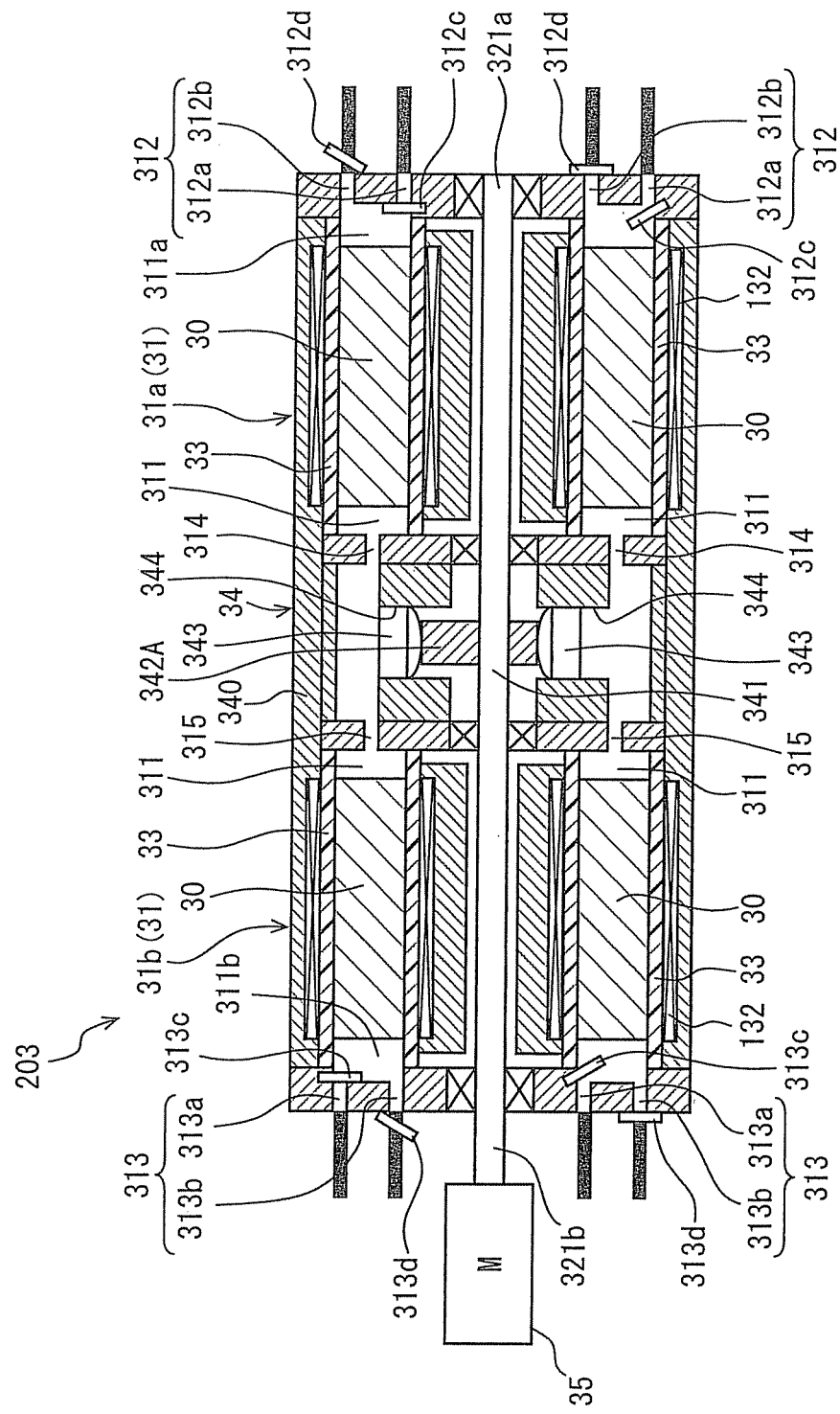
FIG. 33 is a schematic cross sectional view showing a modification of the magnetic refrigerating system.
Figure 34:
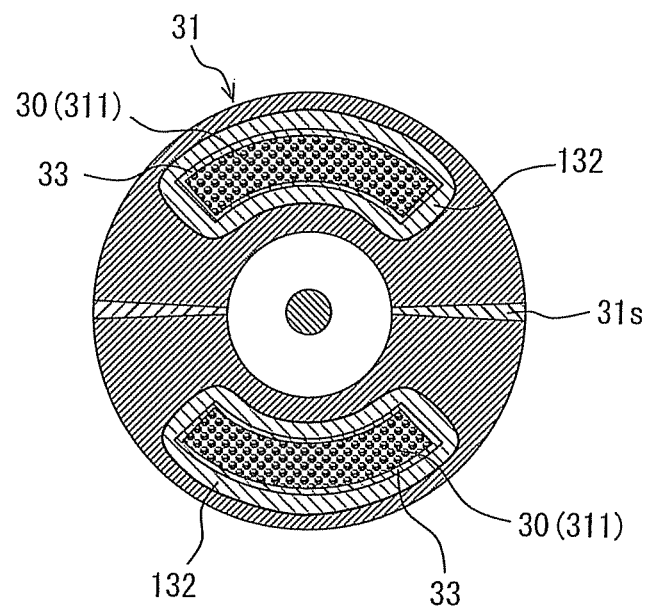
FIG. 34 is a schematic cross sectional view showing a heat-exchange container device of the modification.

For example, the magnetic refrigerating device 103 may be modified in way of a magnetic refrigerating device 203, as shown in FIGS. 33 and 34.

FIG. 33 is a cross sectional view taken along a plane in parallel to an axial direction of the magnetic refrigerating device 203, while FIG. 34 is a cross sectional view of a heat-exchange container device 31 taken along a plane perpendicular to the axial direction. As shown in FIGS. 33 and 34, the magnetic refrigerating device 203 differs from that of the fourth embodiment (FIGS. 21 to 27) in that electromagnetic coils 132 are used in place of the permanent magnets 323a and 323b.

As shown in FIGS. 33 and 34, each of the electromagnetic coils 132 is wound on the outer periphery of the holding member 33, which forms the working chamber 311 for accommodating therein the magnetic working material 30. The various kinds of the patterns for the magnetic field to be applied to the magnetic working material 30 can be obtained by changing the electric current to the electromagnetic coil 132.

In a case that the electromagnetic coil 132 is applied to the above first to fifth embodiments and an amount of current supply to the electromagnetic coil 132 is controlled depending on the operational phase of the heat pump cycle in the second and fourth steps, it is possible to realize the change rate (increase-decrease rate) of the magnetic field in accordance with the fluid speed of the heat medium.

Therefore, in the case of the electromagnetic coil, the degree of the magnetic field to be applied to the magnetic working material can be easily changed. In other words, the magnetic-field control unit can easily change the degree of the magnetic field to be applied to the magnetic working material and the increase-decrease rate thereof depending on the operational phase.

As shown in FIGS. 32 and 33, two working chambers 311 are formed in the one heat-exchange container device 31 (in the respective container unit portions 31a and 31b) for each cylinder of the refrigerant pump 34. Each of the coils 132 is arranged to the respective working chambers 311. The patterns of the magnetic field generated by the respective coils 132 are displaced in phase from each other. Therefore, as shown in FIG. 33, a low-permeability layer 31s, for example, made of resin, is formed in the heat-exchange container device 31 (which forms a part of the yoke) in order that the magnetic fields generated by the respective coils 132 may not be interfered with each other.

The number of the working chambers and the electromagnetic coils should not be limited to two in the circumferential direction. The low-permeability layer 31s may be removed, when the magnetic field generated by one of the electromagnetic coils does not give an adverse influence to the magnetic field generated by the other electromagnetic coil.

In the above first to fourth and sixth embodiments, the first step includes not only a time point in which the magnetic field is rapidly increased but also its anteroposterior time period. The third step includes not only a time point in which the magnetic field is rapidly decreased but also its anteroposterior time period.

The present disclosure should not be limited to this. For example, the first step may be defined as to include only the time point in which the magnetic field is rapidly increased. And the third step may be defined as to include only the time point in which the magnetic field is rapidly decreased.

In the above embodiments, the high-temperature refrigerant in the second axial end 311a of the working chamber 311 is circulated through the heating-side heat exchanger 13 so as to radiate the heat energy to the outside thereof, while the low-temperature refrigerant in the first axial end 311b of the working chamber 311 is circulated through the cooling-side heat exchanger 12 so as to absorb the heat from the outside. The present disclosure should not be limited accordingly. For example, the heat exchange between the refrigerant and outside fluid may be carried out at both axial ends of the working chamber.

What is claimed is:
1. A magnetic heat pump apparatus comprising:
a magnetic refrigerating device including;
 a cylindrical container device having a cylindrical housing and multiple working chambers arranged in the cylindrical housing at equal intervals in a circumferential direction of the cylindrical housing, wherein each of the working chambers accommodates magnetic working material having magnetocaloric effect and a heat medium passing through the working chamber;

a rotor rotatably accommodated radially inward of the multiple working chambers;

a magnetic-field control unit having multiple magnets for generating magnetic fields to be applied to the magnetic working material, wherein each of the magnets is fixed to an outer periphery of the rotor and arranged in a rotational direction of the rotor, so that a gap is formed between an outer peripheral surface of each magnet and an inner peripheral surface of the working chambers in a radial direction of the rotor, and wherein magnetic characteristic of each magnet is different from one another so as to change the magnetic fields to be applied to the magnetic working material when the rotor is rotated with respect to each of the working chambers; and a heat-medium moving device for moving the heat medium in the working chamber so that the heat medium reciprocates between a first axial end and a second axial end of the working chamber;

a heat radiating device for radiating heat, which is contained in the heat medium on a side of the second axial end, to an outside of the heat radiating device; and a heat absorbing device for absorbing heat from an outside of the heat absorbing device into the heat medium, which is on a side of the first axial end, wherein a heat pump cycle of the magnetic heat pump apparatus includes first to fourth steps, which are repeatedly carried out for each of the working chambers;

the first step, in which the working chamber is opposed to a first group of the magnets and the magnetic field is applied from the first group of the magnets to the magnetic working material, so that a temperature of the magnetic working material is increased, wherein the heat medium remains in the working chamber;

the second step, in which the working chamber is opposed to a second group of the magnets and the magnetic field is applied from the second group of the magnets to the magnetic working material, so that the magnetic field to be applied to the magnetic working material is increased, wherein the heat medium is moved from the first axial end to the second axial end by the heat-medium moving device, without decreasing the magnetic field applied to the magnetic working material which has been increased in the first step;

the third step, in which the working chamber is opposed to a third group of the magnets and the magnetic field applied from the third group of the magnets to the magnetic working material is decreased, so that the temperature of the magnetic working material is decreased, wherein the heat medium remains in the working chamber; and the fourth step, in which the working chamber is opposed to a fourth group of the magnets and the magnetic field is applied from the fourth group of the magnets to the magnetic working material, so that the magnetic field applied to the magnetic working material is further decreased, wherein the heat medium is moved from the second axial end to the first axial end by the heat-medium moving device, without increasing the magnetic field applied to the magnetic working material which has been decreased in the third step, wherein heat absorbed in the heat absorbing device is radiated from the heat radiating device, and wherein the heat-medium moving device and the magnetic-field control unit are synchronized in such a manner that, in the second and fourth steps, a change rate of the magnetic field to be applied to the magnetic working material by the magnetic-field control unit is made larger, as a moving speed of the heat medium by the heat-medium moving device is higher.

2. The magnetic heat pump apparatus according to claim 1, wherein in the first step, the magnetic field to be applied to the magnetic working material is increased by the magnetic-field control unit in such a manner that the magnetic field in the first step becomes larger than that in the fourth step, while the movement of the heat medium in the working chamber is stopped by the heat-medium moving device, the second step is carried out after an elapse of a certain period of time from a start of the first step or when a physical quantity varying in accordance with a passage of time reaches a predetermined value, in the third step, the magnetic field applied to the magnetic working material is decreased by the magnetic-field control unit in such a manner that the magnetic field in the third step becomes smaller than that in the second step, while the movement of the heat medium in the working chamber is stopped by the heat-medium moving device, and the fourth step is carried out after an elapse of a certain period of time from a start of the third step or when a physical quantity varying in accordance with a passage of time reaches at another predetermined value.

3. A magnetic heat pump apparatus comprising:

a magnetic refrigerating device including;

a cylindrical container device having a cylindrical housing and multiple working chambers arranged in the cylindrical housing at equal intervals in a circumferential direction of the cylindrical housing, wherein each of the working chambers accommodates magnetic working material having magnetocaloric effect and heat medium passing through the working chamber;

a rotor rotatably supported radially inward of the cylindrical housing;

a magnetic unit having multiple permanent magnets fixed to an outer periphery of the rotor and arranged in a rotational direction of the rotor in such a manner that each of the permanent magnets is opposed to the working chambers with a gap in a radial direction of the rotor, wherein each of the permanent magnets generates a magnetic field to be applied to the magnetic working material accommodated in each of the working chambers, wherein the multiple permanent magnets form a first magnet group to a fourth magnet group arranged in the rotational direction, each of which includes at least one permanent magnet, and wherein magnetic characteristic of each magnet group is different from one another so that the magnetic field to be applied to the magnetic working material is changed as the rotor is rotated with respect to the cylindrical housing; and a heat-medium moving device for moving the heat medium in the working chamber so that the heat medium reciprocates between a first axial end and a second axial end of the working chamber;

a heat radiating device for radiating heat, which is contained in the heat medium on a side of the second axial end, to an outside of the heat radiating device; and a heat absorbing device for absorbing heat from an outside of the heat absorbing device into the heat medium, which is on a side of the first axial end, wherein a heat pump cycle of the magnetic heat pump apparatus includes first to fourth steps, which are repeatedly carried out so that heat absorbed in the heat absorbing device is radiated from the heat radiating device;

the first step for increasing the magnetic field to be applied to the magnetic working material by the first magnet group, while the movement of the heat medium in the working chamber by the heat-medium moving device is stopped;

the second step for moving the heat medium from the first axial end to the second axial end by the heat-medium moving device without decreasing the magnetic field applied to the magnetic working material by the second magnet group, which has been increased by the first magnet group in the first step, wherein the second step is carried out after an elapse of a certain period of time from a start of the first step or when a physical quantity varying in accordance with a passage of time reaches a predetermined value;

the third step for decreasing the magnetic field applied to the magnetic working material by the third magnet group after the second step, while the movement of the heat medium in the working chamber by the heat-medium moving device is stopped; and the fourth step for moving the heat medium from the second axial end to the first axial end by the heat-medium moving device without increasing the magnetic field applied to the magnetic working material by the fourth magnet group, which has been decreased by the third magnet group in the third step, wherein the fourth step is carried out after an elapse of a certain period of time from a start of the third step or when a physical quantity varying in accordance with a passage of time reaches another predetermined value wherein in the second step, a change rate of the magnetic field to be applied to the magnetic working material is made larger by the second magnet group, as a moving speed of the heat medium, which is moved by the heat-medium moving device from the first axial end to the second axial end, is higher, and in the fourth step, a change rate of the magnetic field applied to the magnetic working material is made larger by the fourth magnet group as a moving speed of the heat medium, which is moved by the heat-medium moving device from the second axial end to the first axial end, is higher.

4. The magnetic heat pump apparatus according to claim 3, wherein the heat-medium moving device is continuously operated for reciprocating the heat medium, a heat-medium-movement prohibiting unit is provided for prohibiting movement of the heat medium in the working chamber, and the movement of the heat medium in the working chamber is stopped by the heat-medium-movement prohibiting unit in the first and third steps, while the heat-medium moving device is in its operation.

5. The magnetic heat pump apparatus according to claim 3, wherein the change rate of the magnetic field in the second step, which is generated by the second magnet group and applied to the magnetic working material is smaller than a change rate of the magnetic field, which is generated by the first magnet group and applied to the magnetic working material in the first step, and the change rate of the magnetic field in the fourth step, which is generated by the fourth magnet group and applied to the magnetic working material is smaller than a change rate of the magnetic field, which is generated by the third magnet group and applied to the magnetic working material in the third step.

6. A magnetic heat pump apparatus comprising:

(a) a magnetic refrigerating device including;

(a1) a cylindrical container device having a cylindrical housing and multiple working chambers arranged in the cylindrical housing at equal intervals in a circumferential direction of the cylindrical housing, wherein each of the working chambers accommodates magnetic working material having magnetocaloric effect and heat medium passing through the working chamber;

(a2) a magnetic unit having multiple permanent magnets arranged in a cylindrical form and located at an inner peripheral side or an outer peripheral side of the cylindrical container device, so that the permanent magnets are opposed to the working chambers with a gap in a radial direction of the cylindrical container device, wherein either one of the cylindrical container device and the magnetic unit is rotated with respect to the other of the cylindrical container device and the magnetic unit, so that each of the multiple permanent magnets are moved relative to the respective working chambers in the circumferential direction, wherein each of the permanent magnets generates magnetic field to be applied to the magnetic working material accommodated in each of the working chambers, wherein the multiple permanent magnets form a first magnet group to a fourth magnet group, each of which includes at least one permanent magnet, wherein magnetic characteristic of each magnet group is different from one another so as to change the magnetic field to be applied to the magnetic working material when the magnetic unit is rotated relative to the cylindrical container device; and (a3) a heat-medium moving device for moving the heat medium in the working chamber so that the heat medium is reciprocated between a first axial end and a second axial end of the working chamber;

(b) a heat radiating device for radiating heat, which is contained in the heat medium on a side of the second axial end, to an outside of the heat radiating device; and (c) a heat absorbing device for absorbing heat from an outside of the heat absorbing device into the heat medium, which is on a side of the first axial end, wherein the magnetic heat pump apparatus carries out a heat pump cycle for each of the working chambers in the following steps;

in a first step, the working chamber is opposed to the first magnet group, so that the magnetic field is applied from the first magnet group to the magnetic working material accommodated in the working chamber to increase temperature of the magnetic working material, wherein the heat medium remains in the working chamber;

in a second step, the working chamber is opposed to the second magnet group, so that the magnetic field is applied from the second magnet group to the magnetic working material accommodated in the working chamber, wherein the magnetic field applied to the magnetic working material in the second step is larger than that in the first step, and wherein the heat medium is moved from the first axial end to the second axial end by the heat-medium moving device;

in a third step, the working chamber is opposed to the third magnet group, so that the magnetic field is applied from the third magnet group to the magnetic working material accommodated in the working chamber, wherein the magnetic field applied to the magnetic working material in the third step is smaller than that in the second step, so that the temperature of the magnetic working material is decreased, wherein the heat medium remains in the working chamber; and in a fourth step, the working chamber is opposed to the fourth magnet group, so that the magnetic field is applied from the fourth magnet group to the magnetic working material accommodated in the working chamber, wherein the magnetic field applied to the magnetic working material in the fourth step is further smaller than that in the third step, and wherein the heat medium is moved from the second axial end to the first axial end by the heat-medium moving device wherein, in the second and fourth steps, a change rate of the magnetic field to be applied to the magnetic working material by the magnetic-field control unit is made larger, as a moving speed of the heat medium by the heat-medium moving device is higher.

* * * * *